US010943213B1

(12) United States Patent
Natarajan

(10) Patent No.: US 10,943,213 B1
(45) Date of Patent: *Mar. 9, 2021

(54) BACK-END PRODUCTION AND DELIVERY SYSTEM FOR SCHEDULE CONTROLLED NETWORKABLE MERCHANT E-COMMERCE SITES

(71) Applicant: Sundaram Natarajan, Fremont, CA (US)

(72) Inventor: Sundaram Natarajan, Fremont, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/397,163

(22) Filed: Apr. 29, 2019

Related U.S. Application Data

(63) Continuation-in-part of application No. 16/297,642, filed on Mar. 9, 2019, which is a continuation of application No. 15/488,243, filed on Apr. 14, 2017, now Pat. No. 10,242,347, which is a continuation-in-part of application No. 14/231,025, filed on Mar. 31, 2014, now Pat. No. 9,626,713.

(60) Provisional application No. 61/807,214, filed on Apr. 1, 2013.

(51) Int. Cl.
  *G06Q 10/10* (2012.01)
  *G06Q 10/08* (2012.01)
  *G06Q 30/06* (2012.01)

(52) U.S. Cl.
  CPC ....... *G06Q 10/1093* (2013.01); *G06Q 10/083* (2013.01); *G06Q 10/087* (2013.01); *G06Q 30/0601* (2013.01)

(58) Field of Classification Search
  CPC . G06Q 10/1093; G06Q 10/083; G06Q 10/087
  See application file for complete search history.

(56) References Cited

U.S. PATENT DOCUMENTS

| | | | |
|---|---|---|---|
| 2010/0251144 A1* | 9/2010 | Shaty | G06F 21/64 715/760 |
| 2013/0325636 A1* | 12/2013 | Carter | G06Q 30/0277 705/14.71 |
| 2020/0349611 A1* | 11/2020 | Publicover | H04N 21/2187 |

* cited by examiner

*Primary Examiner* — Vanel Frenel
(74) *Attorney, Agent, or Firm* — Stephen E. Zweig

(57) ABSTRACT

An improved computerized e-commerce system, optimized for smaller merchants such as florists who often provide seasonal perishable gifts that require local delivery, and who often desire to form cooperative networks with local merchants offering related gift services, as well as other related merchants such as other florists in more distant locations. The web server based system allows merchants to easily set up non-static (time variable) websites that automatically provide schedule driven promotions. New products can be quickly uploaded from smartphones, and sophisticated time and location aware algorithms can compute accurate delivery costs and make such costs transparent to customers. The system may also include backend software configured to assist in product production, inventory control, product cost optimization, and product delivery optimization, management, and tracking.

18 Claims, 62 Drawing Sheets

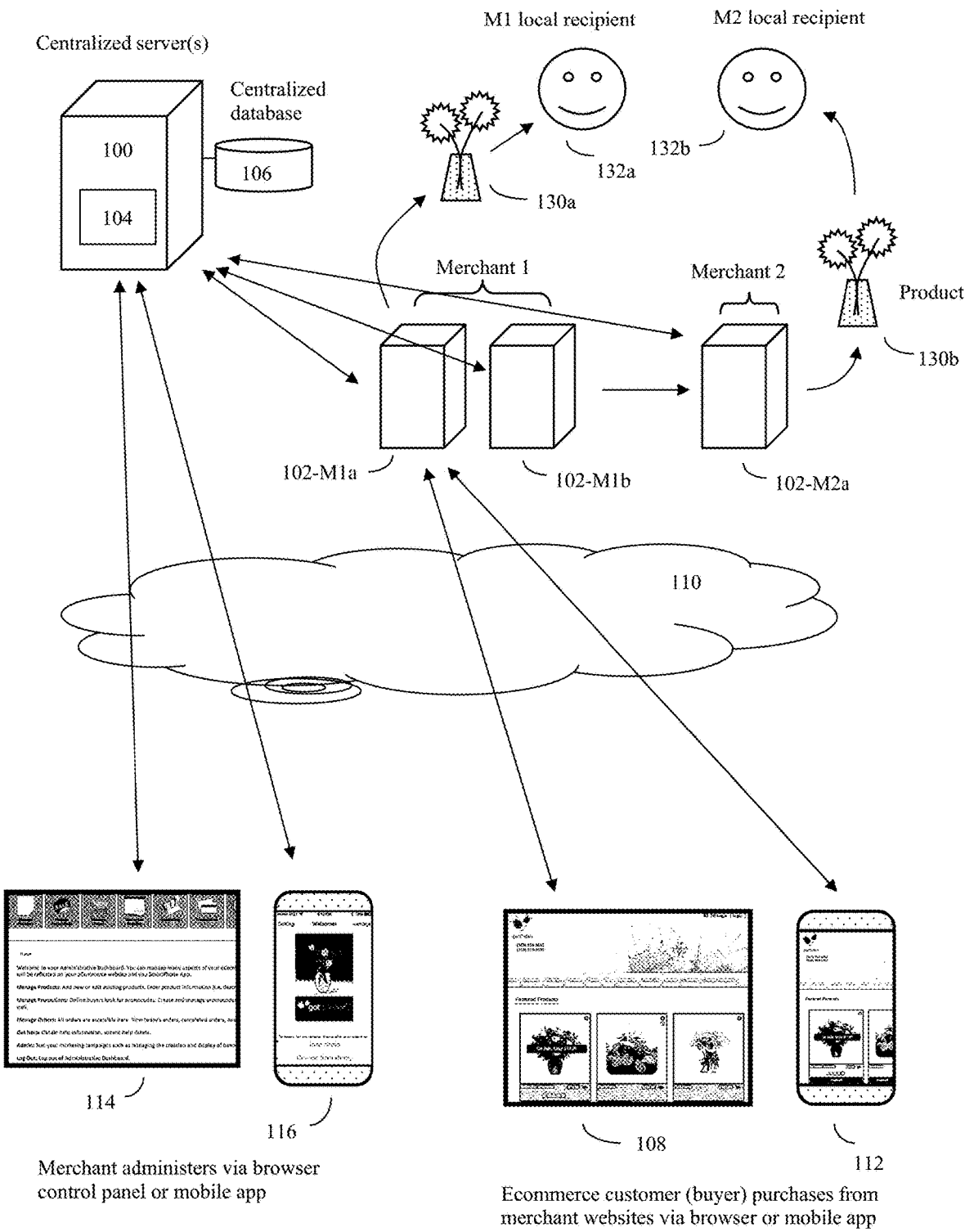

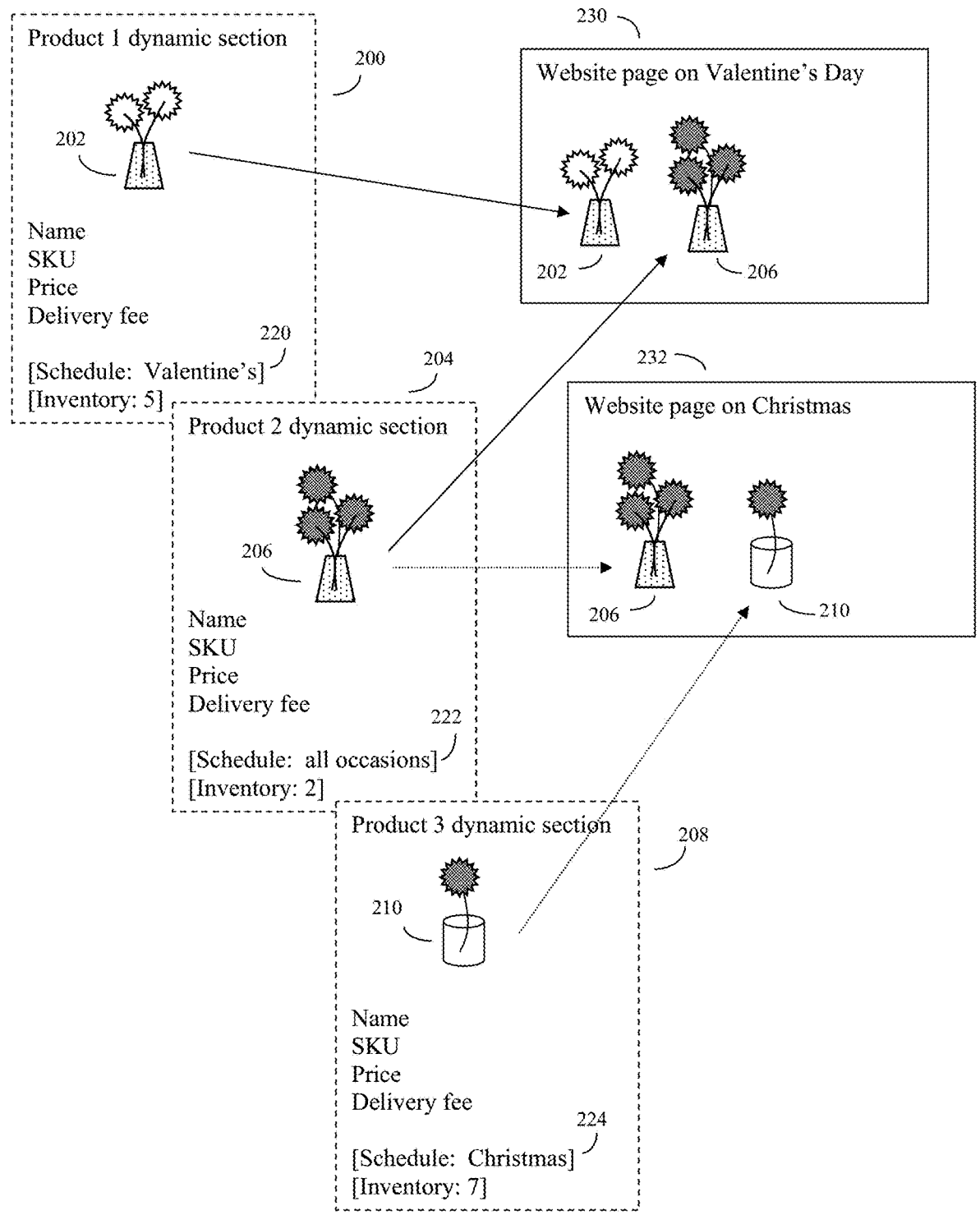

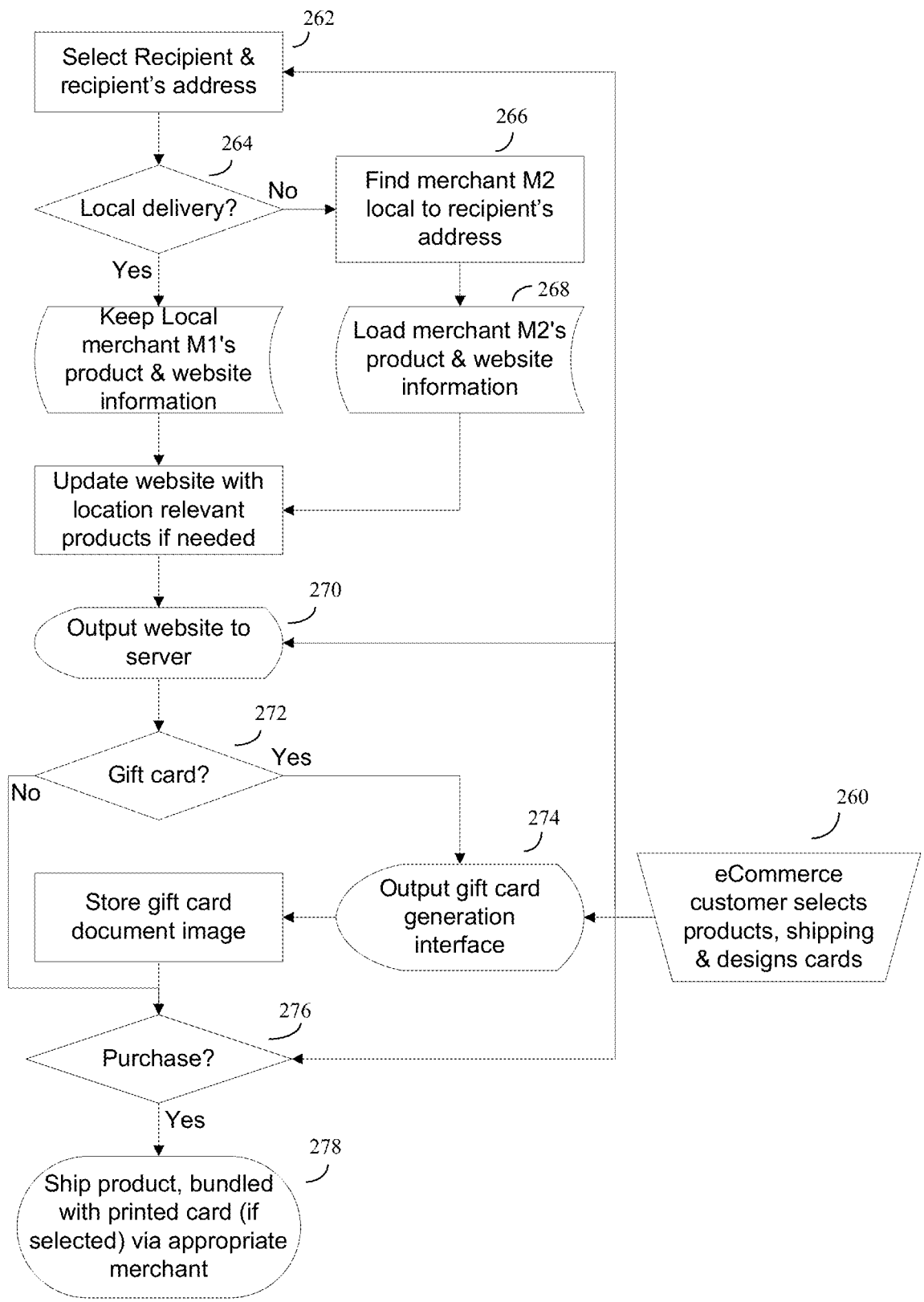

Ecommerce customer (buyer) designing custom
gift card using their web browser or mobile app

Figure 52D
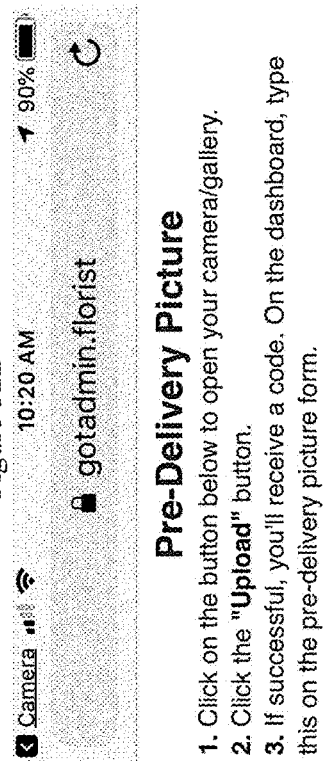
Figure 52B
Pre-Delivery Picture
1. Click on the button below to open your camera/gallery.
2. Click the "Upload" button.
3. If successful, you'll receive a code. On the dashboard, type this on the pre-delivery picture form.
Figure 52C
Your code is
T67G
and it is valid for 4 hours!
(You may close thise window once finished.)

Figure 54B

BACK-END PRODUCTION AND DELIVERY SYSTEM FOR SCHEDULE CONTROLLED NETWORKABLE MERCHANT E-COMMERCE SITES

CROSS REFERENCE TO RELATED APPLICATIONS

This application is a continuation in part of U.S. patent application Ser. No. 16/297,642, filed Mar. 9, 2019; application Ser. No. 16/297,642 is a continuation of U.S. patent application Ser. No. 15/488,243, filed Apr. 14, 2017, now U.S. Pat. No. 10,242,347 issued Mar. 26, 2019; Application Ser. No. 15/488,243 was a continuation in part of U.S. patent application Ser. No. 14/231,025, filed Mar. 31, 2014, now U.S. Pat. No. 9,626,713 issued Apr. 18, 2017; Application Ser. No. 14/231,025 claimed the priority benefit of U.S. provisional application 61/807,214, filed Apr. 1, 2013; the complete contents of all of these applications are incorporated herein by reference.

BACKGROUND OF THE INVENTION

Field of the Invention

This invention is in the field of internet web server facilitated e-commerce and mobile e-commerce apps for handheld computerized devices.

Description of the Related Art

As internet technology has advanced, more and more commerce is done using computerized devices that connect with various commerce computerized data servers, often web servers, over the internet. Such internet facilitated commerce services are generally referred to as e-commerce.

Although many large corporations, such as Amazon.com, eBay, and the like have transformed commerce through the use of large scale banks of servers, which offer a large range of online products, certain areas of commerce have not advanced as quickly. In particular, smaller scale local merchants such as florists, bakers, party supply vendors, and the like, who often may offer local delivery of various perishable products such as flowers and perishable foods, often for gift purposes, have been less well served.

As a result, often these various local merchants must expend a considerable amount of time, energy, and money creating and updating their own individual e-commerce websites. To assist in this process, certain prior art e-commerce software packages, such as the open source osCommerce® system, and other systems such as Magento®, are available that provide a prefabricated software e-commerce framework for merchants to set up their own online e-commerce systems. However, these prior art prefabricated e-commerce framework software systems still require a considerable amount of customization to optimize. Indeed they are often so complex that usually use of skilled programmers is required to produce good results.

An additional problem that various local merchants, in particular, gift merchants such as florists, have is that there is often a need for merchants in one geographic area to cooperate with merchants from another geographic area. Such merchants may have loyal local customers that tend to assume that the merchant has an ability to extend its local services further than may actually be the case, and who turn to the local merchant for assistance for things such as delivering gifts to more distant locations.

Thus, for example, in many third-party beneficiary contracts such as gifts, a customer/buyer may wish to work with a local florist to arrange for a more distant florist to deliver a gift of flowers to a third party beneficiary type recipient such as a relative, friend, or business associate.

In an effort to meet these consumer expectations, some local merchants such as florists sign up for relatively high overhead services, such as FTD florist, that allow the florists and their customers to access a central website, and contract with florists located closer to the recipient's location to deliver a standardized series of floral arrangements. However such services come at a cost. Because only a limited range of standardized floral arrangements are made available, it is all too often the case that the florists that happen to be located near the delivery area cannot or would prefer not to deliver the advertised floral arrangements. Further, the prior art delivery charge methods tended to hide the true costs of delivery from the customer and also tended to impose unrealistic delivery cost expectations on the delivery florist. Thus further improvements in the area of e-commerce technology, in particular for local merchants such as florists that provide gift type perishable products that may also have to be delivered, would be desirable.

BRIEF SUMMARY OF THE INVENTION

The invention is based, in part, on the overall vision of delivering a highly automated, flexible, and easy to use e-commerce system, optimized for the needs of local merchants such as florists that often deliver perishable products (often gifts). The system is designed to be simple enough that even merchants who are relatively unskilled in computer technology can maintain their e-commerce systems with minimal amounts of time, effort, and money.

The invention may be particularly useful for the gift industry where the buyer and the recipient are two different entities and for situations where either same day delivery or scheduled delivery is desired. Some of the various aspects of the invention include:

Calendar or other schedule based automatic website updates: The invention is based, in part, on the insight that for many local merchants of perishable products, particularly when delivery is part of the purchase, and particularly when the products may be gifts, have a large fraction of their orders occur on a predictable schedule. In particular, a large percentage of purchases occur on a calendar type schedule based on important secular or religious holidays, such as Christmas, Hanukkah, New Years, Valentine's Day, Chinese New Year, Easter, and the like.

During these peak event times, it often is useful for the merchant to at least partially customize their website with various event specific banners and other graphics and text, as well as various products or services focused on these particular events. Thus florists, for example, may wish to promote corsages at graduation times, bouquets of roses at Valentine's Day, put up e-commerce website banners commemorating Easter, and so on.

Because these scheduled events can be predicted in advance, and have a known sequence and duration, in one embodiment, the invention provides a calendar based scheduling service, as well as various online artistic tools enabling the merchant to quickly customize their website with calendar controlled banners and calendar controlled product offerings. This allows the merchant to set up a timed series of event-specific banners and other event-specific web features that automatically update the merchant's e-commerce website to reflect these events. Once set up, the merchant's e-commerce website can then remain automatically current throughout the year with a minimal need for further manual updating.

Sophisticated delivery cost estimation engine: The invention is also based, in part, on the insight that particularly with regards to local delivery; often the merchant's actual delivery costs are highly variable depending on the day, time of day, and exact geographical locations of the merchant and the recipient. Prior art e-commerce services, particularly for small merchant mediated deliveries, failed to sufficiently keep track of such costs. This had unfortunate consequences for all parties concerned. For example, a florist that had to accept an order with an unrealistically low delivery cost would be tempted to recoup at least some of the extra delivery costs by substituting a cheaper product. Thus the buyer might order a fancy bouquet but pay an unrealistically low delivery cost. The recipient might, in turn, receive a substandard bouquet. Despite all this, the merchant might still end up with an inadequate profit.

To help prevent situations such as this, the invention further provides a sophisticated delivery cost customization engine or set of algorithms that allows the merchant to precisely dial in a more realistic time and location variable delivery costs, provide more realistic delivery cost calculations, and make these costs available to the purchaser (typically e-commerce purchaser). The net result is that the purchaser can make intelligent delivery decisions, and the delivery merchant is adequately compensated for the true costs of delivery. The delivery merchant thus has less incentive to compensate for unrealistic delivery costs by substituting lower quality products.

As will be discussed, this delivery cost estimation engine, or similar type delivery engine, may also be used to help configure a product delivery backend portion of the system that can automatically schedule drivers, automatically optimize driver's routes, and also perform important product delivery quality control functionality.

Addition of new products in minutes using smartphone apps: The invention is also based, in part, on the insight that many local merchants are creative and innovative individuals who often have both the desire and ability to come up with various creative variations on otherwise standard products. However, due to the cumbersome nature of present-day e-commerce systems, the burden on the local merchant to customize their website to adequately showcase these spontaneous creations tends to inhibit this creativity. Again using the floral industry as an example, a local florist may come up with a creative and cost-effective new floral arrangement in a few minutes; but if it takes hours of work to then advertise the new floral arrangement on the florist's e-commerce website, then that creative new floral arrangement may never see the light of day.

In another embodiment, to address this problem, the invention utilizes modern smartphone or mobile computerized tablet technology to provide easy to use e-commerce website maintenance apps. These apps allow merchants to utilize the smartphone's camera to photograph or take short video clips of their creations, tap in a new product listing, and upload a new product to their e-commerce website in a few minutes or less. In some embodiments, these apps can be native apps, such as apps developed for specific models of smartphones or tablets (e.g. iOS devices, Android devices, Windows devices, and the like. Such apps are often developed using software development kits (SDK) for such devices.

As will be discussed, in some embodiments, the above functionality may also be utilized in product creation and inventory backend software. This product creation and inventory backend software can be configured to maintain an inventory of product components, product recipes, and product wholesale and retail cost information, and can assist the merchant in producing products in an efficient, high-quality, and cost-effective manner.

Easy formation of e-commerce networks with other participating merchants: The invention is also based, in part, on the insight that local merchants often need to cooperate with other merchants. These other merchants can be other local merchants or artisans or can be more distantly located merchants and artisans.

For example, a local florist and a local baker may find it advantageous to cross-promote each other's products and services on each other's websites so that, for example, a purchaser who wishes to send a gift of flowers could also have a cake delivered at the same time, and vice versa. Additionally, again using the floral industry as an example, different florists in geographically different locations may wish to join forces to form their own network of connected floral services.

The invention's merchant networking capability allows merchants to spontaneously form various formal and informal networks. The invention's merchant networking capabilities can operate automatically and, apart from merchant sign up, can then require little or no additional human intervention or overhead. Alternatively, an administrator can facilitate this process as desired.

As a result, due to the fact that there are little or no middleman fees, the invention's merchant networks can operate with high efficiency. At the same time, by joining forces, an originating merchant, such as a florist, in one area of the country can send business to another recipient/delivery merchant (i.e. another florist) in another area of the country, and pocket a decent commission for this. However because there is otherwise no middleman to extract fees from the system, enough money remains that the distant delivery merchant can still provide a high quality requested product at a satisfactory profit margin as well.

In another embodiment, the invention also provides an easy to implement system and method to allow the formation of such informal merchant networks. As a result, everyone, purchaser, first originating merchant, second recipient/delivery merchant, and the ultimate gift or product recipient is more likely to be satisfied due to the high efficiency and lack of middleman costs of the system.

No purchaser effort promotional code system: The invention is further based on the insight that prior art mechanisms of providing promotional codes for purchases were too cumbersome. According to prior art, if a company such as Intel received a group promotional code for a discount off of purchases (e.g. 10% off), the employees of the company would have to obtain the Intel promotional code and provide it to the merchant in order to receive discounts. However according to the invention's improved systems and methods, the invention's e-commerce web server can optionally link these promotions directly with the originating e-commerce customer's URL or email address (here, for example, web browser purchases originating from Intel, or Intel purchaser email addresses) from which the product purchase had originated. The system can then use the product purchase URL or email address to automatically assign promotional product price or shipping discounts, thus reducing purchaser effort.

Recipient delivery and gift customization: The invention is also based, in part, on the insight that although many such local merchant e-commerce based purchases will be for gifts for others, often such gifts need not be surprise gifts. When such gifts are not surprise gifts, it can often be further desirable to give the gift recipient at least some advance notice of the gift, as well as at least some ability to modify the time that the gift arrives, and even potentially modify the nature of the gift. Thus for example, a recipient of flowers can get an advance email or SMS notice of the gift, along with a link to the invention's e-commerce website, and may be able to redirect the time or day of arrival to a more appropriate time or day of arrival, thus ensuring that the flowers arrive when the recipient is not on vacation.

Alternatively, a recipient of a gift for a first flavor or type of cake might modify the cake to a more preferred type or flavor. In another embodiment, the invention also provides for such an ability to notify the recipient electronically, and to allow at least partial modification of the gift by, for example, going to the local merchant's website and selecting various alternative delivery or gift type options.

As will be discussed, such systems can also be utilized in conjunction with back end delivery software to provide up to date product delivery tracking information as well.

Easy customer gift card customization: The invention is further based on the insight that at least with regards to gifts; often the gift recipient values the thought (i.e. affection, good intentions) behind the gift as much or more than the gift itself. However present industry practice of only providing entry of text into otherwise standardized gift card designs somewhat defeats this purpose. The invention further provides an easy to use user interface that allows the purchaser of the gift to custom design the art of the gift cards delivered with the gifts, as well. Thus, for example, gift cards can appear to be hand drawn with customer generated handwriting and customer generated or selected art or doodles, further providing evidence of the purchasers' thought behind the gift. These artistically customized gift cards can further enhance the mutual satisfaction of both the gift giver and recipient.

As will be discussed, in some embodiments, this type of system may also be utilized to create product identification tags, which may be associated with each product, which can help work in conjunction with either backend product production software, and/or backend product delivery software, to help improve product creation and product delivery quality control.

Thus in one embodiment, the system may be an e-commerce method and system, which can be optimized for smaller merchants such as florists who often engage in seasonal perishable gifts that require local delivery, and who often need to form cooperative networks with local merchants offering related gift services, as well as other related merchants such as other florists in more distant locations. The invention's web server based system and method allow merchants to easily set up non-static (time variable) e-commerce websites that automatically provide schedule driven promotions. New products can be easily entered into the website using smartphones to photograph and then upload along with product descriptions. More sophisticated time and location-aware algorithms can more accurately compute accurate delivery costs, and can also make such costs transparent to customers, resulting in more intelligent purchases and increased satisfaction. Other participating merchants can be easily added to the system to form cooperative local and distant merchant networks. The system can further simplify the administration of promotions by cross-checking customer URL versus promotion lists. Additionally, recipient gift appreciation may be further optimized by providing interfaces to allow customer designed gift cards and messages with customer handwritten text and sketches.

Other features, such as the ability to operate multiple automatically customized cloned e-commerce websites (for higher sales and search engine customization), and automatic posting of product updates to online social networks, will also be described.

Although in some embodiments, the invention may be operated on a peer-to-peer basis, with data decentralized and exchanged among a number of cooperating merchant e-commerce servers, in a preferred embodiment, a single database may be used to drive at least the high-level aspects of the system. Although this single database may also store and retrieve various types of data from a variety of merchant servers, at least on a temporary basis, in the single database embodiment, the single database will generally end up holding some or even all of the data needed to manage the system. This single database can also be used to create various merchant/administrator control panels, manage uploads and downloads from various smartphone apps, as well as to help implement various merchant point-of-sale systems.

BRIEF DESCRIPTION OF THE DRAWINGS

FIG. 1 shows an overview of the system. The main component of the system exists in the form of internet web server e-commerce software. Merchants, purchasers, and recipients can interact with the web server e-commerce software using standard web browsers or apps running on various computerized devices such as smartphones.

FIG. 2A shows an example of how the invention can assemble product data from various dynamic sections (from database memory) to construct different types of e-commerce webpages depending on the server's clock/calendar, and a previously stored calendar schedule of product availability.

FIG. 2C shows a flow chart showing how an e-commerce customer can interact with the system's schedule-driven e-commerce web pages, select products that can be delivered by either a local merchant or a remote merchant (located near the recipient), and also customize a product gift card as desired.

FIG. 11 shows how the system may store a variety of different merchant designed banners, and automatically switch to showing various banners on various days of the year. Here for example, the system shows a Valentine's Day banner on Valentine's Day, a Chinese New Year banner around the time of the Chinese New Year, and so on.

FIG. 13 shows how the merchant can modify the price as a function of date using the system's calendar function. Here the price of roses is altered by 10% right after Valentine's Day.

FIG. 15A shows how the merchant can use the system settings to specify the merchant's days and times of standard delivery service, as well as extended days and hours of delivery service for additional charges.

FIG. 15B shows how the system can be configured to enable the merchant to set a schedule driven override of various merchant-default business rules.

FIG. 16 shows how the merchant can also select countries or other geographical areas of service. Here, for example, a merchant located on the border between the US and Canada, and potentially serving both countries, can select a geographic zone (e.g. US/Canada) using a pull-down menu.

FIG. 50 shows a screenshot of a product designer user interface configured to provide product assembly information for producing a particular flower arrangement.

FIG. 51A shows an alternative product designer user interface.

FIG. 51B shows a later stage in the custom design process previously shown in FIG. 51A.

FIG. 52B shows that in this embodiment, the QR code has directed the user's smartphone to the appropriate portion of the merchant's product assembly website, and the system is now prompting the user and the smartphone to take a pre-delivery picture of the product (here a flower arrangement).

FIG. 52C shows that after the user has taken the pre-delivery picture, the system can also provide an optional verification process, such as a user entered verification code (here T67G), that the user can enter to further verified that the correct picture is associated with the correct product.

FIG. 52D shows that the system has now received a pre-delivery picture, and has transmitted it back to the user's smartphone for verification. The user can verify by entering the verification code (t67g), thus confirming that the uploaded image is associated with the correct product going to the correct customer.

FIG. 54B shows how the system may be configured by the merchant to restrict or otherwise modify delivery of products to certain geographic areas (zones) according to the invention's schedule-driven techniques.

DETAILED DESCRIPTION OF THE INVENTION

As previously discussed, the invention is designed to allow rapid setup and modification of e-commerce websites, particularly e-commerce websites optimized for the unique needs of local merchants who deliver perishable products and gifts, such as florists, bakers, and the like. The invention is designed so that it can be easily used by users with minimal computer and programming skills. The system is further designed so that merchants can maintain the system using only standard web browsers, and apps running on standard handheld internet connected computerized devices such as smartphones (e.g. the popular iPhone Android series phones), tablet computers, laptop computers, desktop computers, and the like.

Some of the novel aspects of the system, as previously discussed, include calendar-based automatic website updates, a more sophisticated delivery cost estimation engine, an ability for merchants to add new products to their e-commerce sites, using simple to use smartphone apps, in only a few minutes, easy formation of e-commerce networks with other participating merchants, simplified, no customer effort, promotional code system, improved recipient delivery time and gift customization, easy customer gift card customization, and other improvements to be discussed. Additional aspects also include automated search engine optimization features, ability to automatically manage multiple merchant "echo" e-commerce websites, and the ability to automatically push product updates to various social media sites. FIG. 1 shows an overview of the system. The invention can be considered to be, in part, as an improved computer-implemented system and method of conducting e-commerce.

In some embodiments, the invention may be a system and method of managing at least one schedule driven dynamic layout e-commerce website for at least one merchant (usually a plurality of cooperating merchants). In a preferred embodiment, at least one processor (often located in centralized server 100) utilizing centralized database (106) and automated website creation software (104) (which will be described in more detail shortly) will manage at least the high-level organization of the system. In particular, this centralized server (100) and centralized database (106) can be used to configure at least one (and usually multiple) schedule driven dynamic layout e-commerce websites. FIG. 1 shows these websites as being run on other servers (e.g. 102-M1*a*, 102-M1*b*, 102-M2*a*) that are different from the centralized server (100). However because servers can run multiple websites, and one machine can run multiple virtual machines, each running their own servers, this need not always be the case.

Figure 2B:
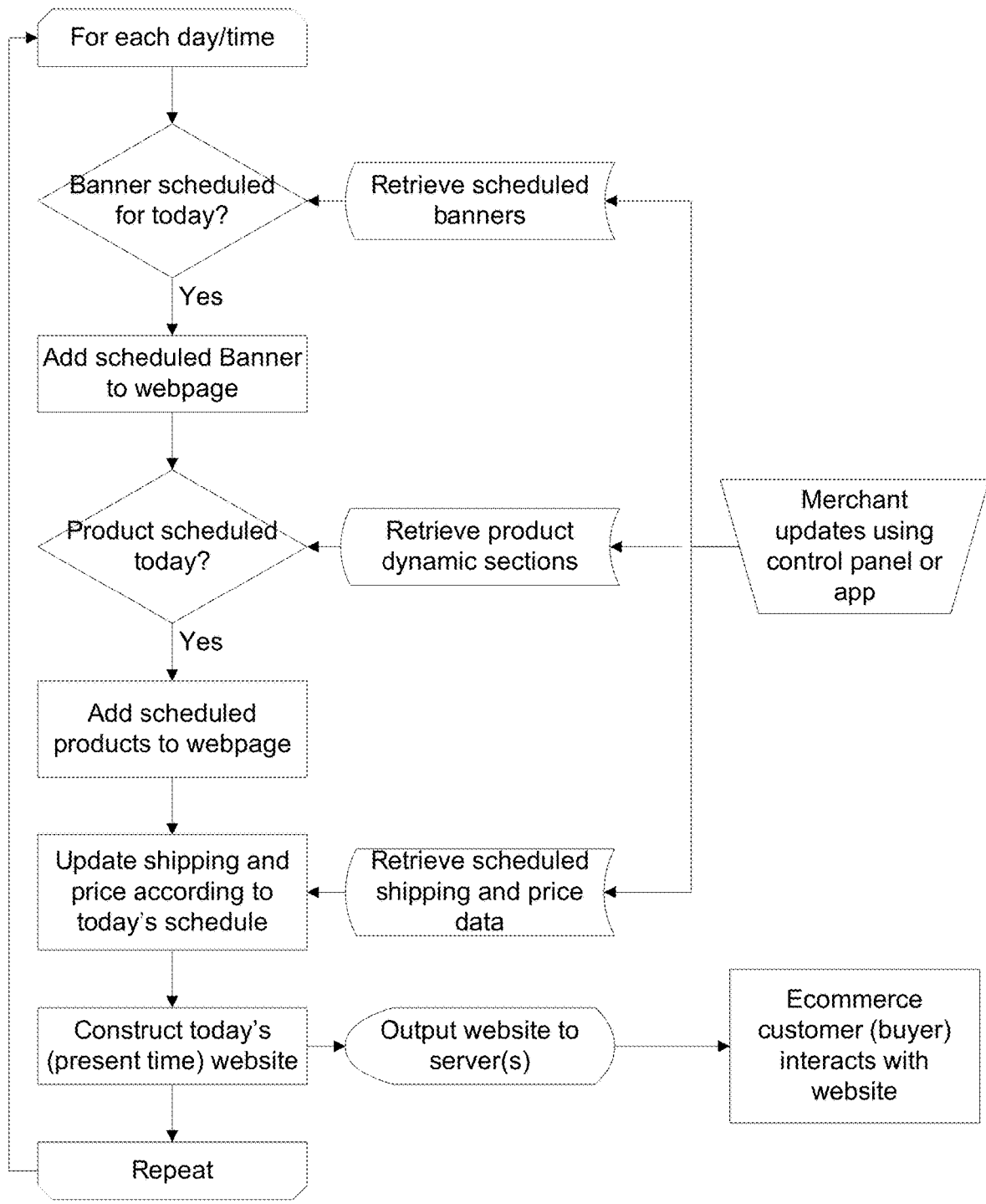
FIG. 2B shows a flow chart giving a rough overview of how the invention's schedule-driven system operates, and how this operation may be controlled by a merchant using a control panel such as an administrator web page.

In a preferred embodiment, these e-commerce websites will typically have at least some web pages composed or made up of various dynamic sections. These dynamic sections, which are shown in more detail in FIG. 2A, are generally associated with various corresponding products (e.g. FIG. 1: 130a, 130b) and product data. This will often be done on a one product per dynamic section basis. This product data may comprise information such as a description of the product (product description, which can include both text as well as images and video of the product), product price (which may vary according to a time schedule, inventory availability, merchant entered variables, promotions, and other parameters), one or more Stock Keeping Unit (SKU) identifier(s), product inventory information (e.g. how many in stock, or how many product components in stock), and product availability schedule (often a calendar schedule) showing days or times when the product is available. Additionally, information as to which merchant has the product in stock, and location from which the product may be shipped, may also be included in the product data.

Other data, which may be stored in the form of product data, or in the data for the merchant associated with a given product, can again include the location where the product is shipped from (often the location where the merchant for that particular product is located). The other data may also include shipping information for that product shipping location. This can include shipping prices, as well as various delivery times and location constraints. Various shipping price modifiers (e.g. promotions, price varying as per delivery time, price varying as per shipping location, price varying according to various other merchant entered parameters) can also be included. Relative to FIG. 1, a specific example here would be the shipping price as determined by the time and address where the product (130a) should be delivered to the recipient (132a).

Note that this shipping information, and the computed shipping price, will often be quite sensitive to the product shipping location (often the location of the merchant that has the product) as well as the recipient's location. Thus the computed shipping price to ship product (130b) to recipient (132b) may be quite different than the shipping price to ship product (130a) to recipient (132a). The system may also be configured to either not accept the possibility of some product location shipping destinations, such as the possibility of shipping product (130a) to recipient (132b); or suggest alternative merchants or products instead. Often the system will be configured to try to optimize selection of merchants and products so that at least among cooperating merchants all enrolled in the system, merchants located closer to the recipient destination will often be given at least a higher weighting in the selection process.

Put alternatively, the product delivery time and location constraints can be viewed as imposing product delivery charge and surcharge information for certain delivery times and locations, relative that product's shipping location. Indeed, similar considerations and constraints also apply for product pickup as well. That is, the centralized database can also be configured to also link the product data to product pickup time and location constraints.

As previously discussed, in a preferred embodiment, this product data (usually for a plurality of products) will be stored in a centralized database (106). For convenience, often this product data (and other data as well) can be entered or updated (usually by the merchant or a designated agent of the merchant) using various methods, such as a web browser based administrator webpage (114) or mobile app (116) run on various types of computerized devices, and usually connected to the server (100) and centralized database (106) via a network connection such as an Internet connection (110).

For each dynamic section (see FIG. 2: 200, 204, 206) associated with a corresponding product, a computer processor (either located in a centralized server 100, or alternatively located in a different e-commerce website controlled by the centralized server 100, such as 102-M1a, 102-M1b, 102-M2a) will examine the product data, according to a time schedule (often calendar based) for those scheduled times (e.g. Valentine's day (220), all occasions, (222), Christmas (224)) that these various products are available. The system will generally also examine the available inventory for these products, or the various product components, as well.

If the processor and software determine if that a particular product has a scheduled time of availability, and if the product (or its various components) are also in inventory (usually the inventory of a particular merchant local to either the e-commerce customer-buyer or recipient), then the processor and software will configure the e-commerce website or websites to display these dynamic sections.

For example, in FIG. 2A, assume that a merchant has three potential products. Product 1 (200), (202) is a floral arrangement scheduled to appear around Valentine's Day. Product 2 (204), (206) is a floral arrangement that is scheduled to appear at all times. Product 3 (208), (210) is a floral arrangement that is scheduled to appear around Christmas. Here photographs of the products are shown as (202), (204), (206), and the dynamic sections (that contain the product data) associated with these products are shown as (200), (204), (208). Note that these dynamic sections generally exist as data structures in computer memory.

Although the term "dynamic section" is used to help convey the underlying data transfer mechanisms that may be used, note that there are alternative ways to structure this data in memory, and these specific examples are not intended to be limiting.

In this example, also assume that the merchant has the components of all three products (here the flowers and vases for all floral arrangements) in stock at all times. According to the invention, the system will examine the various dynamic sections associated with each product. When the system's time (calendar day) is around Valentine's Day, the system will determine that dynamic sections (200) and (204), but not (208) should be used to construct the e-commerce website page (230). When the system's time (calendar day) is around Christmas, then the system will determine that dynamic sections (204) and (208), but not (200) should be used to construct a somewhat different e-commerce website page (232). See FIG. 2B for a flow chart of this process.

Put alternatively, at the proper schedule times, and if the product is in inventory, the system will use at least some data (e.g. images 202, 206) from the dynamic sections associated with the corresponding e-commerce product on at least one web page of an e-commerce website (e.g. page 230), but otherwise not display data (e.g. image 210) from the non-scheduled or out of inventory dynamic sections (e.g. 208) associated with that corresponding e-commerce product.

Note that in this context, at least one webpage of the e-commerce website is also intended to cover cash register software point of sale web pages, such as cloud-based cash register software point of sale web pages.

Note that in some embodiments involving different but cooperating merchants, if merchant 1 does not have the product in inventory, his website may thus not (at least initially) not show that product, while the website of a different merchant in the system, say merchant 2 (M2) may show that product. However, if the e-commerce customer then identifies that the recipient has an address near the location of Merchant 2, the system may (in some embodiments) then start to automatically display products carried by Merchant 2 on Merchant 1's website. This optional scheme can be useful in order to encourage the customer to order the product without changing websites, and with minimal extra expenditures of the customer's time and energy. Merchant 1 and 2 can work out various fee split arrangements to handle this type of situation, and these fee splits can also be handled in an automated manner. Other automated systems and methods of informing the customer that merchant 2 is carrying the desired product may also be used.

Returning to FIG. 1, in typical use, an e-commerce customer, usually interacting with the website using a web browser (108) or app (112) run on an Internet-connected computerized device, will provide a product purchase request. This product purchase request will usually include a product identifier such as an SKU, as well as a requested delivery location and delivery time. Either the server hosting the website (e.g. 102-M1*a*), or often a server located on the centralized server (100), or a combination of the two will use at least one processor (e.g. computer processor, microprocessor) to determine a preferred shipping location for the requested product or products. The system will also examine the product delivery time and location constraints relative, to the shipping location of the product(s). The system will then use this information (e.g. requested delivery location and delivery time relative to the product shipping location to compute product delivery surcharges for the product(s). The system will also automatically display the product delivery charges and surcharges on the website as well. This way the e-commerce customer can make informed tradeoffs between cost of the product, and the impact of various delivery locations and times on shipping costs, before completing the purchase. A flow chart of this part of the process is shown in FIG. 2C.

In some embodiments, the system can also allow control over the product pickup times and locations as well.

Thus when the e-commerce customer (108), (112) purchases the product using the e-commerce website (e.g. 102-M1*a*), or e-commerce smartphone app connected to the e-commerce website/server, the system can use at least one processor (which may be located on (104) or (102-M1*a*), or both) to record the sale the product(s), the product shipping location, changes in product inventory data at the product shipping location as well as requested product delivery time and requested delivery location. In a preferred embodiment, this information will be stored in the centralized database (106).

Note that in general, when the disclosure speaks of e-commerce webpages, this should also be construed to cover e-commerce apps running on smartphones and other devices.

The system will also generally use at least one processor (which again may be located on either the centralized servers (100), or on other e-commerce web servers such as (102-M1*a*) to transmit notification of product sale to the e-commerce customer. Additionally, notice of the sale (along with the other relevant information such as shipping information) will also be transmitted to at least one computerized device associated with distribution of product from the product shipping location. Again using FIG. 1 as an example, if merchant 1 is shipping the product (130*a*) to recipient (132*a*), and the computerized devices (114), (116) are M1's computerized devices, then the notice of sale and shipping information can be transmitted to (114) or (116).

Thus in essence, many of the invention's systems and methods are as previously taught in parent provisional application 61/807,214, the contents of which are incorporated herein by reference. As before, a main part of the invention's systems and methods may be implemented by e-commerce web server software running on a cloud service (100) and a central database (106) comprised of one or more internet-connected web servers. The invention software may comprise website software and apps (102), a rules engine (104), and a multi-vendor product database (106). Customers (e.g. buyers) can interact with the invention's e-commerce system through various devices and methods, including using web browsers (108) running on various standard computerized devices connected to the server/cloud service (100) via the internet (110), and standard smartphone or tablet computer apps (112) running on standard smartphones and tablets (e.g. iPhone, Android devices, etc.) and connected to the cloud service (100) via a wireless interface and usually also via the internet (110) as well.

Merchants will usually also connect to the cloud service (100) via either standard web browsers or apps running on standard internet connected computerized devices (114). Often specialized web pages provided by cloud service (100) that provide an administrator panel (control panel) or interface for the merchant. As will be discussed, the invention also provides a system and method by which merchants can also quickly (within a few minutes) upload photos and descriptions of new products and add them to their e-commerce sites using apps running on standard smartphones or tablet computers (116).

FIG. 2C shows a simplified flow chart showing the data flow for some aspects of the invention. In this example, customers (260) can login to the merchant's e-commerce website by various systems and methods, including direct login and by other methods, such as logging in through various social networks such as Facebook. In some embodiments, the customer may also give the system access to the customer's friends list, thus allowing the e-commerce system to extract useful information pertaining to milestone events for friends, such as birthdays, and remind the customer of these events.

In some embodiments, the system can be configured to upload information pertaining to customer purchases to the customer's various social media sites such as Facebook, Pinterest, Twitter, and the like. Here, these uploads can be configured with backlinks to the system's e-commerce web server shopping cart so that a social media viewer, such as a friend of the customer, this friend interested in learning more about the purchase, can click the social media link and be brought into to the invention's e-commerce web server shopping cart.

By either login event, assuming that the customer is interested in using the system to purchase a gift, the customer can enter in the gift recipient's name and address (262).

In normal use, often the customer is working with a local merchant (originating merchant) website to complete the gift. However in the event that the gift recipient is too far away, then the merchant, in turn, may forward the gift information to a remote merchant who will then complete the transaction. Alternatively, and often in the case where a suitable local merchant is not available, the system may allow the user to directly select the remote merchant. In yet another embodiment (shown in FIG. 2C), the system may automatically (262) determine a suitable remote merchant (M2) (266), and automatically load the remote merchant's product data, shipping data, and other information (268) and display it on the website (270) without forcing the e-commerce customer to switch to the remote merchant's web site.

Thus there are various alternatives to handle out-of-area deliveries. The customer may use the invention's server or cloud-based service to manually request that the system find various preferred merchants within a certain radius of the recipient's address, or this can be done automatically. The system can then provide the customer with information pertaining to one or more various participating merchants within this geographic area. The buyer can then select products of interest and use the system's checkout function to purchase the product.

Put alternatively, as previously discussed in some embodiments, the system may handle a plurality of cooperating merchants (here exemplified again by merchant 1 and merchant 2 in FIG. 1), each carrying at least some common products or commonly configurable products (e.g. 130a, 130b).

In these embodiments, the system may be configured to transmit product purchase requests received from a first e-commerce website (103-M1a) under first merchant control by a first merchant (merchant 1) to a second e-commerce website (102-M2a) under second merchant control by a second merchant (merchant 2). Generally, this second e-commerce website (102-M2a) will be oriented (or run by) a merchant who serves a geographic area closer to the requested recipient delivery location (132b) than the geographic area served by the merchant that runs the first e-commerce website (102-M1a).

Since both merchants are fully participating in the system, each can be assumed to have previously uploaded the product data and product delivery time and location constraints for their respective locations to the centralized database (106).

Thus the system can use the product data and product time and delivery constraints uploaded by the second merchant, along with the product's requested delivery time and location, and compute the second merchant's price and product delivery charges and surcharges. The system can then display this second merchant (Merchant 2's) price and product delivery charges and surcharges Merchant 1's website (102-M1a), thus giving a potentially seamless way of working with Merchant 2. As previously discussed, the fee splits for this arrangement can also be handled by the system, so that Merchant 2's portion of a payment made on the Merchant 1 website (102-M1a) can be transferred automatically to Merchant 2 as desired.

Gift Cards

Figure 46:
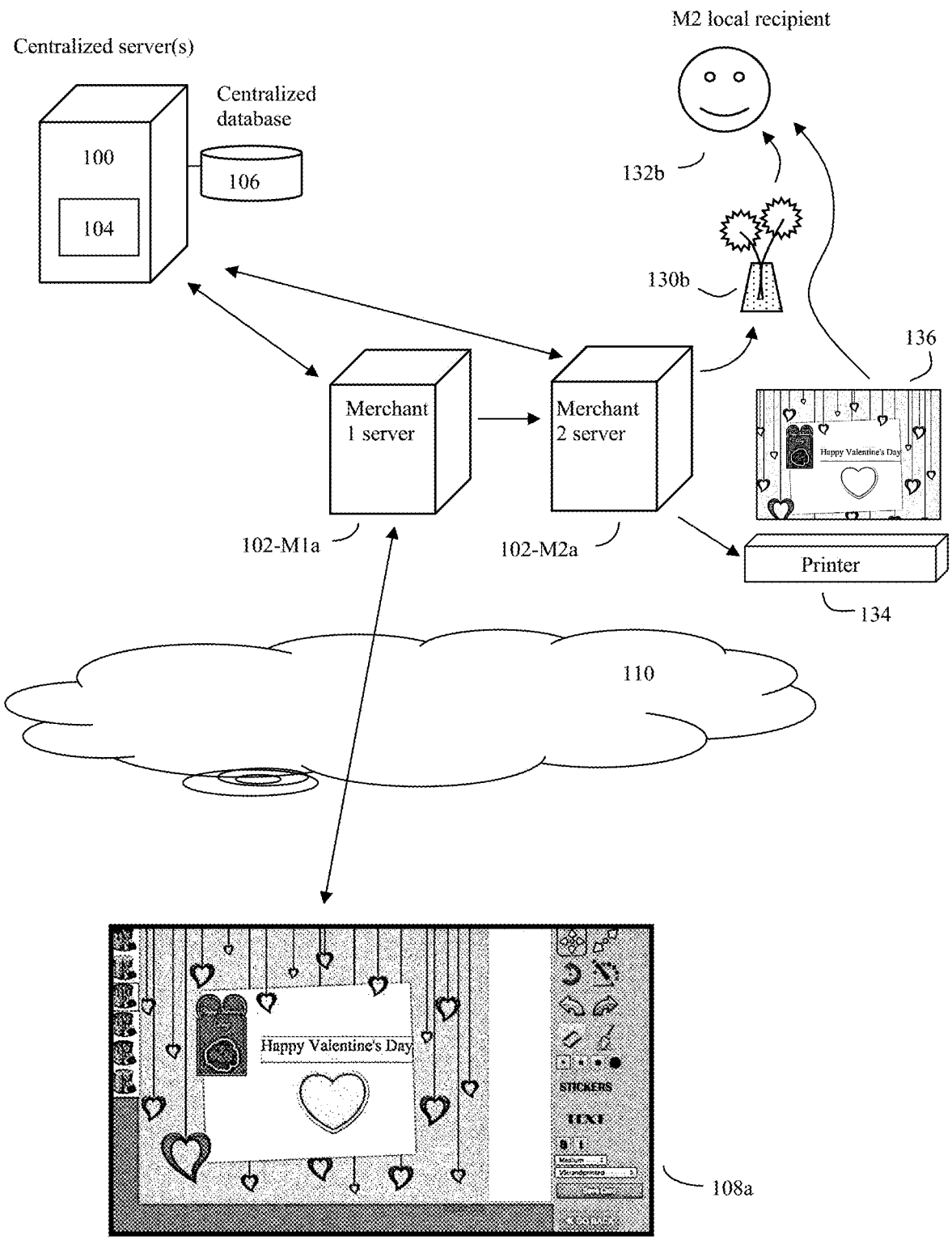
FIG. 46 shows an example of an e-commerce customer customizing the design of a gift card. The system then directs the remote merchant, who is responsible for delivery of the associated product, to print out and deliver the gift card along with the ordered product.

As shown in both FIGS. 2C and 46, in some embodiments, the system can also enable the customer to optionally (272) create customized gift cards, intended to be delivered to the recipient along with the customer selected product(s) (e.g. a bouquet of flowers with a custom gift card attached). Here the customer can, for example, design a gift card according to their own customized graphics, uploaded images, text, and hand (e.g. driven by the customer's mouse, or finger movement on a touch-sensitive screen) written drawings, script, and lettering. This may be implemented by various computer software graphical packages and tools with gift card interface (274) designed to be manipulated using the customer's computerized device. In one embodiment, these tools may be based on systems and methods previously discussed in U.S. patent application Ser. No. 13/441,781, the contents of which are incorporated herein by reference. See FIG. 46 for more information.

When the customer then purchases (276) the product and the associated gift card, the delivery merchant can then print out this handmade customer generated card and deliver it to the recipient along with the product/gift (278).

Upon payment processing, in some embodiments, the system can then send an order to the cloud server (100) that contains the necessary information pertaining to the originating merchant, remote merchant, product information, promotional details, and the like.

Note that although it is contemplated that the bulk of the sales will be done by customers interacting with the system using web browsers and apps using their network connected computerized devices, in some embodiments, it is also useful to provide a point-of-sale interface to allow the merchant to conduct the sale as well. This can be helpful, for example, for when customers call or email, or for customers that may be showing up in person at the merchant's store or other facility.

In a preferred embodiment, this point-of-sale interface can also be web-based, either as part of the administrator control panel or as a different web interface. Here again, it is often useful to have this point-of-sale work directly with the centralized database (106) as well.

For such point-of-sale interfaces, it is also useful to further provide, often as part of the product data, various types of product sales recommendation information that is associated with at least some of these products. Thus, for example, the point-of-sale interface can be configured to enable a merchant (or authorized clerk), to also provide this product sales recommendation information when the merchant is using the point-of-sale system. This product sales recommendation information can be short text messages such as "We are short on red flowers and have a surplus of yellow flowers, please recommend yellow flower arrangements" or other data intended to remind or guide the merchant or clerk while operating the point-of-sales system. The merchant or clerk can then discuss various possibilities with the client, and then enter the relevant purchase data directly into the system via the point-of-sale interface. Thus the point-of-sale interface will generally be a superset of the e-commerce customer interface, in that it may also show some business proprietary or confidential information that might not normally be available to the average e-commerce customer.

Figure 3:
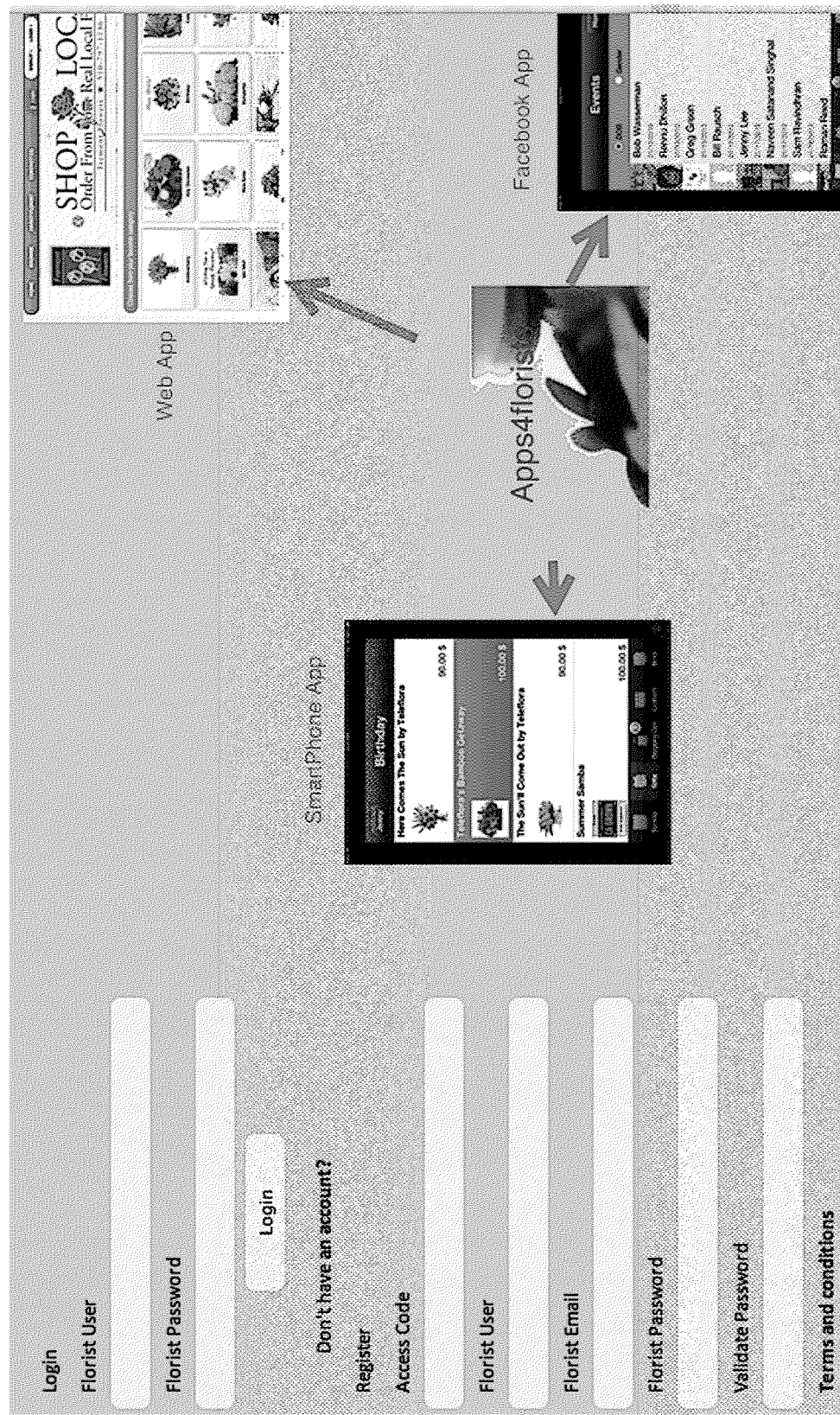
FIG. 3 shows the e-commerce system' merchant administrator "finder" screen, which can function as the system login page for the centralized server and database. The merchant will often interact with the invention's server software via the merchant's web browser, which in turn will allow the merchant access to the various control panel (administration panel) web pages by which the merchant can configure and administer the merchant's particular e-commerce site.

To set up the system, merchants will generally login to the administrator interface (114). This login process is shown in FIG. 3. FIG. 3 shows the finder screen, which is the system login page. In this example, the login page is also showing a brief graphic overview of the various merchant options that the system may make available to the merchant.

Returning to FIG. 1, in some embodiments, customers (e.g. 108) may use a merchant's (booking merchant's) e-commerce website (102-M1a) to order a product for delivery outside of the merchant's (here merchant 1's) service area. Here, as previously discussed, the system can be configured to examine the recipient address and recommend one or more other merchants (such as merchant M2) that have service areas that cover the recipient's address.

In the case where these remote merchants are participating in the system, then the system can automatically show the remote merchant's product data and delivery data and transmit orders directly to the other merchant's computer system. Here, for example, Customer (108)'s order can best be filled by merchant 2, who runs his own participating e-commerce server (102-M1a). The order information can thus be transmitted automatically (usually using a computer network such as the Internet) between merchant 1 and merchant 2 either using network connections to the centralized server(s) (100) and database (106), or directly between their respective e-commerce servers (102-M1a) and (102-M2a). The system can also automatically apply previously negotiated fee splits to this process so that merchant 1 receives a booking commission, and merchant 2 receives its part of the fees as well.

In the event that the customer specifically elects a non-participating merchant, then the system can be designed with a manual order transfer process so that non-participating merchants may also be handled, at least with manual intervention.

Figure 4:
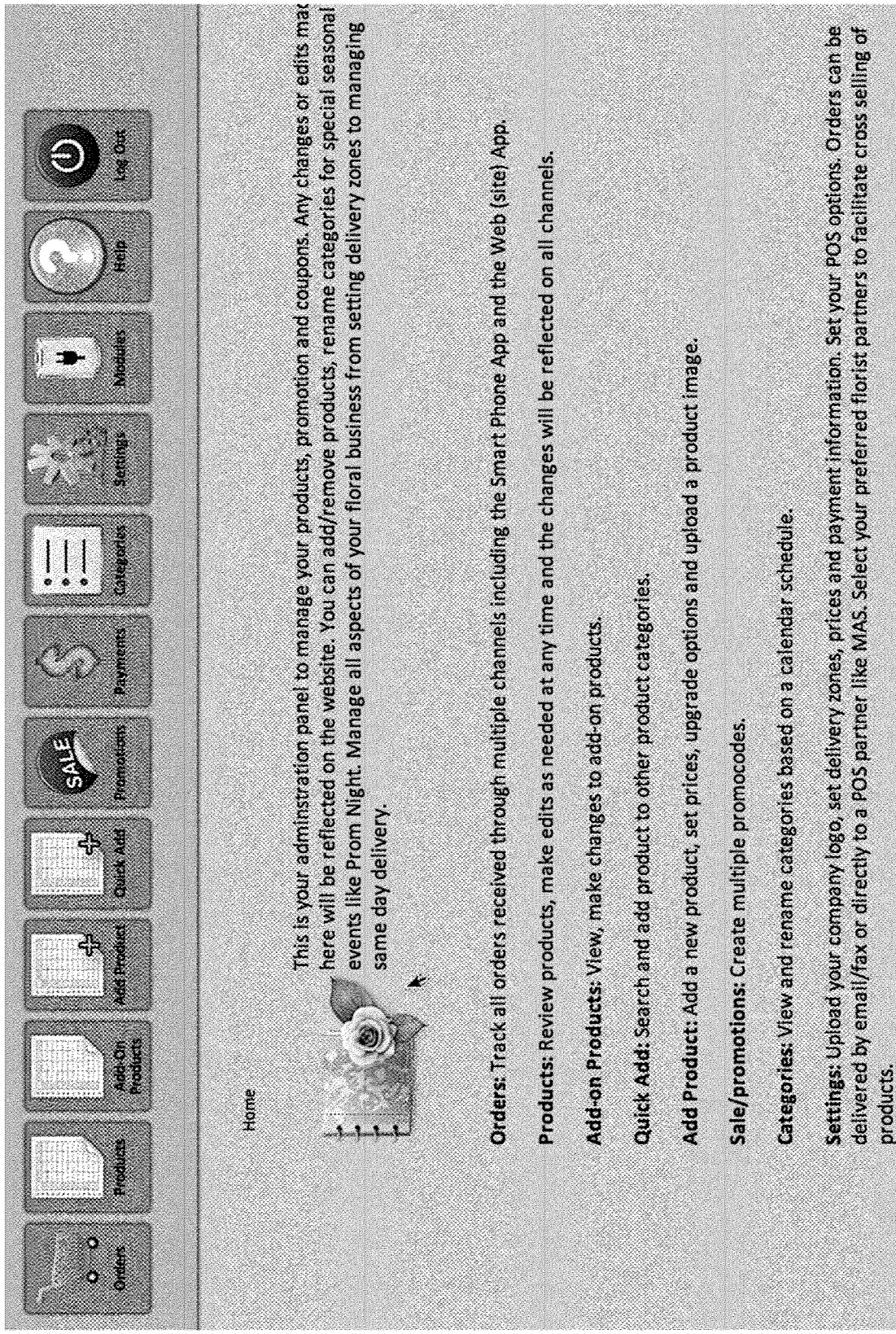
FIG. 4 shows the administration panel. This administration panel allows the merchant to access various functions such as managing orders, products, add-on products, quickly add products, set sale or promotional activities such as promo codes, view and rename categories, set up the merchant's website, and other functions.

FIG. 4 shows the merchant administration panel or interface (114) in more detail, and also explains the various system functions that are available. As previously discussed, this administrator panel allows the merchant to access various functions such as managing orders, products, add-on products, quickly add products, set sale or promotional activities such as promo codes, view and rename categories, set up the merchant's website, and other functions. Note that in some embodiments, this administration panel may also include a cloud-based point of sale system. Such cloud-based point of sale systems can also be configured to implement the various embodiments of the present disclosure.

Figure 5:
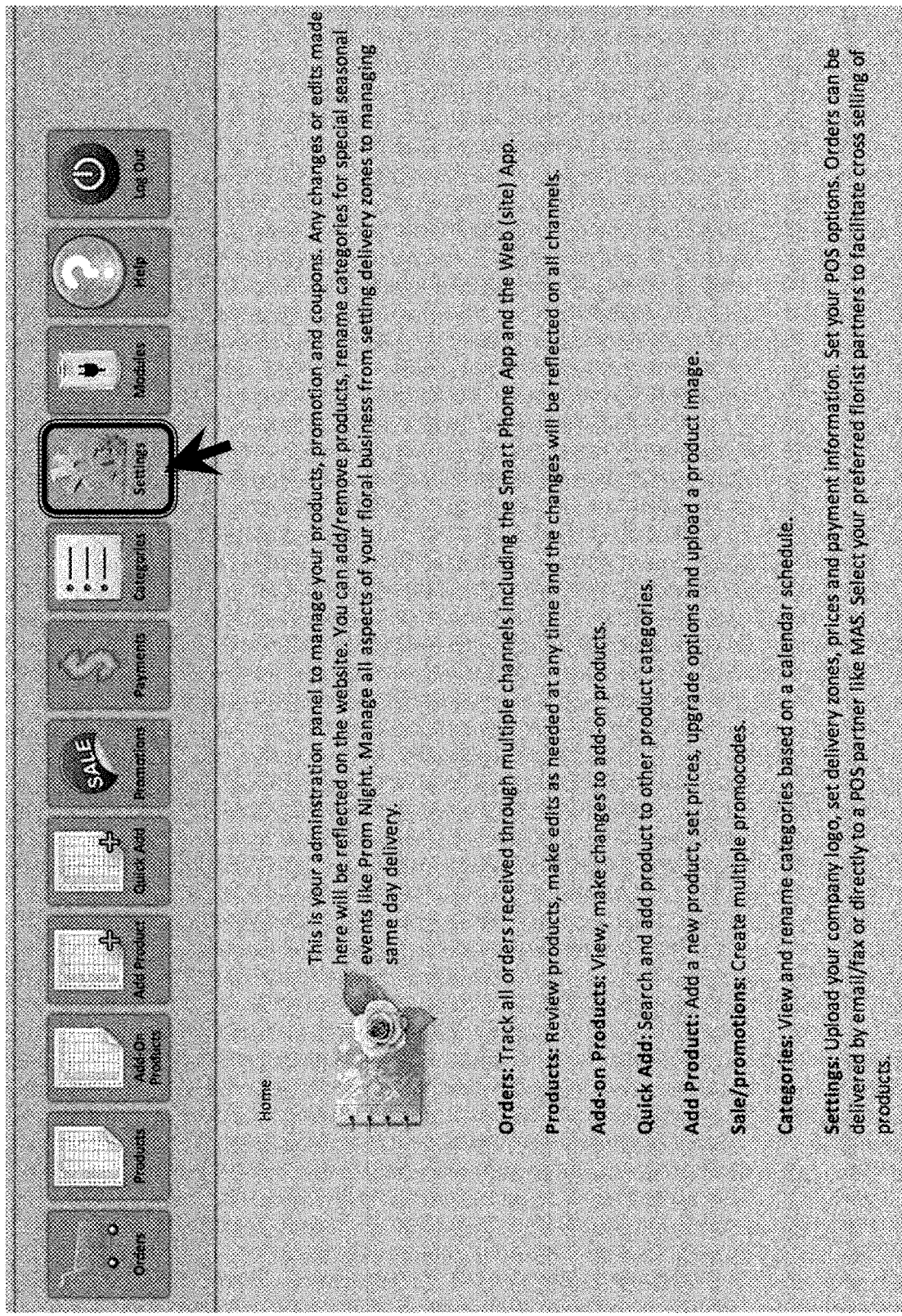
FIG. 5 shows how the merchant can select the settings functions to initially setup the merchant's e-commerce website. The merchant can upload the merchant's logo, set delivery zones, set prices and payment information, and set various point of sale (POS) options. The system also allows the merchant to select if orders can be delivered by email or fax or directly to a point of sale partner such as MAS. The system also allows the merchant to select preferred partners to facilitate cross-selling of various products.

FIG. 5 shows how the merchant, usually on initial setup, can select the settings functions to upload the merchant's logo, set the merchant's delivery zones, set prices and payment information, and set various point of sale (POS) options. The system allows the merchant to select if orders can be delivered by email or fax or directly to various point of sale partners such as FTD, Teleflora, MAS (MASdirect, Dallas Tex., a provider of point of sale/order entry software for the floral industry) and the like. For florist applications, the system also allows the merchant to select preferred florist partners to facilitate cross-selling of various products. This option will be discussed in more detail shortly.

In some embodiments, the invention may also be used to optimize the delivery schedules of either the merchant or the merchant's selected preferred florist partners. On any given day, flower shops usually get various different orders to deliver to various addresses. Here at least one of the invention's server's, such as the centralized database server (100) can also be configured to optimize these deliveries according to delivery geographic region (delivery zone, such as zip code, city, street, and the like). For example, deliveries can be clustered according to delivery zone, as well as delivery priority, so as to make for faster and more efficient delivery. This whole process can be automated, for example by using various "traveling salesman optimization algorithms", so that the delivery driver can receive turn-by-turn directions that are optimized for that day's delivery schedule.

To facilitate such "traveling salesman optimization" algorithms the system's server may optionally make use of third-party mapping servers provided by third party mapping services, such as Google Maps, Apple Maps, Here Technologies location services (previously a division of Nokia), and the like.

In some embodiments, the system may also be configured so that the delivery driver can take a picture (e.g. by using a smartphone and a version of the system's mobile app configured for delivery drivers) of the package (e.g. flower arrangement) as delivered, upload it to the system's server, and the system can electronically transmit a copy of this delivery picture to the original customer (buyer) who ordered the delivery, along with an optional delivery signature as well. This way the buyer can see, on an almost instant basis, exactly what the package (flower arrangement) looked like at the time of delivery, as well as other information such as time of delivery. The buyer can then optionally also use the system to give feedback ("Hey, those flowers were wilted!") back to the merchant or florist partners as desired.

Alternatively, the system can be configured so that the merchant or the partner florist can take a picture or video of the package (flower arrangement) before shipment, and send it to the buyer as well. Such before and after delivery photos can also help the merchant or florist problems detect delivery problems (e.g. excessive heat during transport is causing damage) as well.

Here the system can automate this process on the server side, as well, as previously discussed, provide a delivery driver app, or delivery driver options on the system's standard e-commerce app, to implement the above process.

Figure 6:
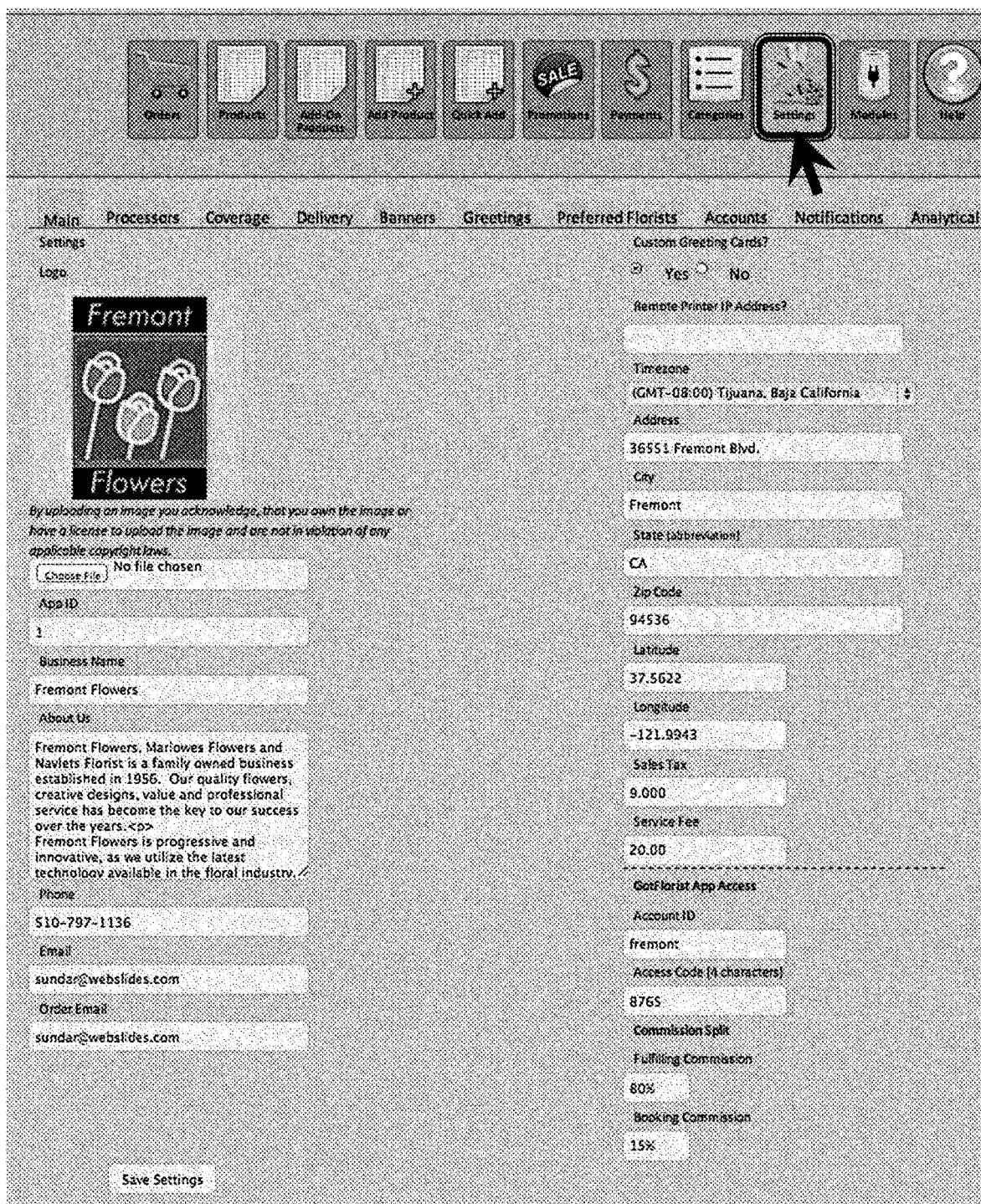
FIG. 6 shows how the merchant can use the system settings to specify the merchant's logo, enter in the merchant's business name, description, contact information, address, and various standard fees and commissions.

FIG. 6 shows the merchant using the system settings to specify the merchant's logo, enter the merchant's business name, description, contact information, address, and various standard fees and commissions.

Figure 7:
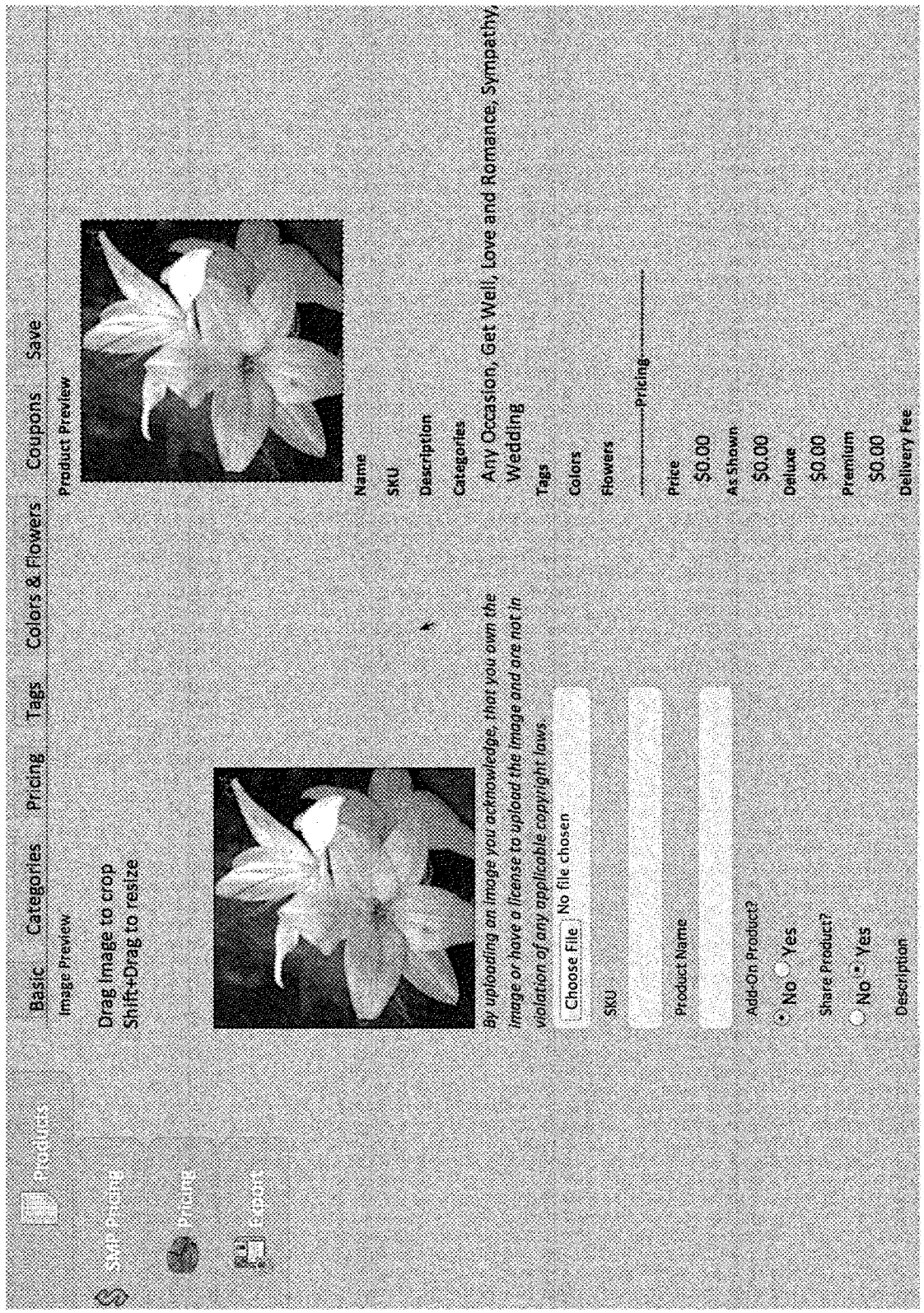
FIG. 7 shows how the merchant can use the system to further edit the images and other descriptions for a particular product.
Figure 8:
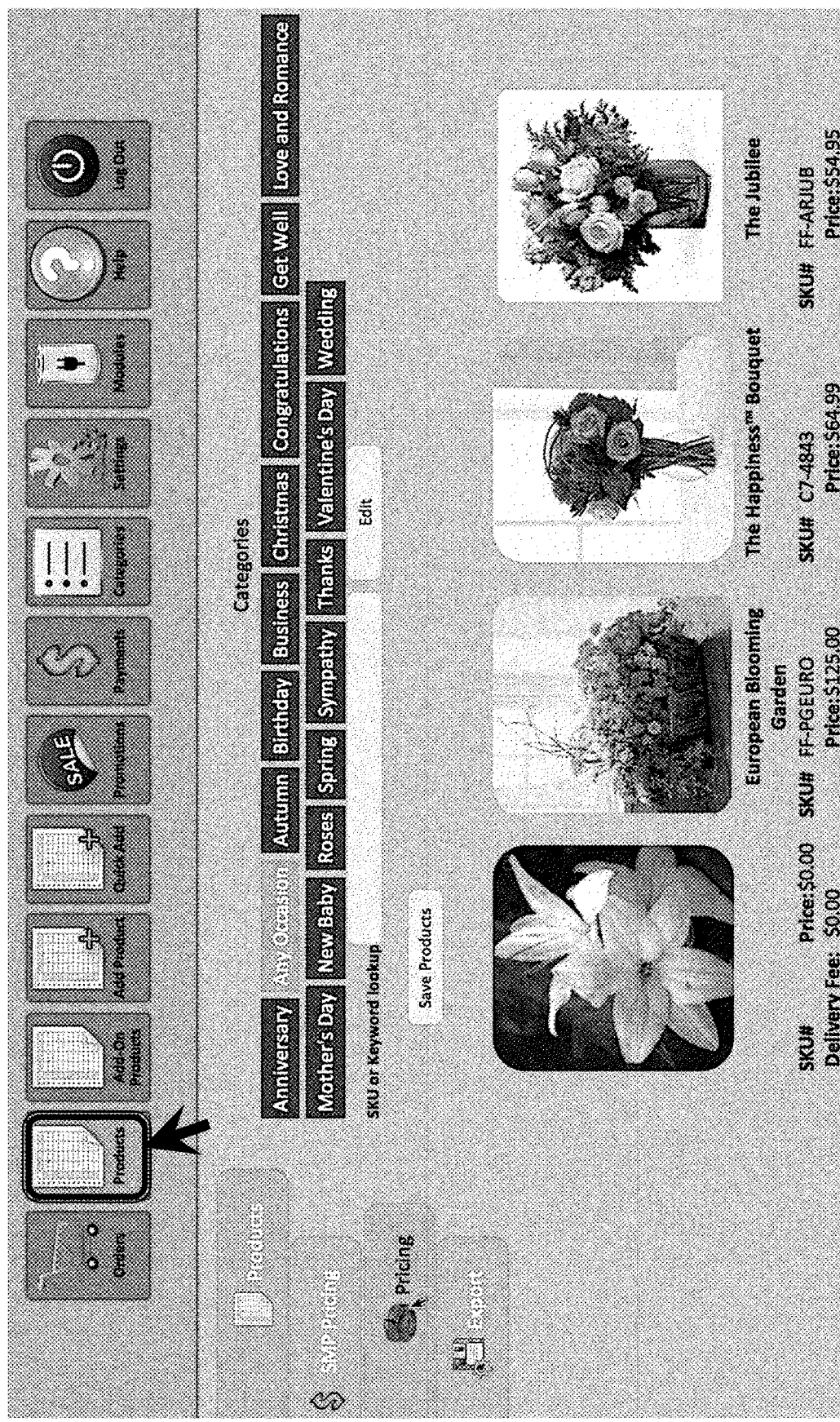
FIG. 8 shows the merchant now selecting a product pricing option.
Figure 9:
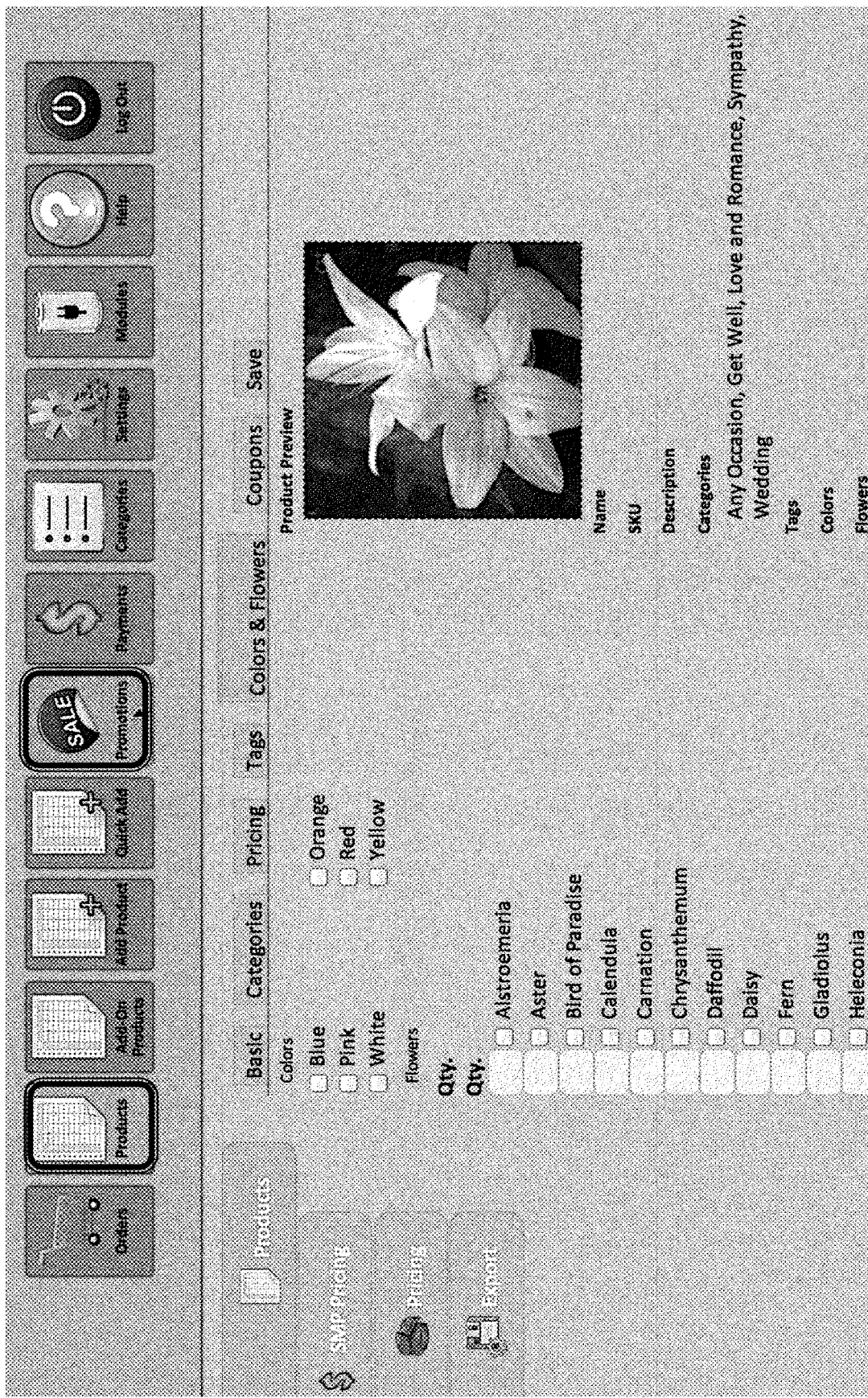
FIG. 9 shows how the merchant can use the system to describe the product (here a product arrangement) in more detail, and also set various sales and promotions.

The merchant can also enter product information directly through the administration panel (114) as desired. FIG. 7 shows how the merchant can use the system to further edit the image, video, and other descriptions for a particular product. Additionally, as is shown in FIG. 8, the merchant can also enter in product pricing information and options through the administrator panel (114) as well. The merchant can use the interface to enter in quite detailed product information, as needed. For example, as shown in FIG. 9, the merchant can show the exact flowers used in a particular flower arrangement.

Calendar or schedule based automatic website updates: As previously discussed, the invention is based, in part, on the insight that for many local merchants of perishable products, a large fraction of the purchases are predictable from a calendar time standpoint. This especially true when delivery is part of the purchase, and when the products may be gifts. In particular, many purchases are based on important secular or religious holidays, such as Christmas, Hanukkah, New Years, Valentine's Day, Chinese New Year's, Easter, and the like.

During these times, in addition to updating the website to provide various calendar or schedule specific products, it is often also useful for the merchant to at least partially customize other portions of the e-commerce website for the occasion. This can be done using various banners and also various products or services related to these events. However, doing this manually is very time-consuming.

However because these events can be predicted in advance, and have a known sequence and duration, in addition to automatically updating the product mix to fit the occasion, the invention can also automate other calendar-based web customizations as well. This can include both function and appearance customization. Both can be done using the previously discussed schedule driven calendar. Automated schedule driven appearance customization, for example, can be done using rapid banner customization tools that allow the merchant to automatically update the merchant's e-commerce website to switch its appearance according to a predetermined time schedule. Thus the merchant's e-commerce website can remain automatically current throughout the year with a minimal need for updating.

By contrast, most merchant e-commerce websites in use today are static. However the gift industry, for example, is largely based on standard occasions—mother's day, father's day, Valentine's Day, Christmas, Thanksgiving, prom week, graduation day, and so on. These are typically the times when customers purchase flowers and other gifts for others, and these times, in turn, are driven by a calendar schedule.

Thus, for example, a local florist, knowing that prom week is coming up at a local high school, may have an incentive to update the florist's web site (e.g. various graphical banners on the website, and the like) to promote floral arrangements appropriate for a prom. Although, by using prior art techniques, some small merchants have the time, expertise, and resources to do this, others do not.

The invention provides a server platform upon which the merchant can easily create a calendar based rules engine where the calendar date, in turn, drives changes in the merchant's website. For example, the merchant, knowing that valentine's day falls on February 14 of every year, and that Christmas falls on December 25 of every year, can design in advance e-commerce site graphics (e.g. banners) and optionally products for these occasions, enter them into the calendar based rules engine. The rules engine will in turn automatically update the appearance of the merchant's website with graphical elements (e.g. banners) and optionally event specific products with no further effort on the merchant's part.

Thus in this embodiment, the centralized database (106) or other databases, such as other e-commerce specific databases) can also store various event specific notices such as the e-commerce site graphics, text banners, and the like. Additionally or alternatively, the product data can also have various types of event-specific product data. Thus as an example, during the schedule times of product delivery (e.g. Valentine's Day, Christmas, etc.), the system's processor can also configure the website to display these various event specific notices (e.g. banners & other text or graphics). Generally, it will be desirable to schedule these event-specific notices during those times when event specific products are available, of course, and the system may be designed to generally synchronize these products and notices. However if for some reason, a merchant desires to supply Halloween products during Valentine's Day, the system may also be designed to accommodate non-time synchronized scheduled products and event specific notices as well.

On a functional level, other functions, such as product pricing, and delivery fees, may also be time varied according to a previously entered schedule, may also be done using these systems and methods.

Figure 10:
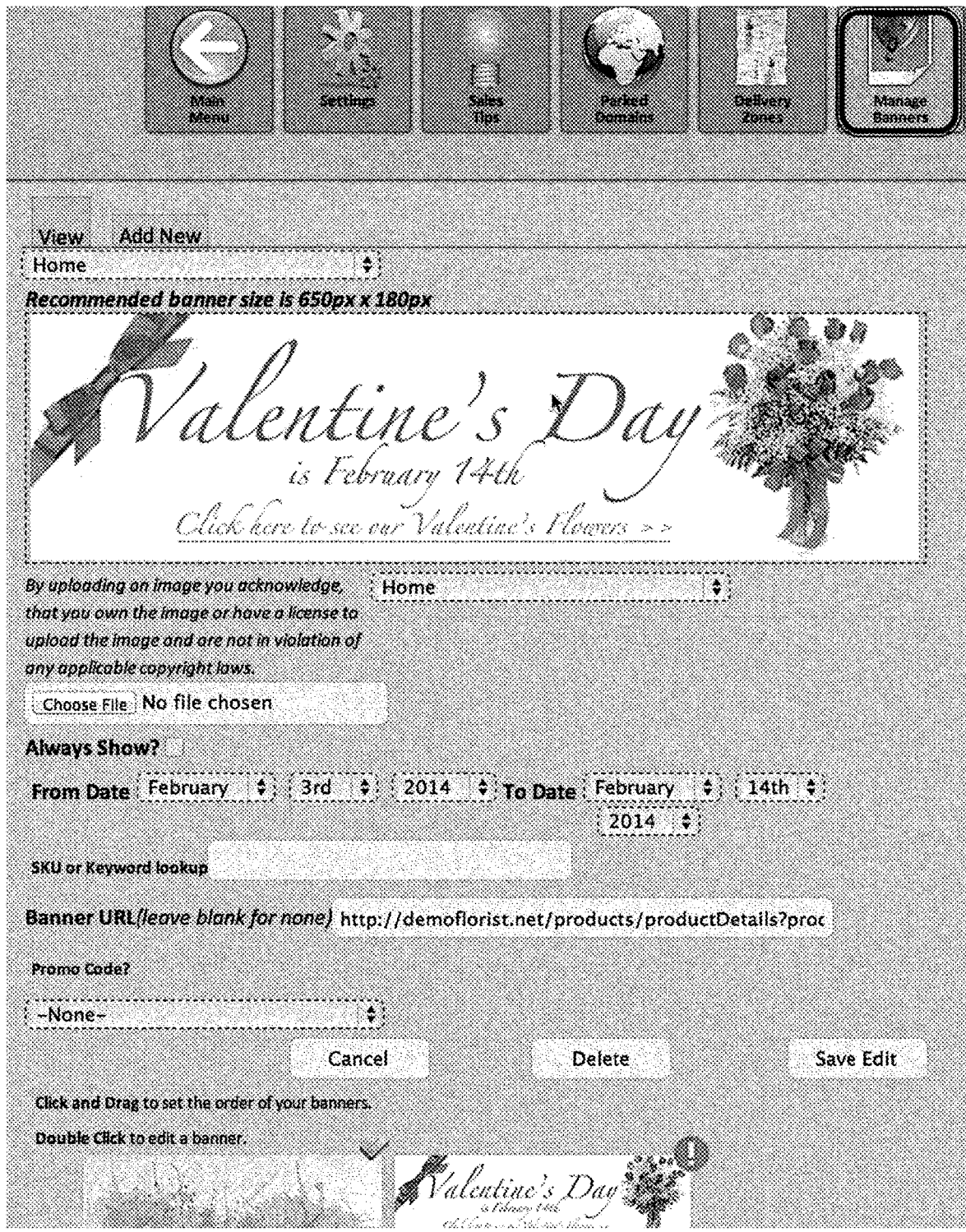
FIG. 10 shows how the merchant can use the system to quickly and easily produce various advertising banners that may be displayed on the website according to various predetermined schedules.

FIG. 10 shows how the merchant can use the system to quickly and easily produce various advertising banners that may be displayed on the website according to various predetermined schedules.

Figure 11:
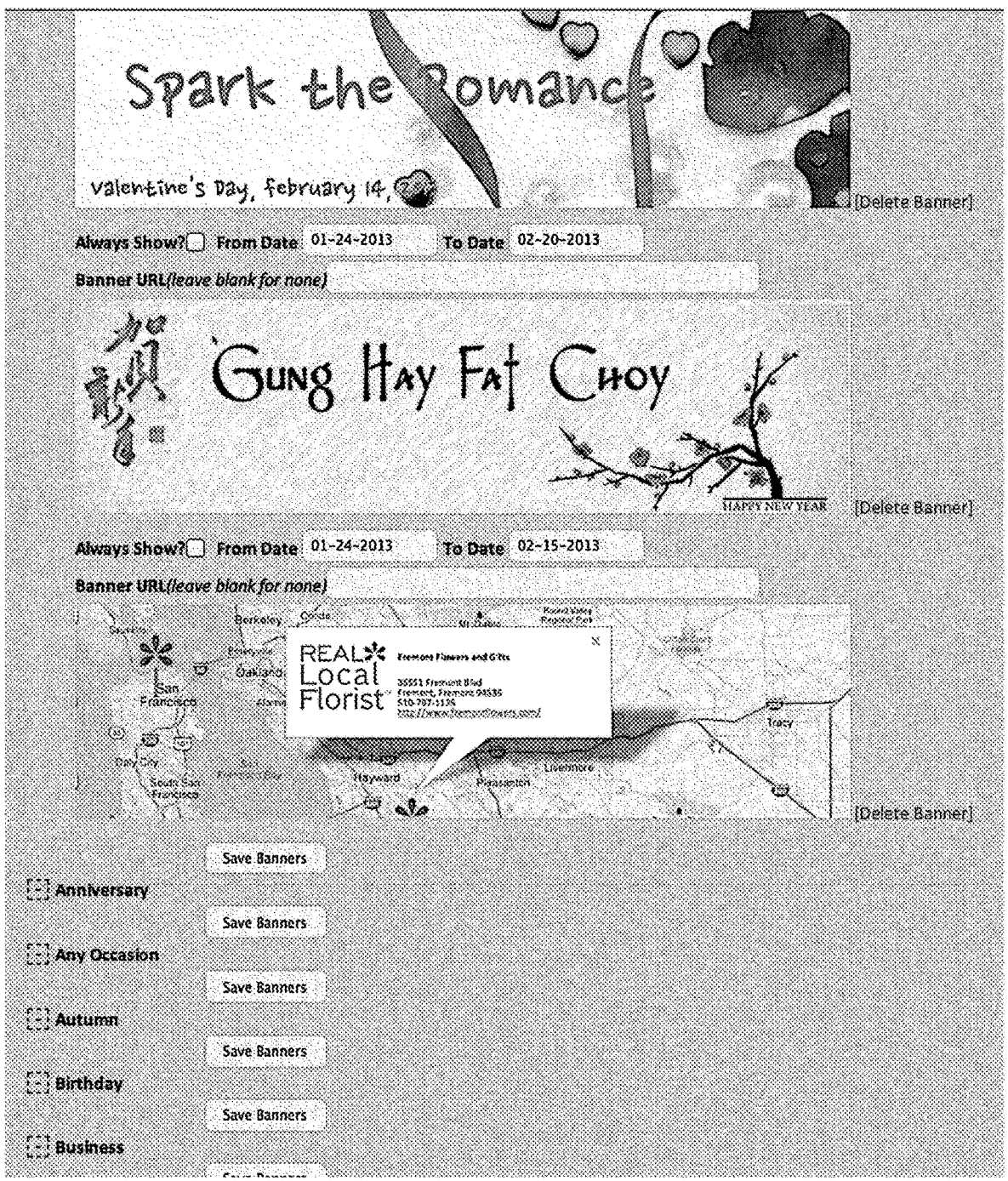

FIG. 11 shows how the system may store a variety of different merchant designed banners, and automatically switch to showing various banners on various days of the year. Here, for example, the system shows a Valentine's Day banner on Valentine's Day, a Chinese New Year banner around the time of the Chinese New Year, and so on.

Figure 12:
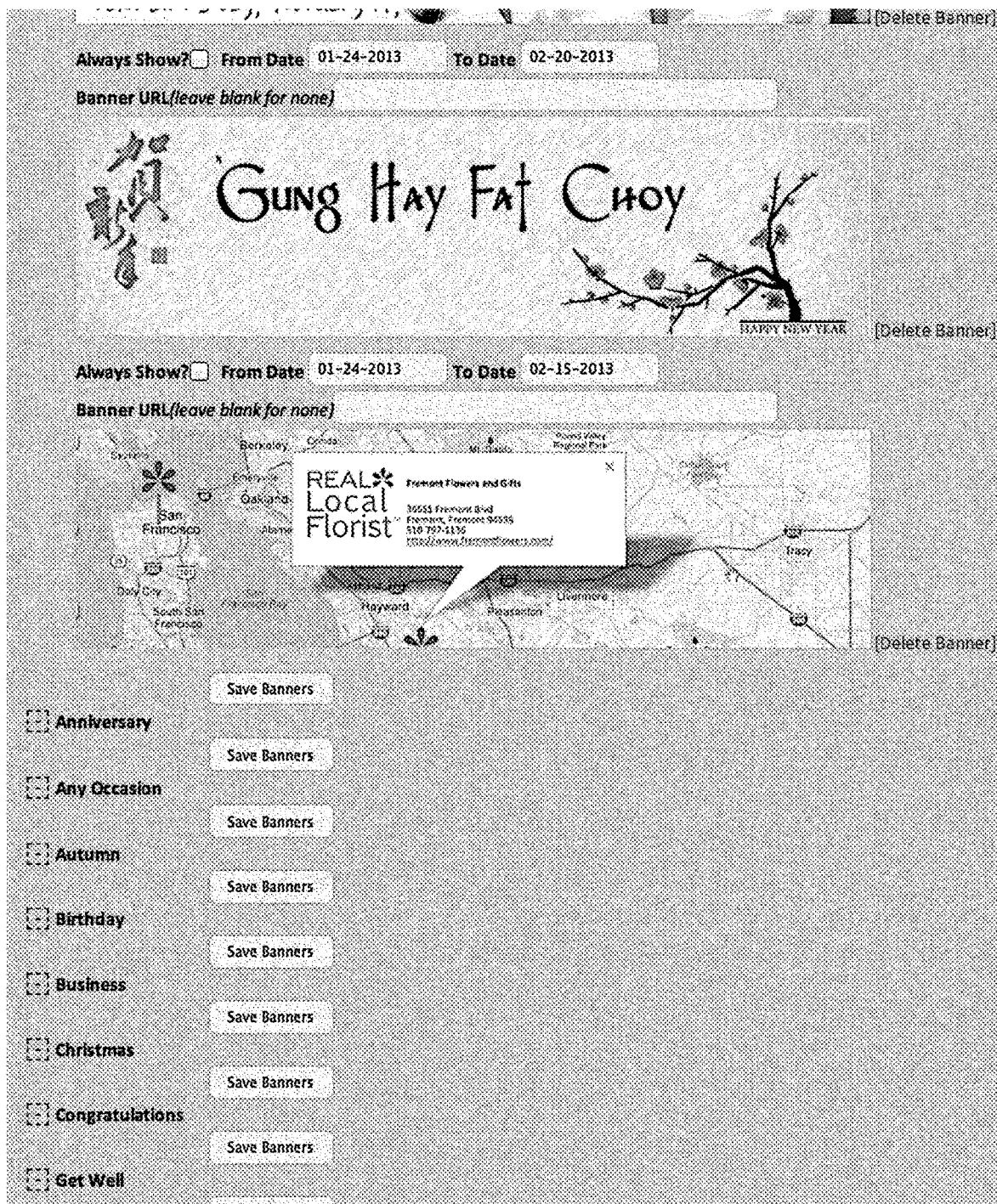
FIG. 12 shows how many different types of banners may be entered into the system and configured to automatically display at various dates and times.

FIG. 12 shows how many different types of banners may be entered into the system and configured to automatically display at various dates and times.

Figure 13:
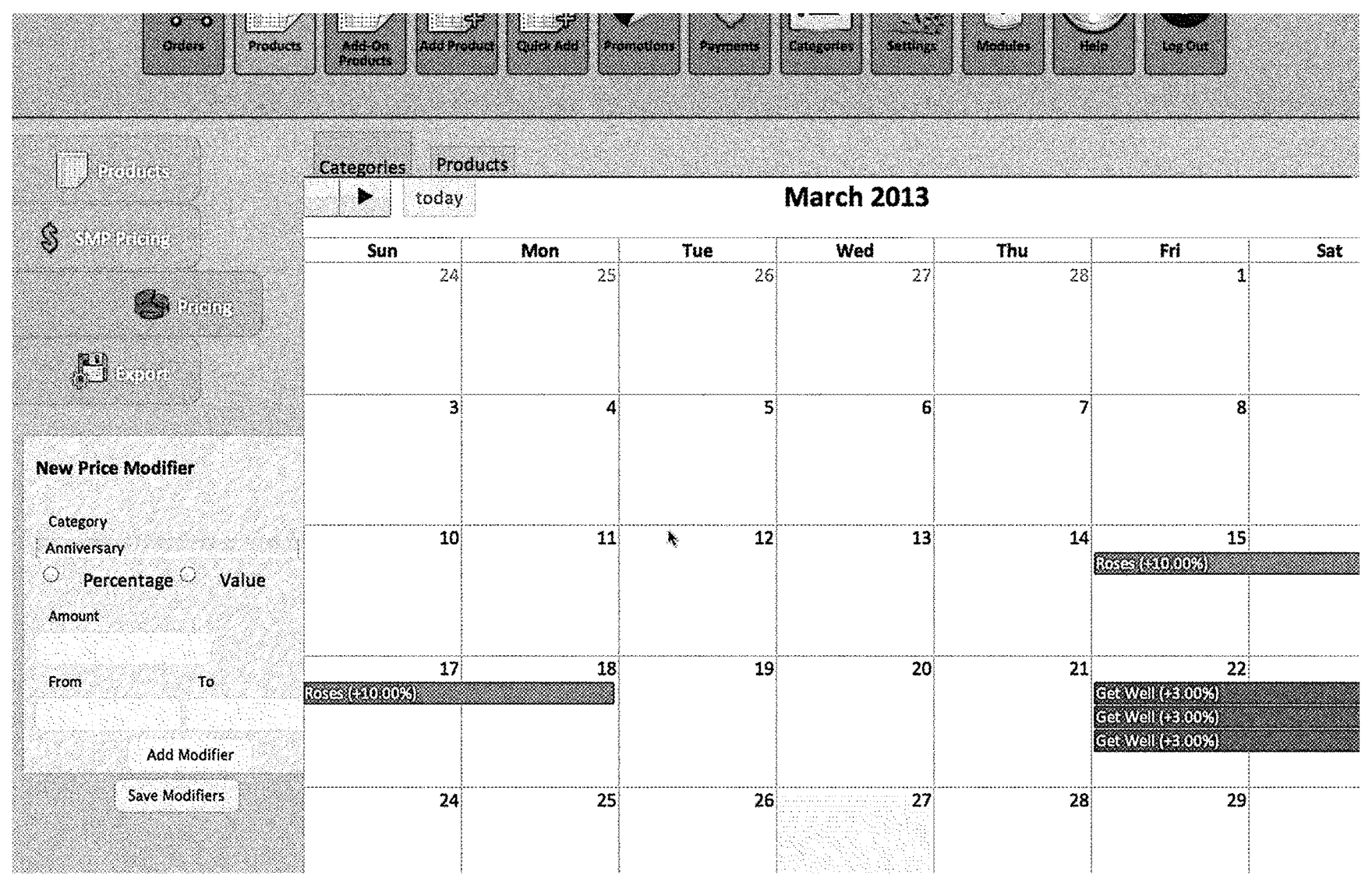

FIG. 13 shows how the merchant can modify the price as a function of date using the system's calendar function. Here the price of roses is altered by 10% right after Valentine's Day.

Figure 14:
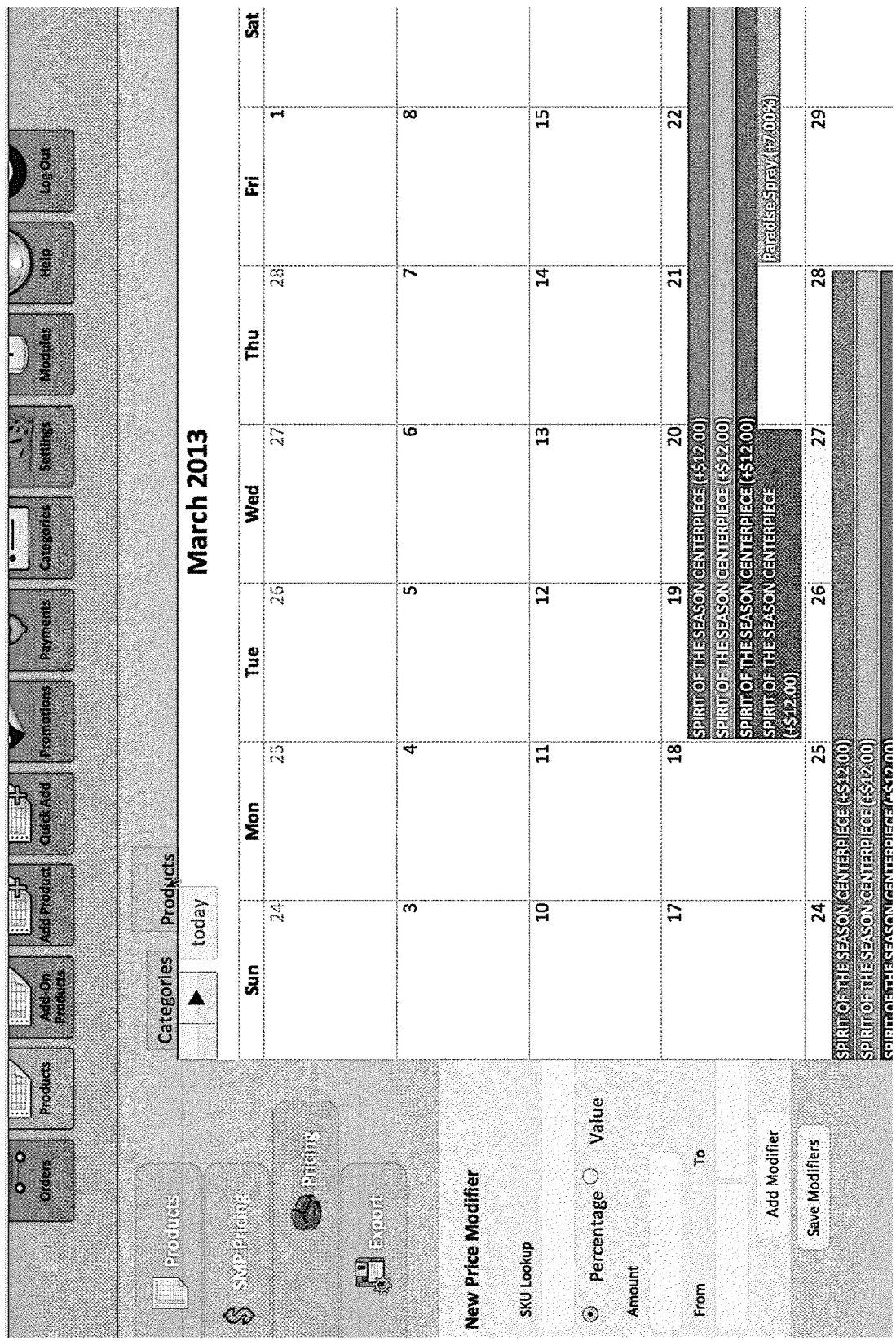
FIG. 14 shows the merchant adding other calendar sensitive pricing modifications to the calendar for various products.

FIG. 14 shows the merchant adding other calendar sensitive pricing modifications to the calendar for various products.

The invention can further provide various graphical editing tools, either as previously discussed in U.S. patent application Ser. No. 13/441,781 incorporated herein by reference, or other tools, to allow the merchant to easily customize these banners as well. Here, for example, the merchant can simply use a web browser to upload a base image, type in the merchant' text script, edit with the system's graphic editing tools as needed, and create a new banner which can then be added to the merchant's e-commerce site.

Thus the invention provides a calendar (schedule) based engine where the calendar or other schedule can drive changes in the website on an annual basis. More than one type of calendar can be used—for example in addition to the standard Gregorian calendar, other calendars appropriate to the merchant's market, such as lunar calendars, various religious calendars, and the like can also be used.

Other embodiments of the invention provide other types of features as well. Some of these other features include more precise time, day of the week, and location-based delivery cost estimations that can more accurately compute true merchant delivery costs in advance, and pass this knowledge to the customer so that the customer can make more accurate determinations as to what delivery options are most appropriate for the customer's needs and budgets.

Sophisticated delivery cost estimation engine: As previously discussed, the invention is also based, in part, on the insight that particularly with regards to local delivery; often the merchant's delivery costs are highly variable depending on the day, time of day, and exact geographical location of the merchant and the recipient. Prior art e-commerce services do not sufficiently keep track of such costs, with the results that, for example for the florist industry, a florist that has had to accept an order with an unrealistically low delivery cost may be tempted to at least partially recoup the extra delivery costs by substituting a cheaper product, such as a less expensive bouquet, to the mutual dissatisfaction of everyone. The invention further provides a high level of customization that allows the merchant to precisely dial in these time and location variable delivery costs, and factor these costs in for the purchaser, so that the purchaser can make intelligent purchasing decisions that reduce the incentive make up for unrealistic delivery costs by substituting lower quality products.

Such a feature can be important because local merchants who also deliver their products have to contend with many different issues. Although prior art systems often based delivery fees on merely the distance traveled, in fact, the problems are more complex than this. For example, in addition to distance, location and time of day are also major factors in delivery expenses. For example, the time required to deliver a product in a city can vary greatly depending on if it is rush hour or not.

As another example, if a florist gets an order and gets a $10 delivery fee to deliver to downtown San Francisco in the financial district at 10:00 AM, the florist will usually have to send two people in a car. One person drives the car and circles around the block while the other delivers the flowers. So the merchant will end up spending $30-$40 for this $10 delivery fee. So on a transaction basis, using prior art methods, the florist will lose money on the deal unless the florist substitutes a lower cost and inferior product to at least partially recoup the delivery fee losses.

To better cope with issues like this, the invention can allow the merchant to designate certain geographic areas and times as being extra fee cases. Further, the invention's delivery fee determination algorithms can also take into account other factors such as fluctuations in gas prices, merchant's expected overall profit margin on the deal, distance, location and the like to more realistically calculate true delivery costs and make this information available to the purchaser at the time of purchase. This way, for example, a purchaser may decide that rather than paying a huge amount to deliver flowers to a recipient located in the San Francisco financial district during rush hour, the recipient might rather send a fancier bouquet of flowers to the recipient's suburban home address at some time other than rush hour. By exposing true costs on the merchant's e-commerce website, more intelligent decisions can be made, and overall satisfaction of all parties involved can be improved.

Figure 15A:
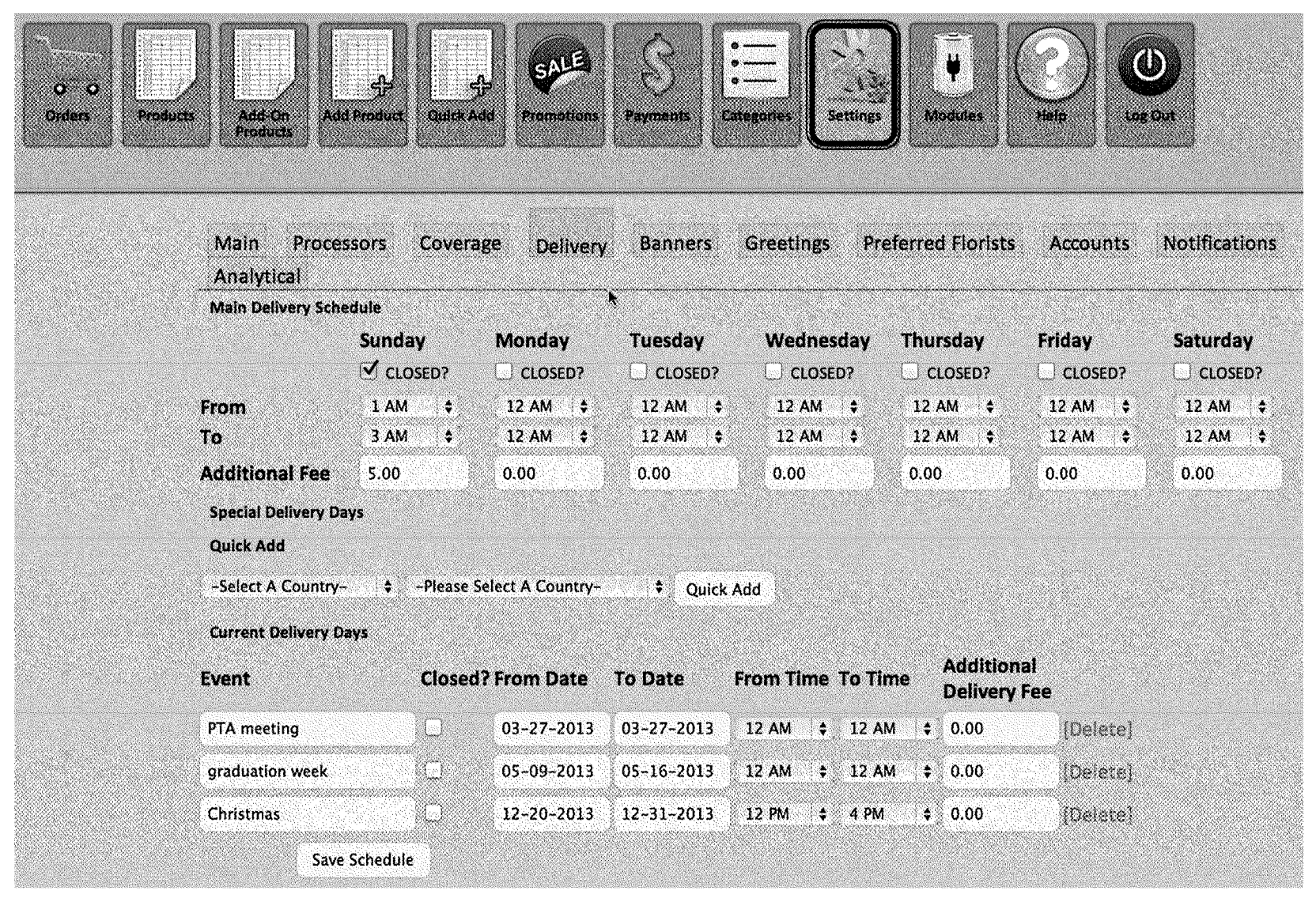

FIG. 15A shows how the merchant use the system settings to specify the merchant's days and times of standard delivery service, as well as extended days and hours of delivery service for additional charges.

The timed delivery rules are also schedule driven for Holidays/events.

In some embodiments, the system may be configured so that any of the product data, and the product delivery time and location constraints, and/or other business rules can be varied according to calendar event dates such as repeating (or even one-time) holidays and various time predictable events.

Figure 15B:
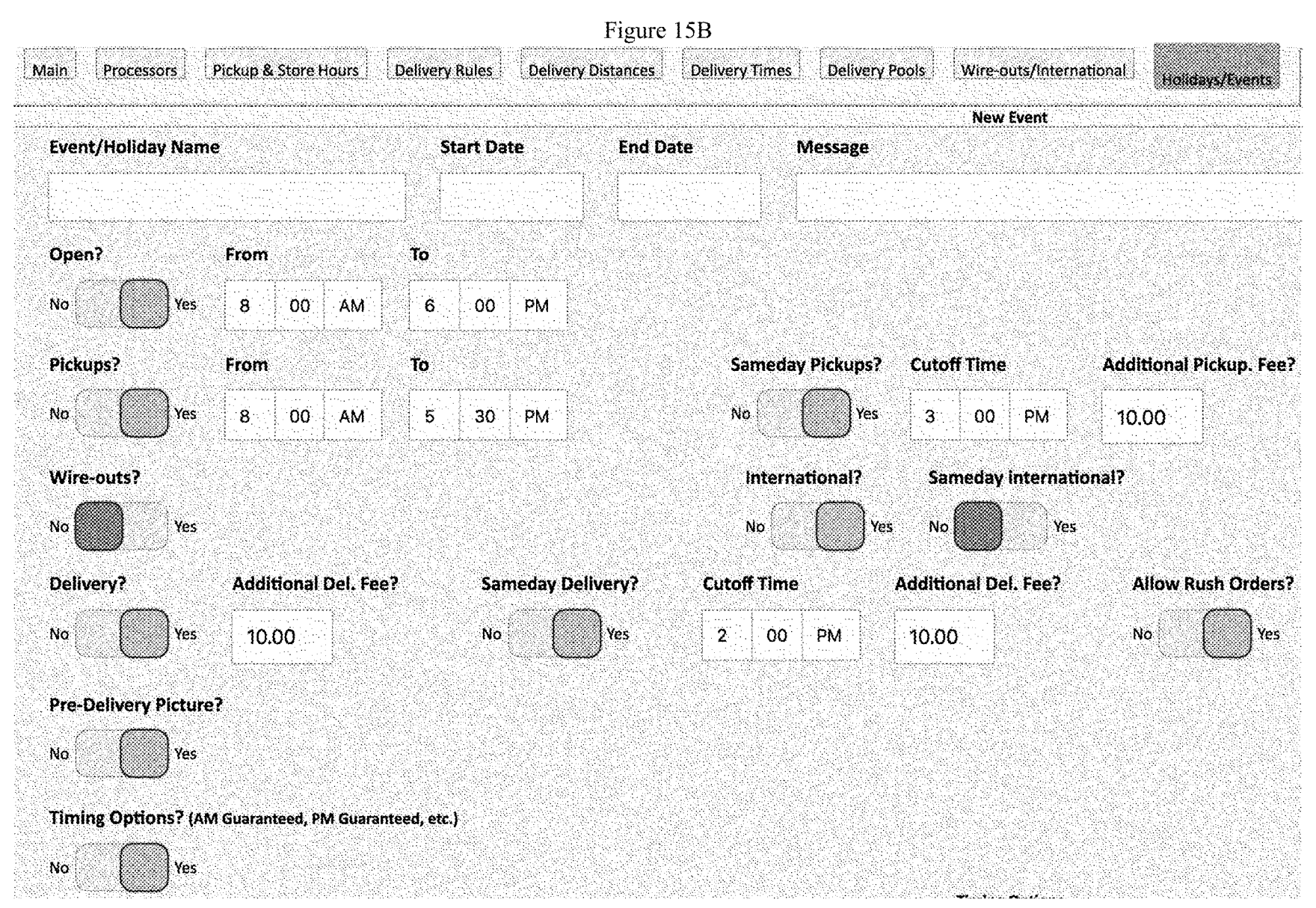
Figure 16:
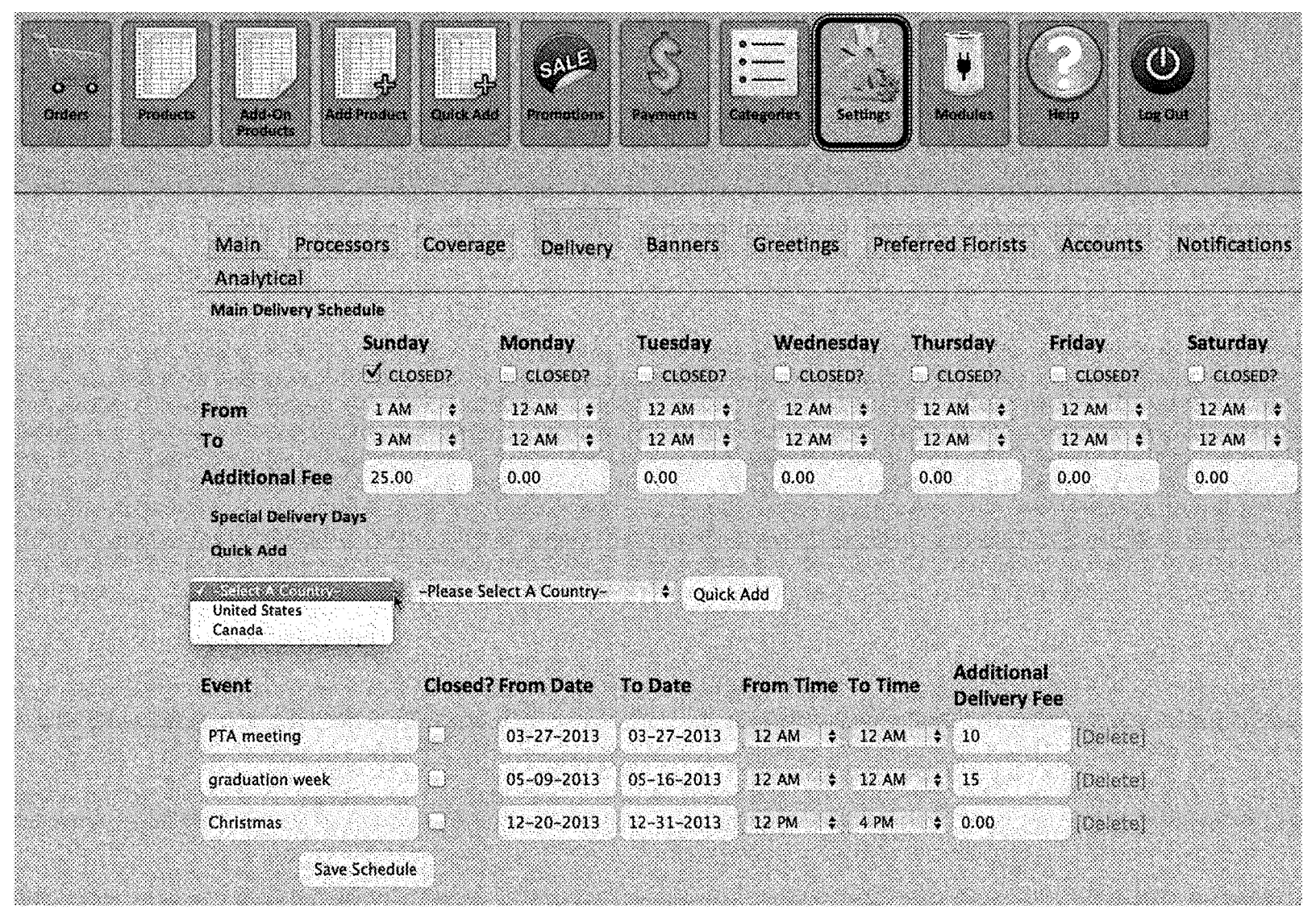

FIG. 15B shows a more specific example of the system's ability to vary the merchant's standard business rules according to various holidays and other time-predictable events. In FIG. 15B, the system is providing a user interface allowing the merchant to vary the merchant's standard business rules, such as if the merchant is open, hours of business, is the merchant willing to do pickups (and if so hours when this is available), merchant's acceptance of wire-outs, merchant services such as delivery (and if so if there is a delivery surcharge), same-day delivery options, willingness to do pre-delivery pictures, same-day pickups (and if so, hours of availability and any pickup surcharges), availability of international or same-day international services, ability to accept rush orders, ability to guarantee delivery in the morning or afternoon and the like. In addition to restricting or putting extra restrictions on standard services, the system and user interface may be also be configured to allow the merchant to enable new options, such as extra delivery services or delivery locations, extended hours, discounts, and the like according to these various holidays and other time-predictable events FIG. 16 shows how the merchant can also select countries or other geographical areas of service (e.g. US/Canada) using a pull-down menu.

Rapid addition of new products to the e-commerce site using smartphones and e-commerce assistance apps: As previously discussed, the invention is also based, in part, on the insight that many local merchants are creative and innovative individuals who often have both the desire and ability to come up with various creative variations on otherwise standard products. However, due to the cumbersome nature of present-day e-commerce systems, the burden on the local merchant to customize the merchant's website to adequately showcase what otherwise might be a spontaneous creation tends to inhibit this creativity. For example, again using the floral industry as an example, a local florist may come up with a creative and cost-effective new floral arrangement in a few minutes, but if the burden of advertising the new floral arrangement on the florist's e-commerce website is hours of work, then that new floral arrangement will never see the light of day. In another embodiment, the invention utilizes modern smartphone or mobile computerized tablet technology to provide easy to use apps that, in conjunction with the invention's calendar oriented server-based platform, allow such a merchant to create a new product listing, complete with photographs, in a matter of a few minutes.

Figure 17:
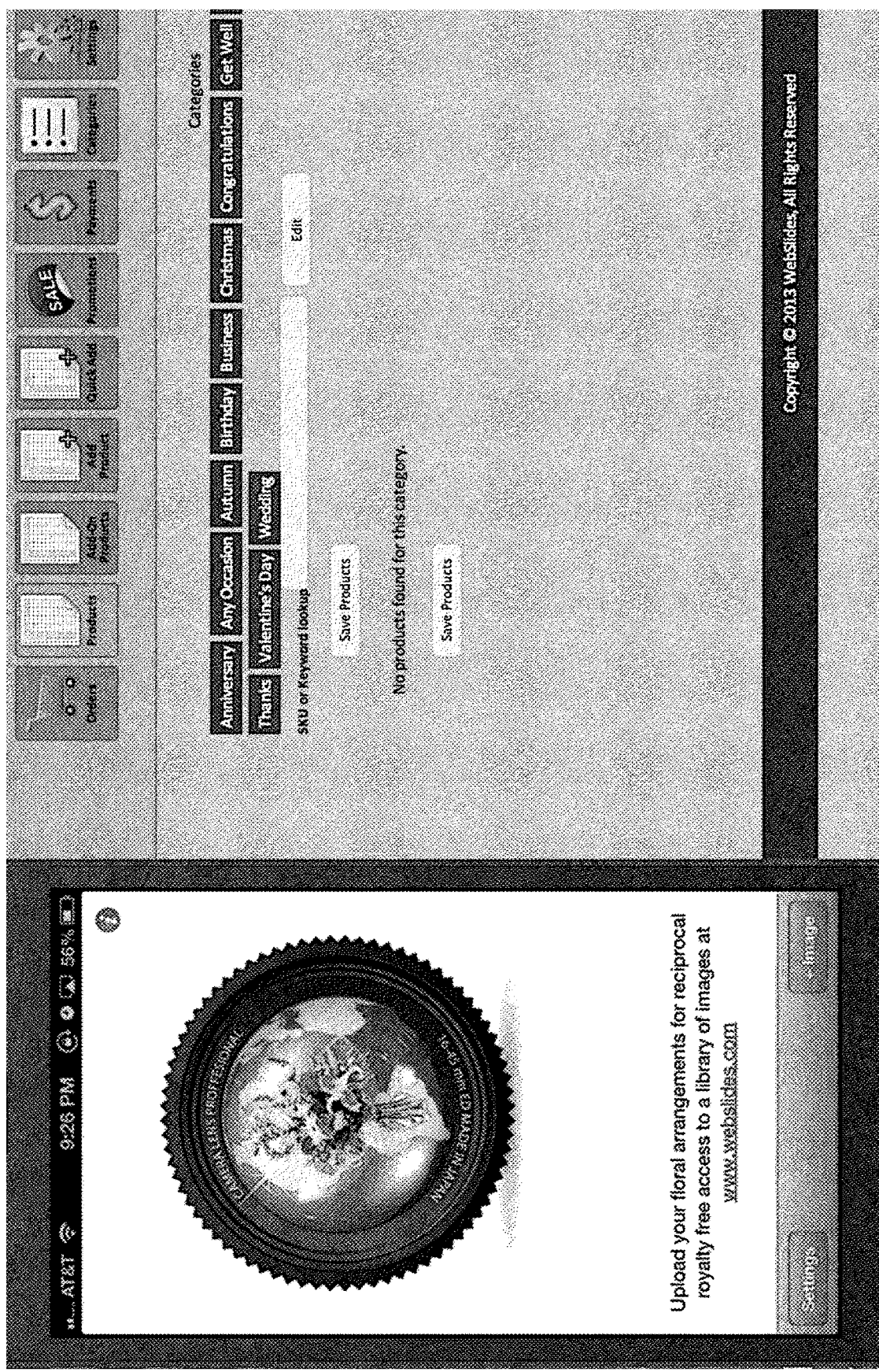
FIG. 17 shows how the merchant can use a smartphone or tablet app to photograph a product (such as a floral arrangement) and quickly upload the photo to the invention's e-commerce system. There the uploaded product photo can be rapidly incorporated into the merchant's online e-commerce site. Here the user is initializing the smartphone app.
Figure 18:
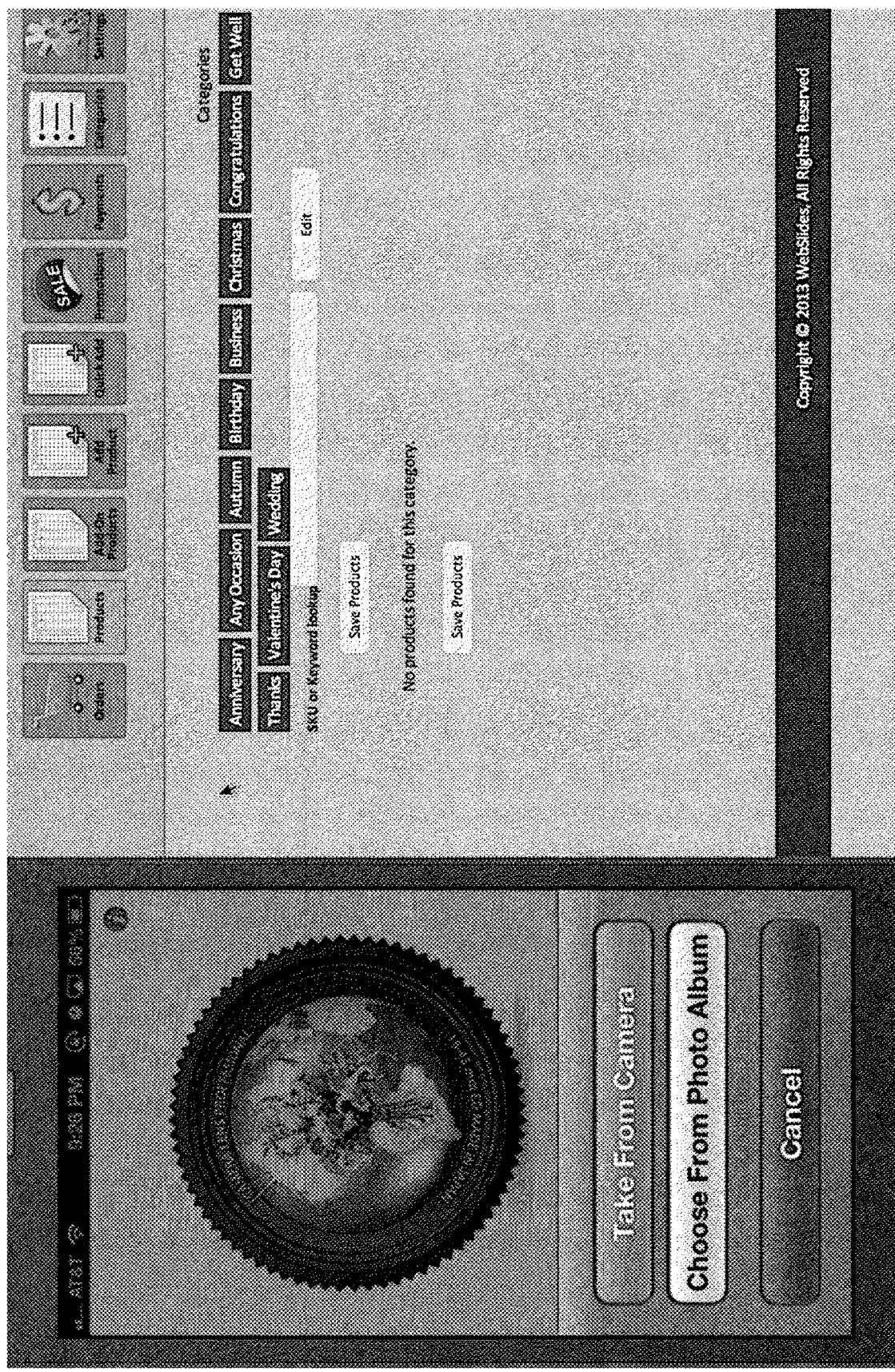
FIG. 18 shows how after the merchant has taken several photographs of the product, the merchant can then use the app to choose which photos to use from the smartphone or tablet's photo album.

FIG. 17 shows how the merchant can use a smartphone or tablet app to photograph a product (such as a floral arrangement) and quickly upload the photo to the system where the uploaded product photo can be rapidly incorporated into the merchant's online e-commerce site. Here the user is initializing the smartphone app FIG. 18 shows how after the merchant has taken several photographs of the product, the merchant can then use the app to choose which photos to use from the smartphone or tablets photo album.

Figure 19:
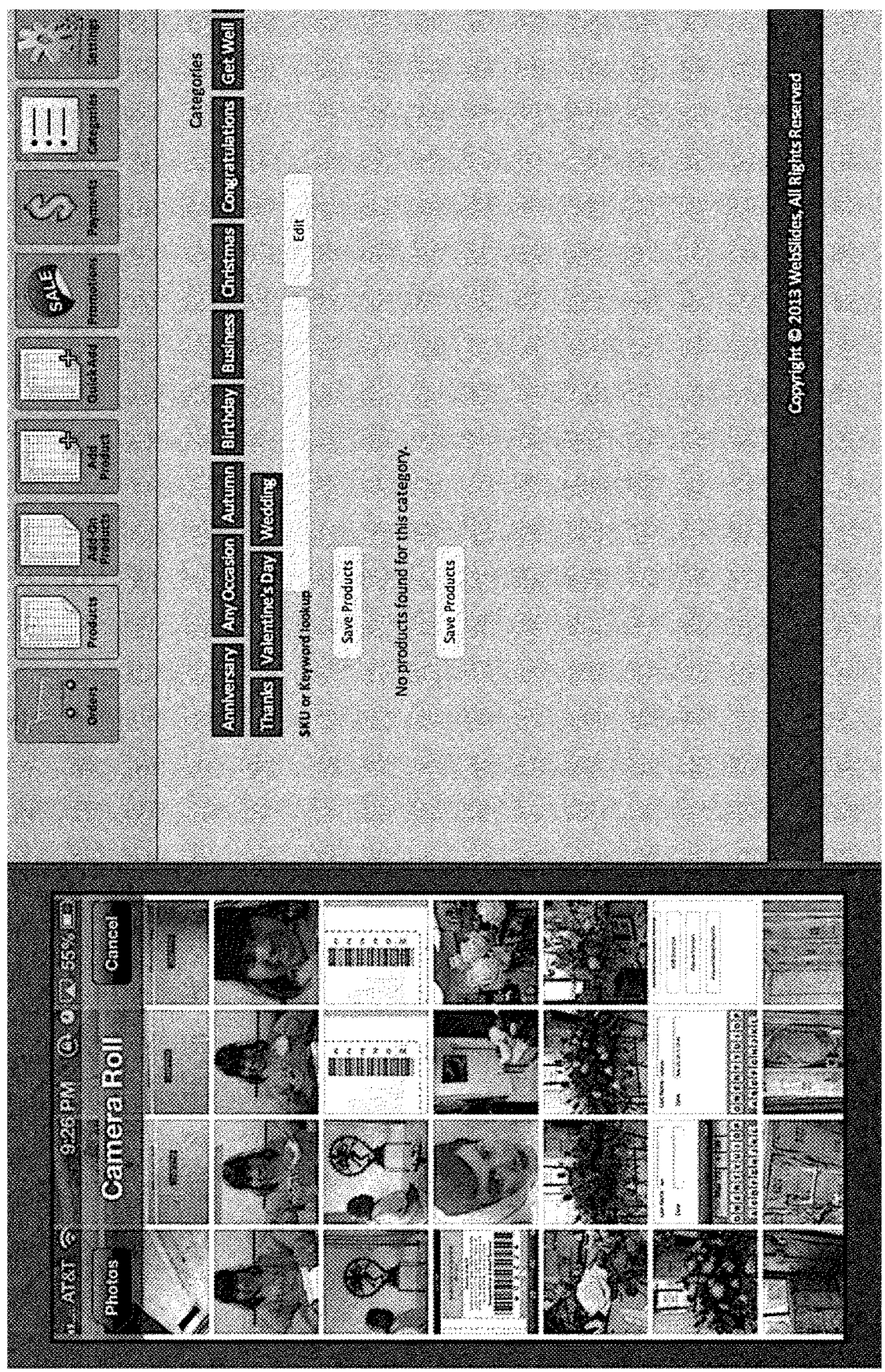
FIG. 19 shows the merchant looking through the smartphone's or tablet's photo album to find the best photo to upload for that particular product.

FIG. 19 shows the merchant looking through the smartphone's or tablet's photo album to find the best photo to upload for that particular product.

Figure 20:
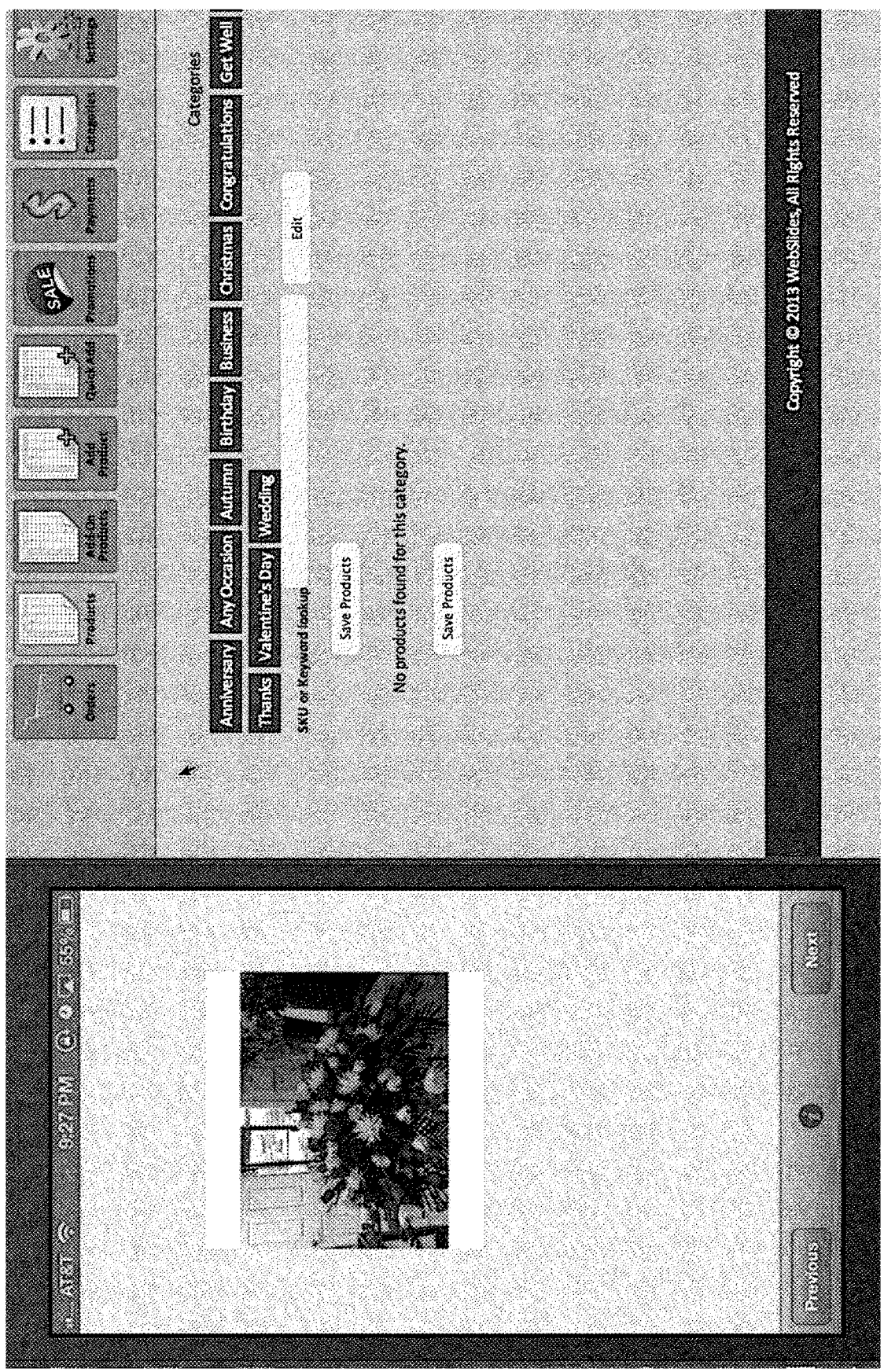
FIG. 20 shows that the merchant has selected the best photo from the photo album, and now can upload it to the invention's e-commerce system.

FIG. 20 shows that the merchant has selected the best photo from the photo album, and now can upload it to the system.

Figure 21:
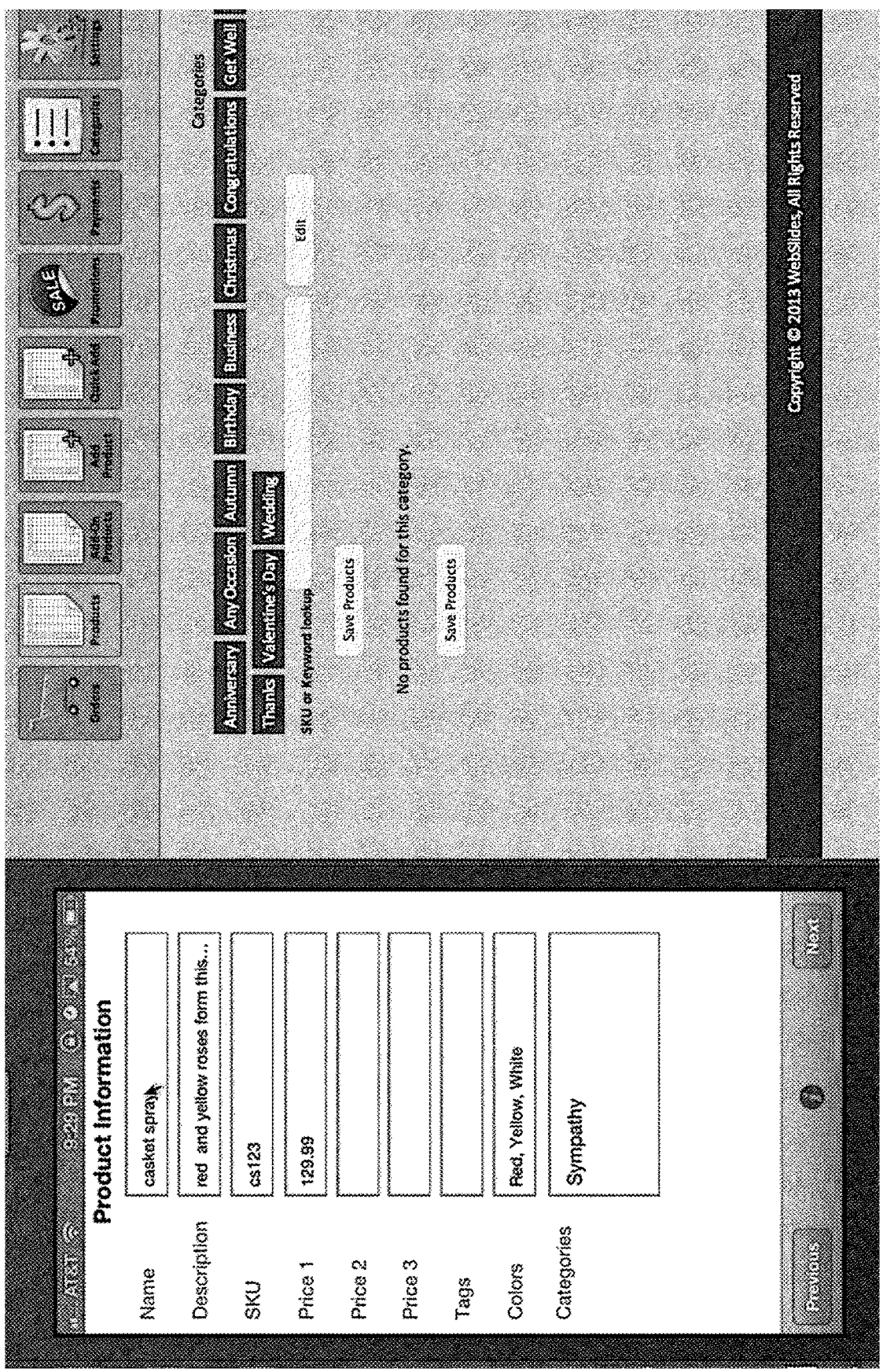
FIG. 21 shows that the merchant can also use the tablet or smartphone app to enter in a partial or full description of the product associated with the photo.

FIG. 21 shows that the merchant can also use the tablet or smartphone app to enter in a partial or full description of the product associated with the photo.

Figure 22:
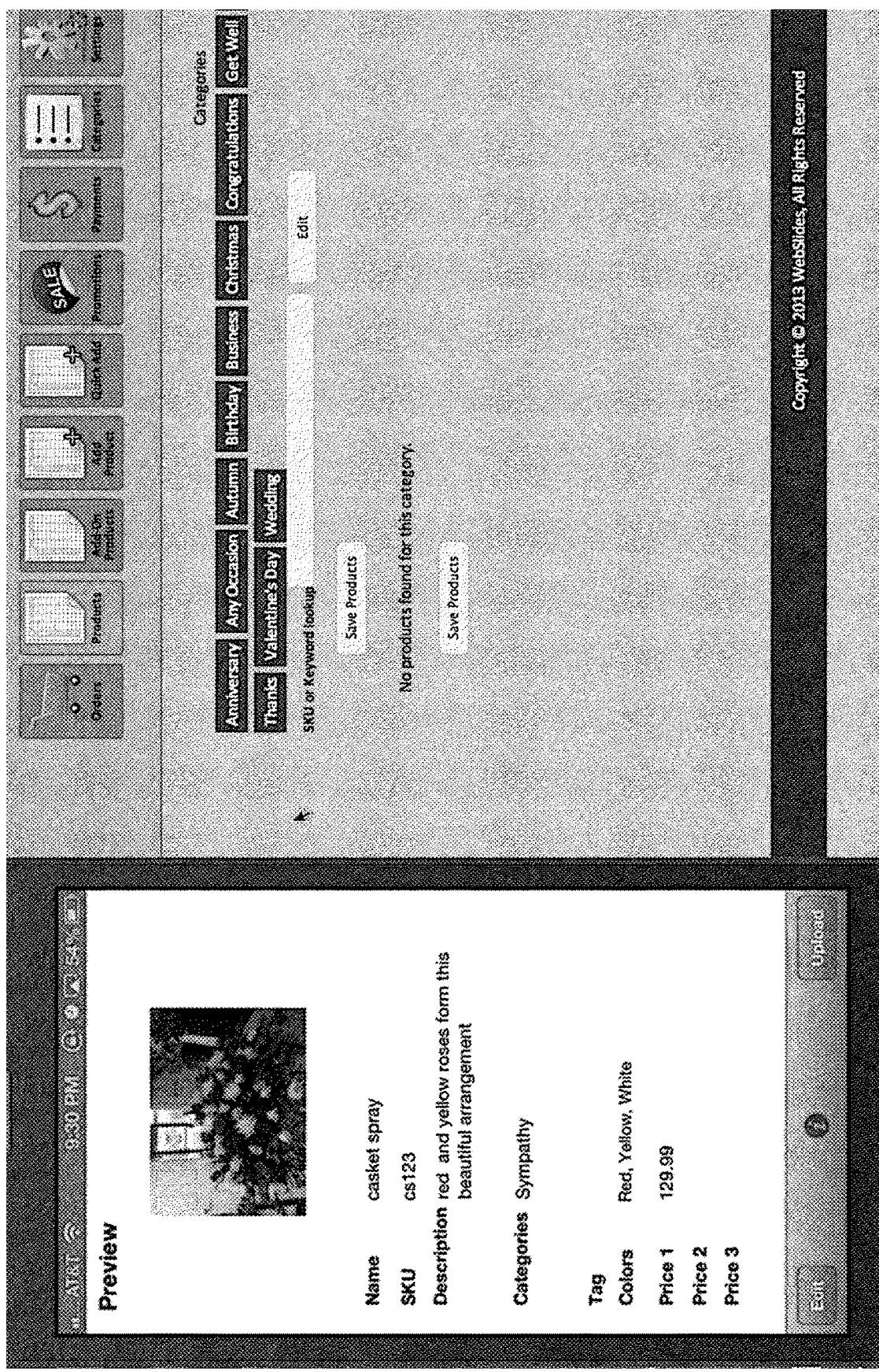
FIG. 22 shows that the merchant now has used the smartphone or tablet app to both select the product photo and enter in other product information.

FIG. 22 shows the merchant now has used the smartphone or tablet app to both select the product photo and enter in other product information.

Figure 23:
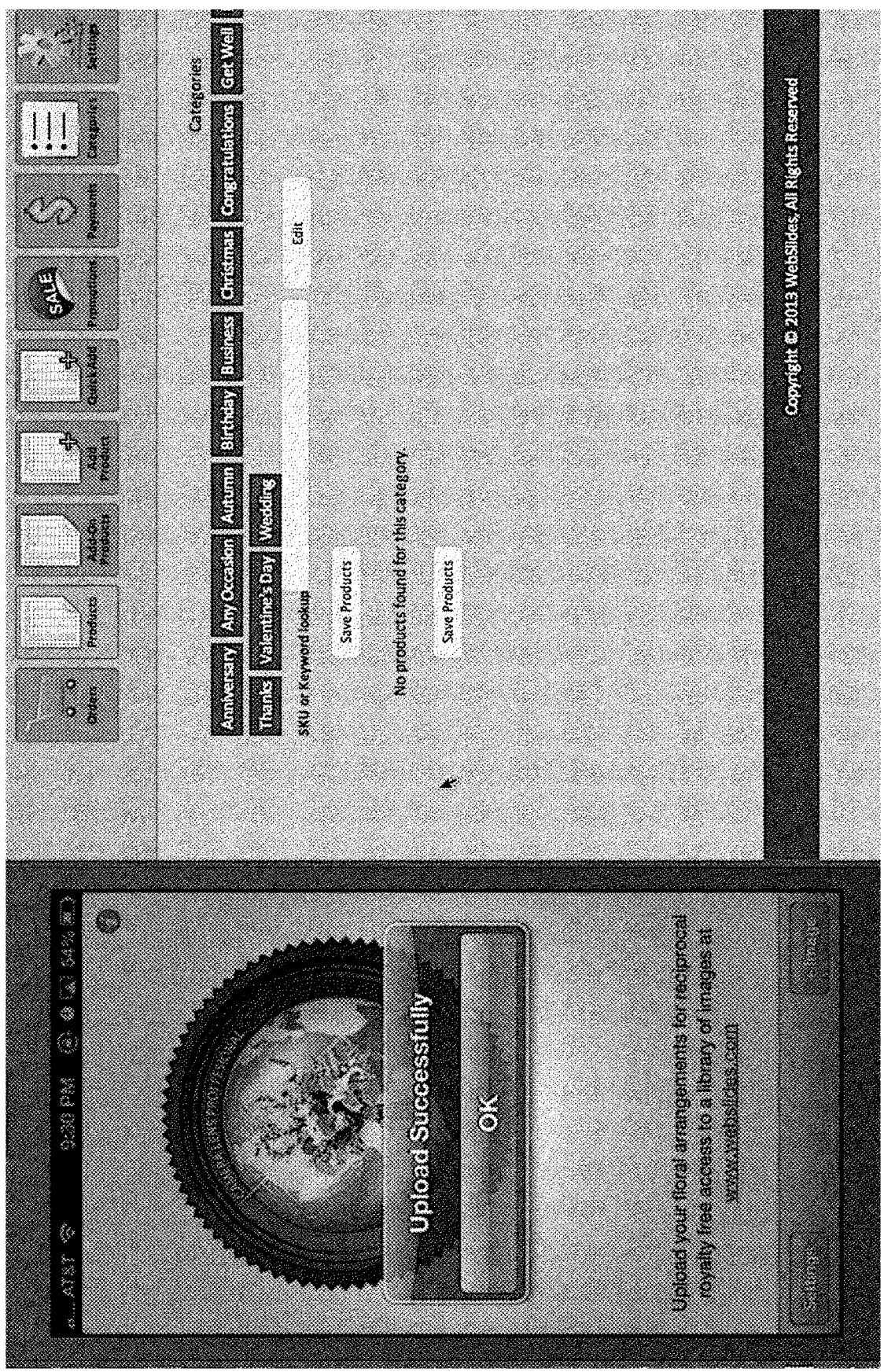
FIG. 23 shows that the merchant has now uploaded the product photo and description to the system.

FIG. 23 shows that the merchant has now uploaded the product photo and description to the system.

Figure 24:
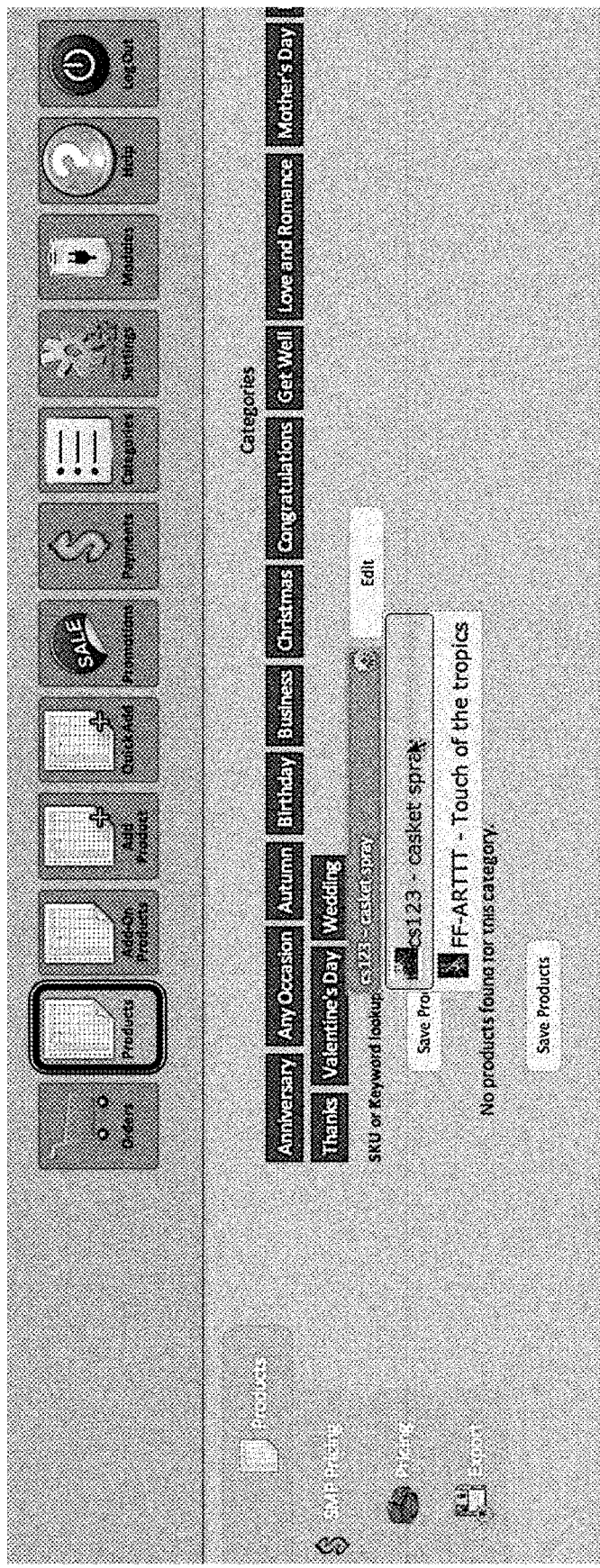
FIG. 24 shows the main system interface by which the merchant can now interact with the uploaded product photo and description.

FIG. 24 shows the main system interface by which the merchant can now interact with the uploaded product photo and description.

Figure 25:
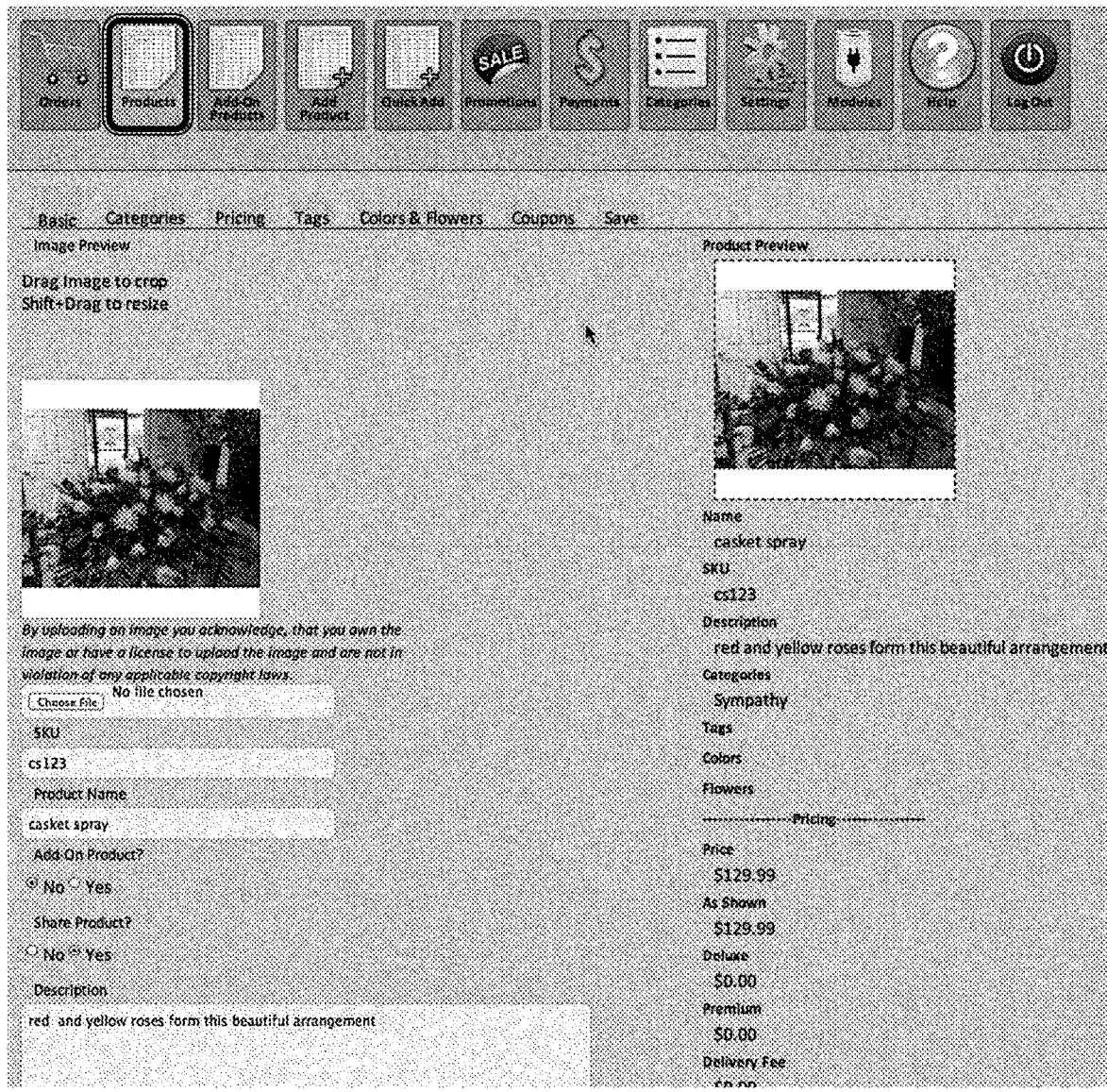
FIG. 25 shows the product photo and description that was previously uploaded by the merchant from their smartphone or tablet app. The merchant may optionally further adjust the photo or product description using the web browser based system interface as desired.

FIG. 25 shows the product photo and description that was previously uploaded by the merchant from their smartphone or tablet app. The merchant may further adjust the photo or product description using the main system interface as desired.

Easy formation of e-commerce networks with other participating merchants: As previously discussed, the invention is also based, in part, on the insight that local merchants often need to cooperate either with other local merchants or artisans or with more distant merchants and artisans. For example, a local florist and a local baker may find it advantageous to cross-promote each other's products and services on each other's websites so that, for example, a purchaser who wishes to send a gift of flowers could also have a cake delivered at the same time, and vice versa. Additionally, again using the floral industry as an example, more distant florists may wish to join forces to form their own network of connected floral services that can operate with little or no additional overhead (i.e. little or no middleman fees). Such low-cost networks of otherwise local merchants can often operate quite efficiently due to the lack of middleman fees. At the same time, by joining forces, a merchant, such as a florist, in one area of the country can send business to another merchant (i.e. another florist) in another area of the country, pocket a decent commission for this, yet without middleman fees, enough money remains that the distant merchant can still provide a high quality requested product at a satisfactory profit margin as well. In another embodiment, the invention also provides an easy to implement system and method to allow the formation of such cooperative networks. As a result, everyone, purchaser, first merchant, second merchant, and the recipient is more likely to be satisfied due to the high efficiency and lack of middleman costs of the system.

Thus in another embodiment of the invention, the invention's internet-based server platform is designed to allow merchants to easily form networks that allow them to automatically transfer orders to other preferred networks without paying any additional costs or overhead. The system may additionally implement a backup order system to non-preferred merchants using conventional fax, email, phone or SMS messages as well.

To elaborate, for the gifts industry, often customers wish to contact a local merchant and have the local merchant in turn work with a more distant affiliate merchant to deliver gifts, for example in a distant city and country. Here the cost structures should be appreciated. To do this, the local merchant will desire to have some commission, and of course, the distant merchant, who will also wish to make a decent profit after delivery charges are factored in, will also desire to make a profit. Any additional funding drain from the system, for example to a web-based middle man service, will end up decreasing merchant profit or decreasing the value of the gift. Thus in another embodiment of the invention, the invention allows participating merchants to set up their own zero or at least low transaction fee network in which merchants can accept orders from customers, and relay the order to other more appropriately located merchants, with the assurance that the order will be carried out appropriately and that the profit margins and quality of the gift will not suffer.

Figure 26:
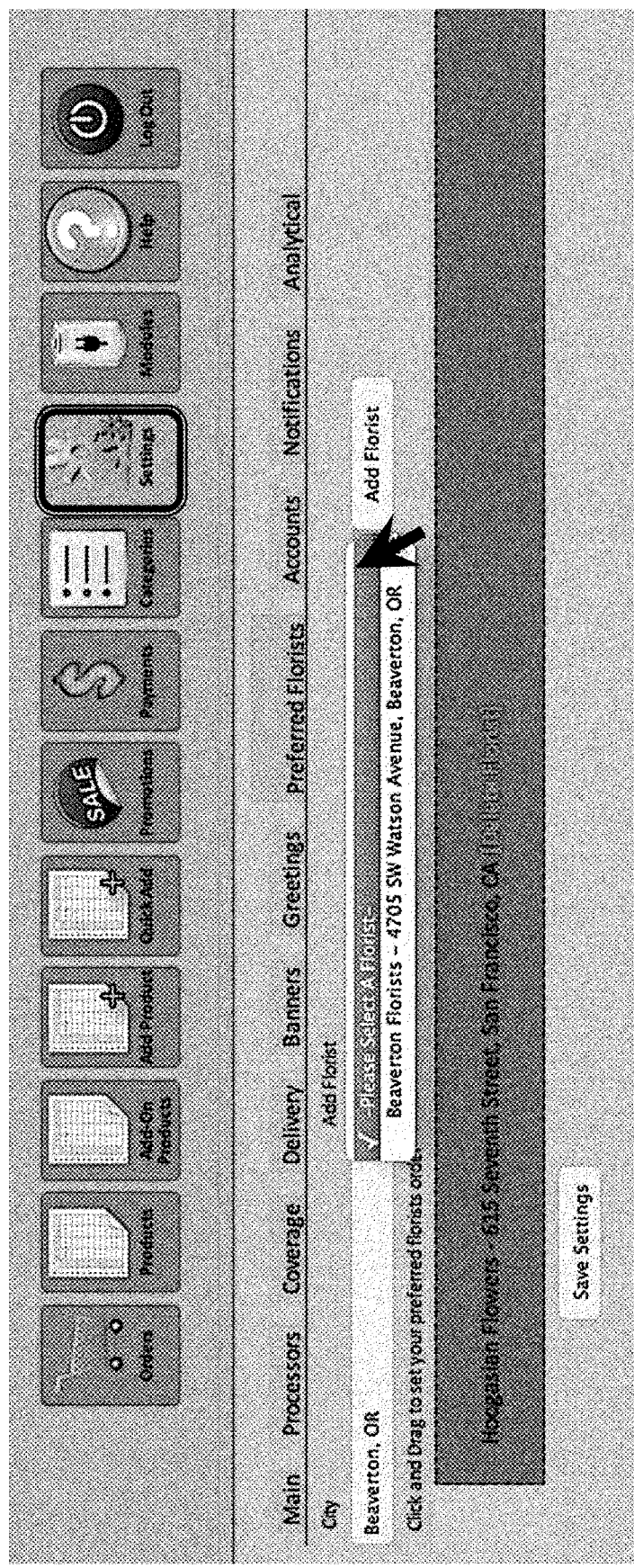
FIG. 26 shows how the merchant, again in the settings section, can also add a network link to another preferred florist.

FIG. 26 shows how the merchant, again in the settings section, can also add a network link to another preferred florist.

Figure 27:
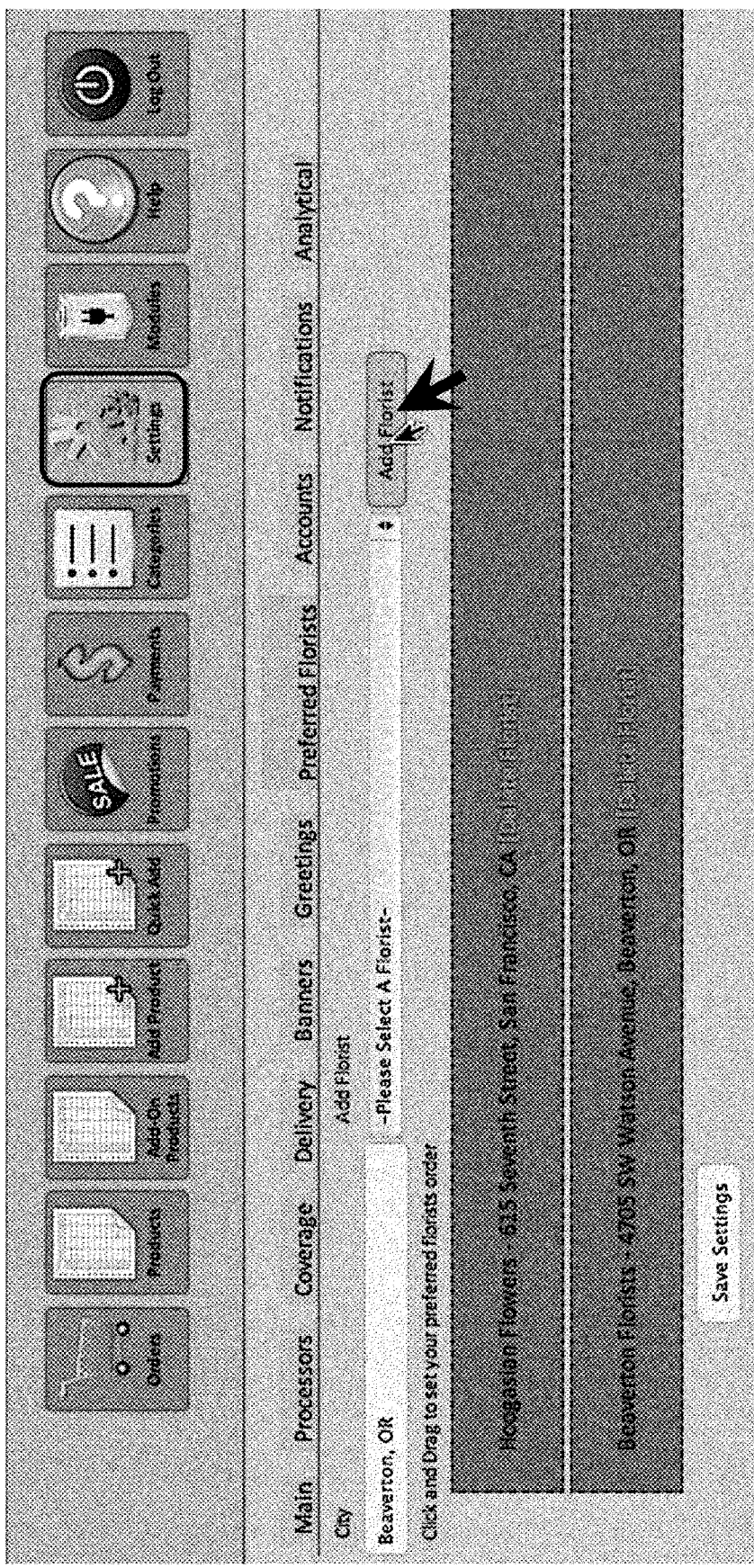
FIG. 27 shows the merchant continuing to add additional florists to that merchant's own preferred florist network, thus building up a unique network of favored florist partners.

FIG. 27 shows the merchant continuing to add additional florists to that merchant's own preferred florist network, thus building up a unique network of favored florist partners.

Figure 28:
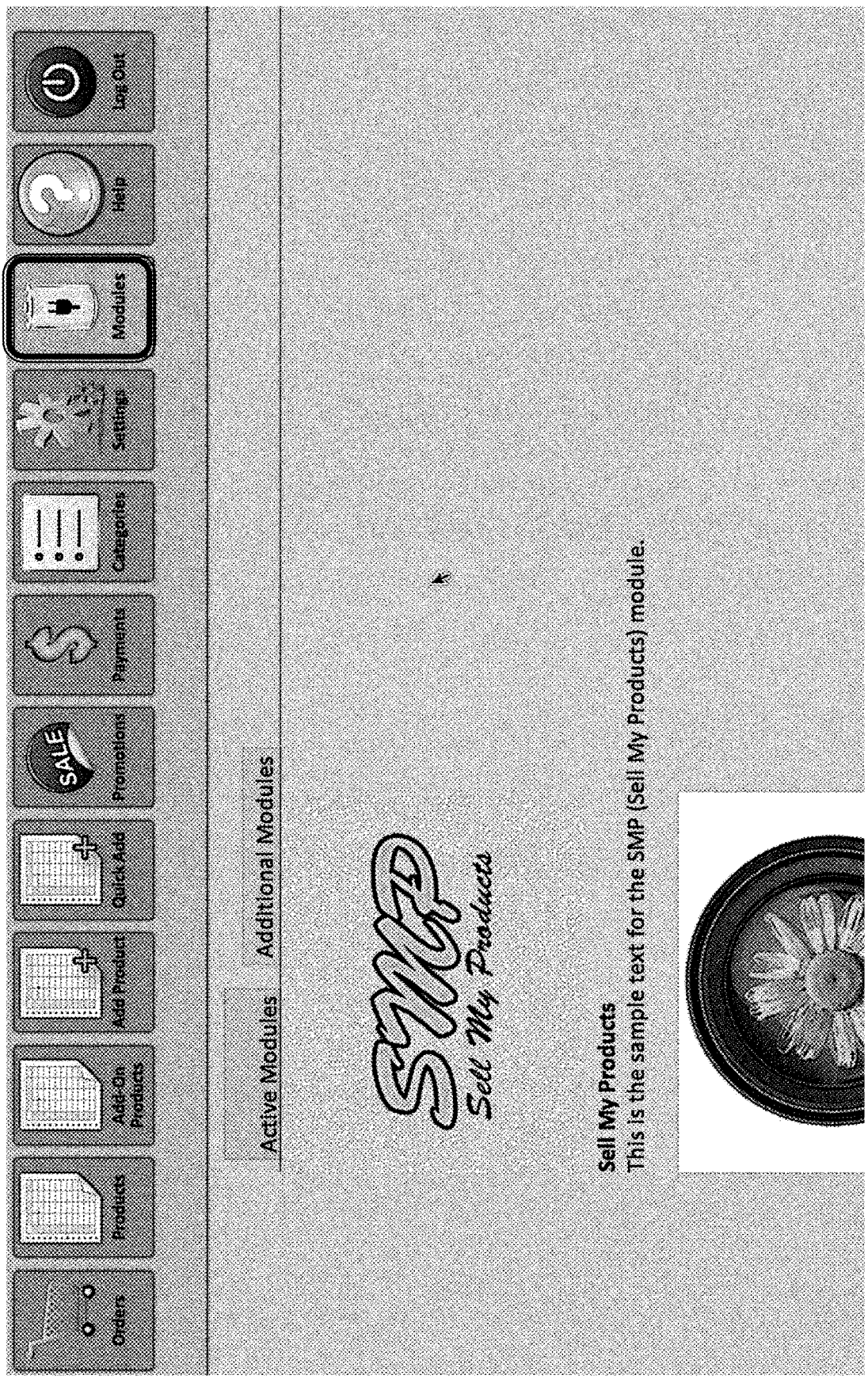
FIG. 28 shows the merchant now operating the system's "Sell My Products" (SMP) section to enter in information about that merchant's products that the merchant wishes to expose to other participating merchants on the invention's merchant network.

FIG. 28 shows the merchant now operating the sell my products (SMP) section to enter in information about that merchant's products. In some embodiments, this information can then be automatically transferred to another merchant's website when needed. For example, with regards to FIG. 1, if merchant M2 enters some of his products into the system, then this information may automatically be made available to merchant M1 when needed.

The invention's sell my product (SMP) option also allows non-merchant artisans, who may produce complementary products, but who do not wish to sell them directly to the public, to also network in with willing merchant and display the artisan's products as well, even though the artisan does not have its own merchant website or store.

Figure 29:
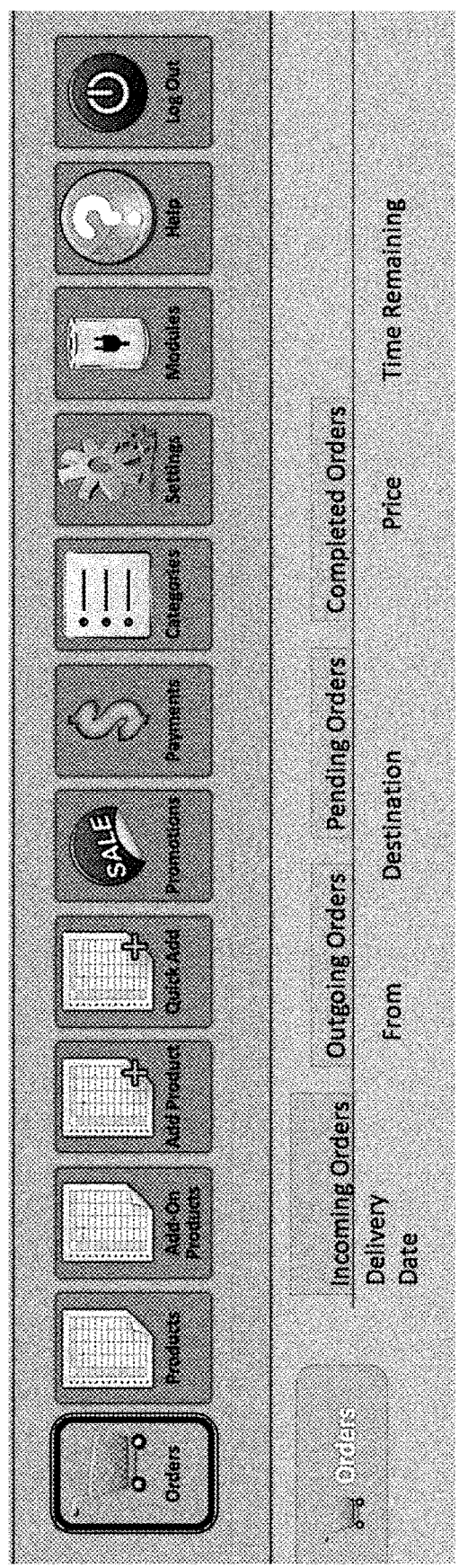
FIG. 29 shows a close up of the orders portion of the network system.

FIG. 29 shows a close up of the orders portion of the system.

Figure 30:
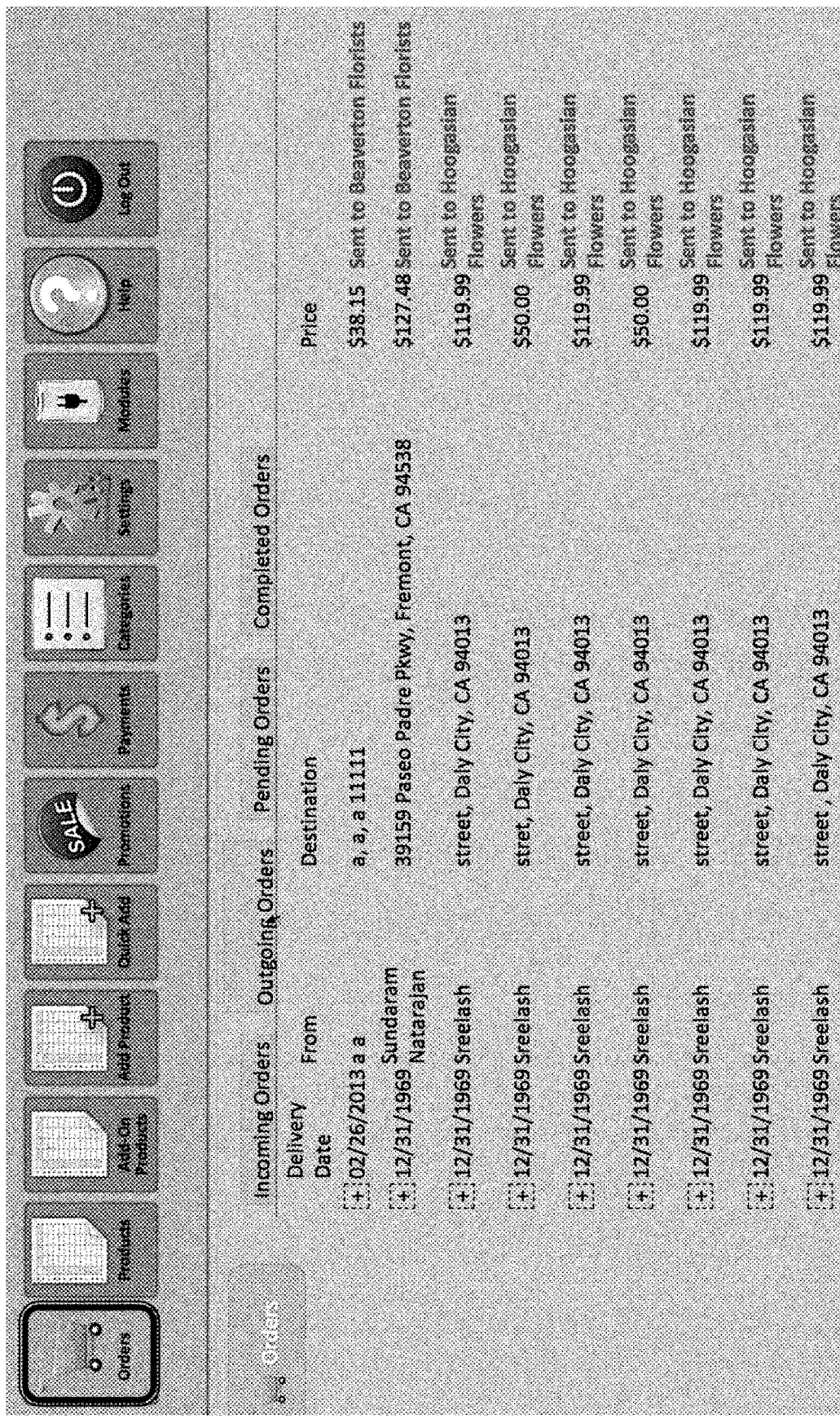
FIG. 30 shows how the merchant can review the system record of the merchant's various outgoing network orders.
Figure 31:
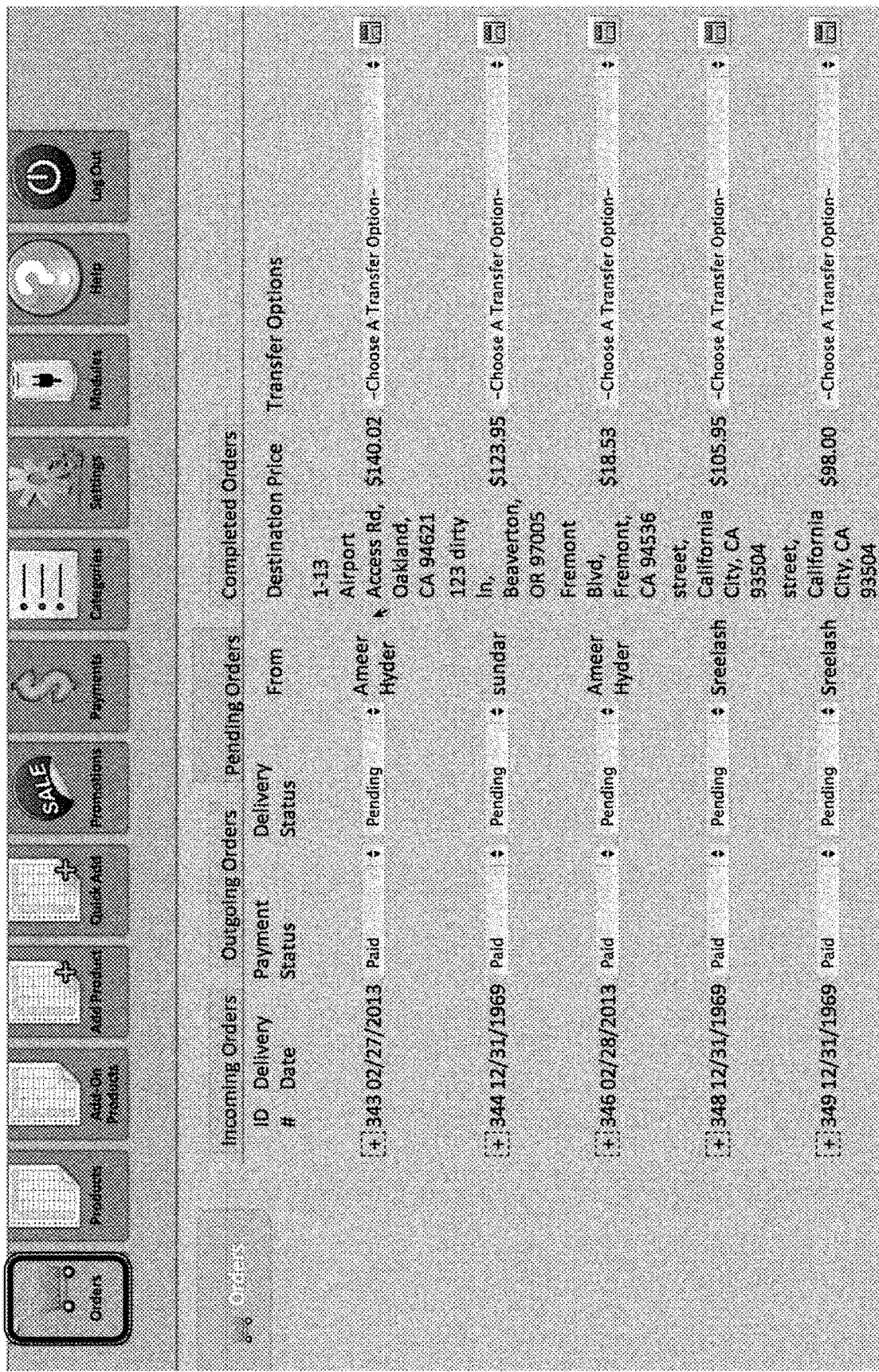
FIG. 31 shows how the merchant can review the system record of various pending merchant network orders.

FIG. 30 shows how the merchant can review the system record of the merchant's various outgoing orders FIG. 31 shows how the merchant can review the system record of various pending orders.

Figure 32:
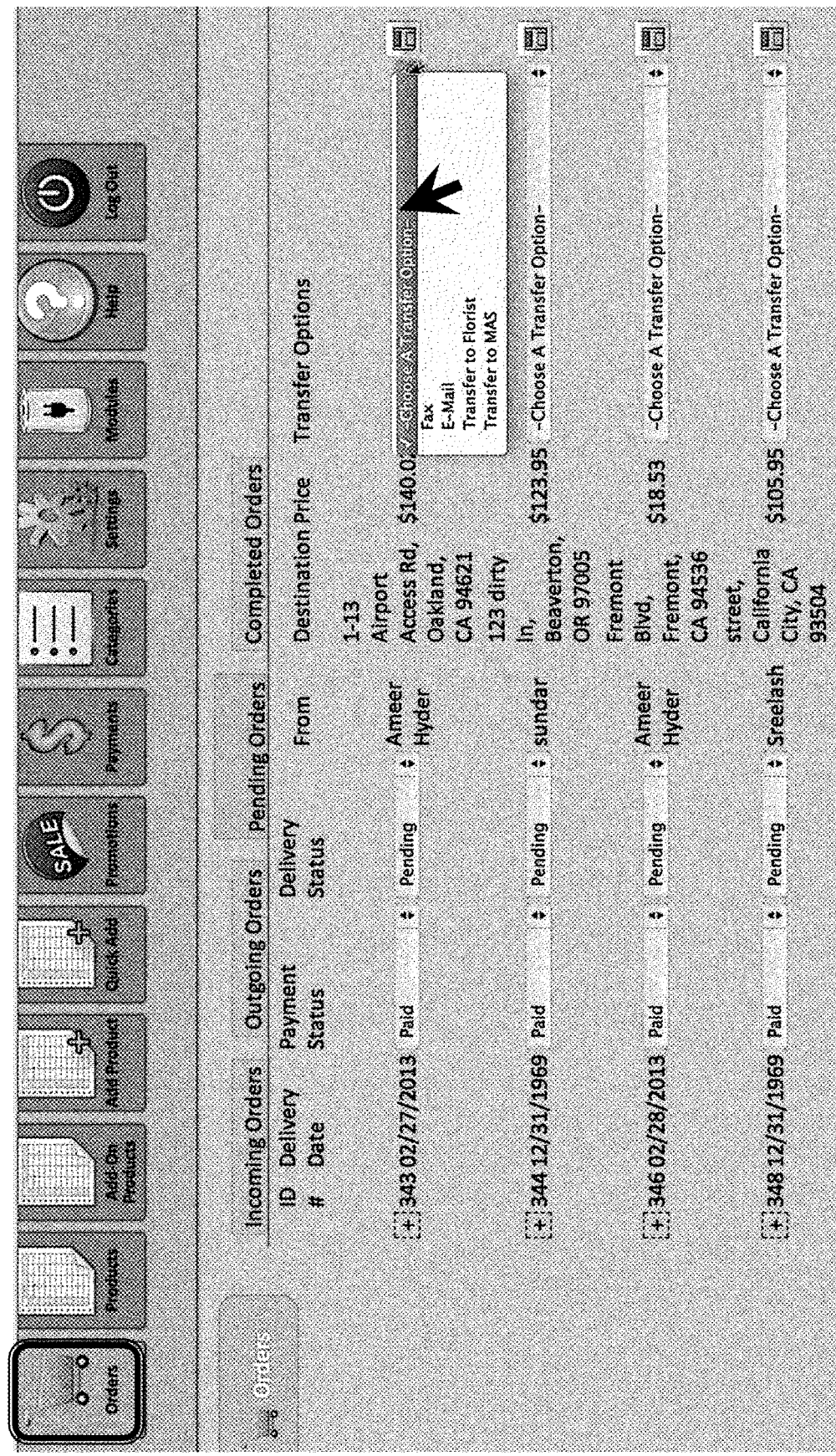
FIG. 32 shows how the initiating merchant can adjust how the various pending network orders are transmitted to another recipient merchant. Here various options such as transmit by fax, email, electronic transfer to the florist via the system, or transfer to the MAS system can be selected using a drop-down menu.

FIG. 32 shows how the initiating merchant can adjust how the various pending orders are transmitted to the recipient merchant. Here various options such as transmit by fax, email, electronic transfer to the florist via the system, or transfer to an outside system (such as MASdirect, Dallas, Tex.) can be selected using a drop-down menu.

Figure 33:
FIG. 33 shows the initiating merchant electing to have the system transfer the pending network order to the recipient merchant via the system's electronic transfer to florist option.

FIG. 33 shows the initiating merchant electing to have the system transfer the pending order to the recipient merchant via the system's electronic transfer to florist option.

Figure 34:
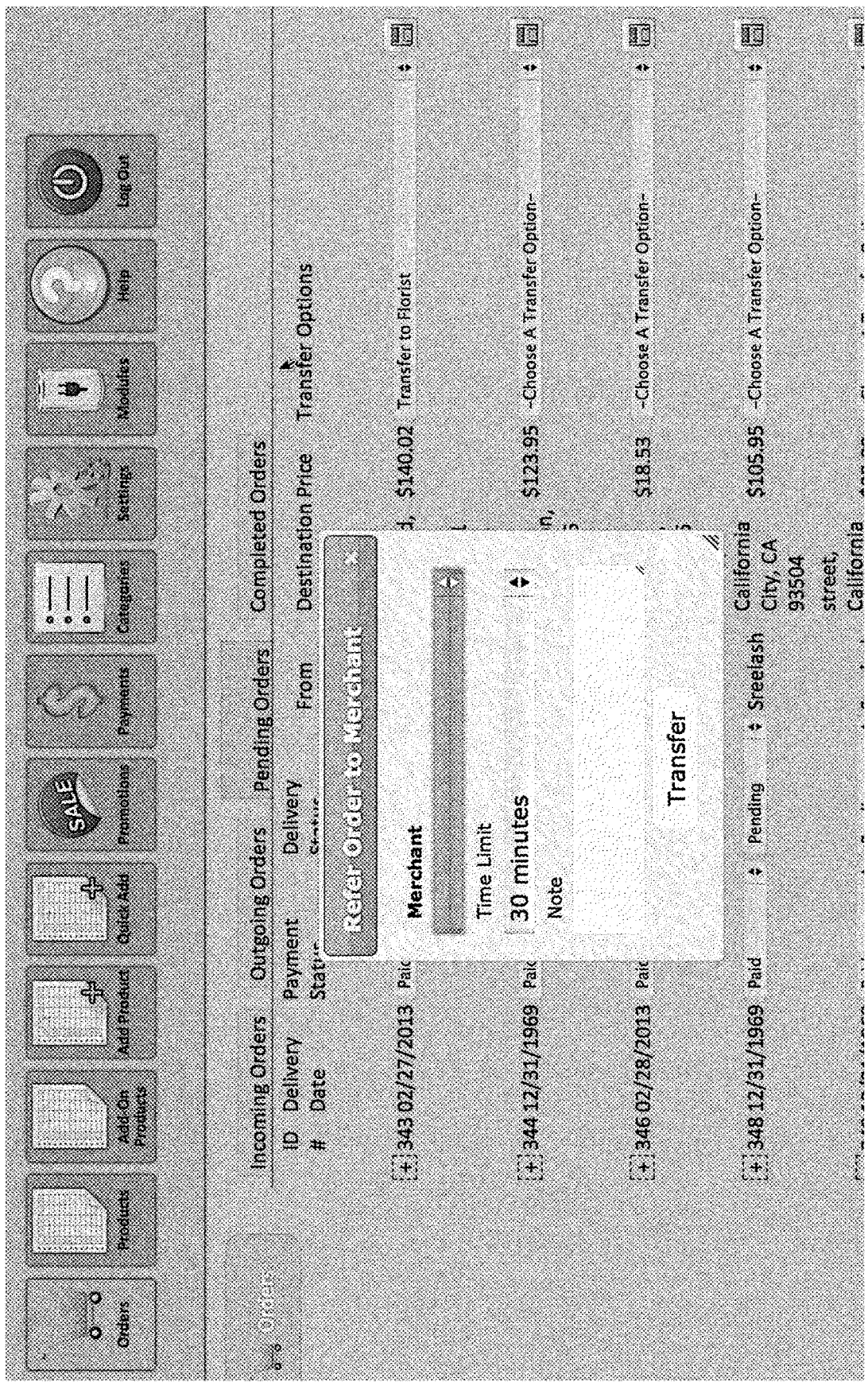
FIG. 34 shows that the initiating merchant can also set a time limit in which to transfer the order to the network recipient merchant.

FIG. 34 shows that the initiating merchant can also set a time limit in which to transfer the order to the recipient merchant.

Figure 35:
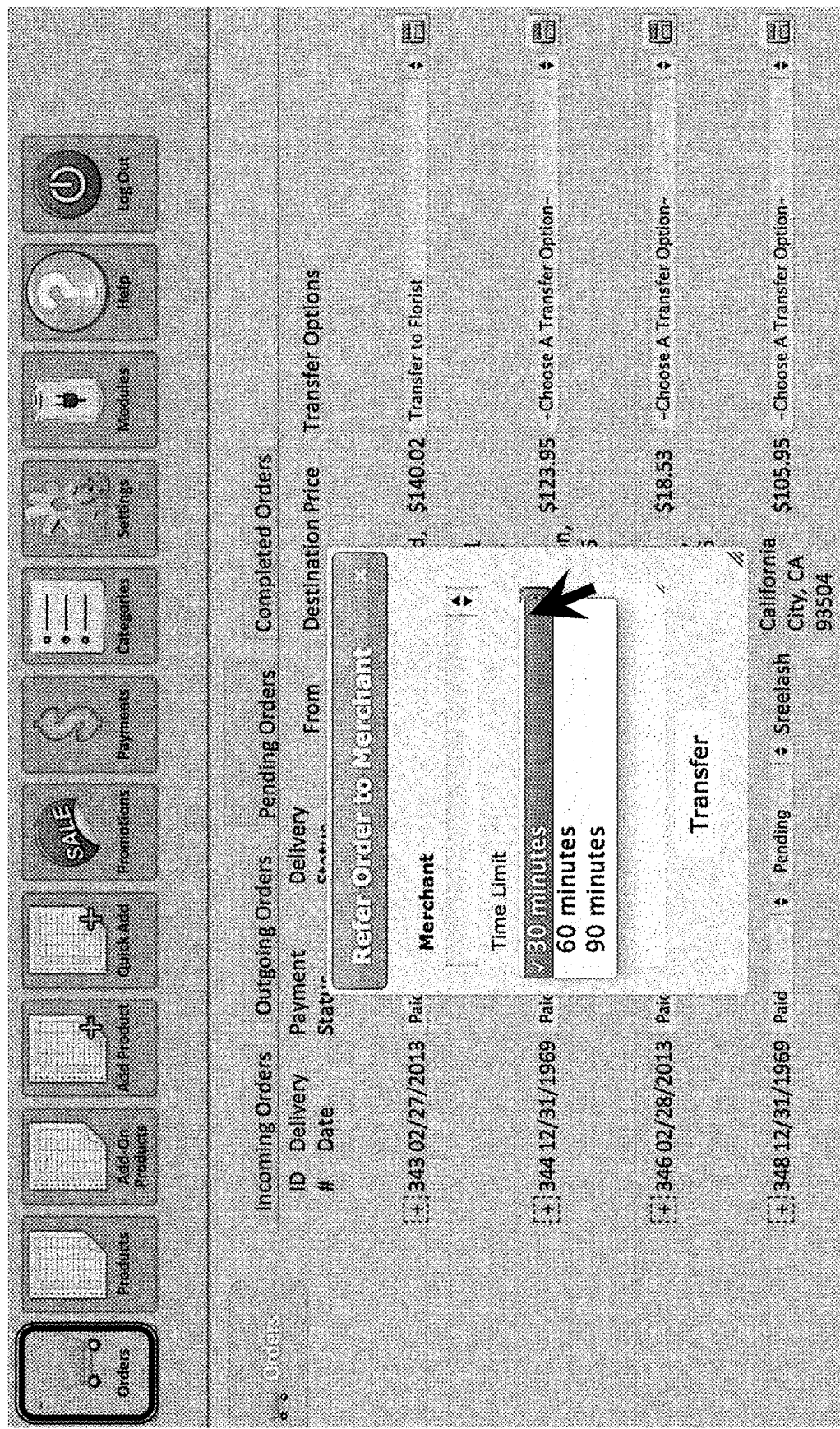
FIG. 35 shows the merchant here instructing the system that it must receive confirmation from the network recipient merchant within 30 minutes of placing the order, or else timeout.

FIG. 35 shows the merchant here instructing the system that it must receive confirmation from the recipient merchant within 30 minutes of placing the order, or else timeout.

Figure 36:
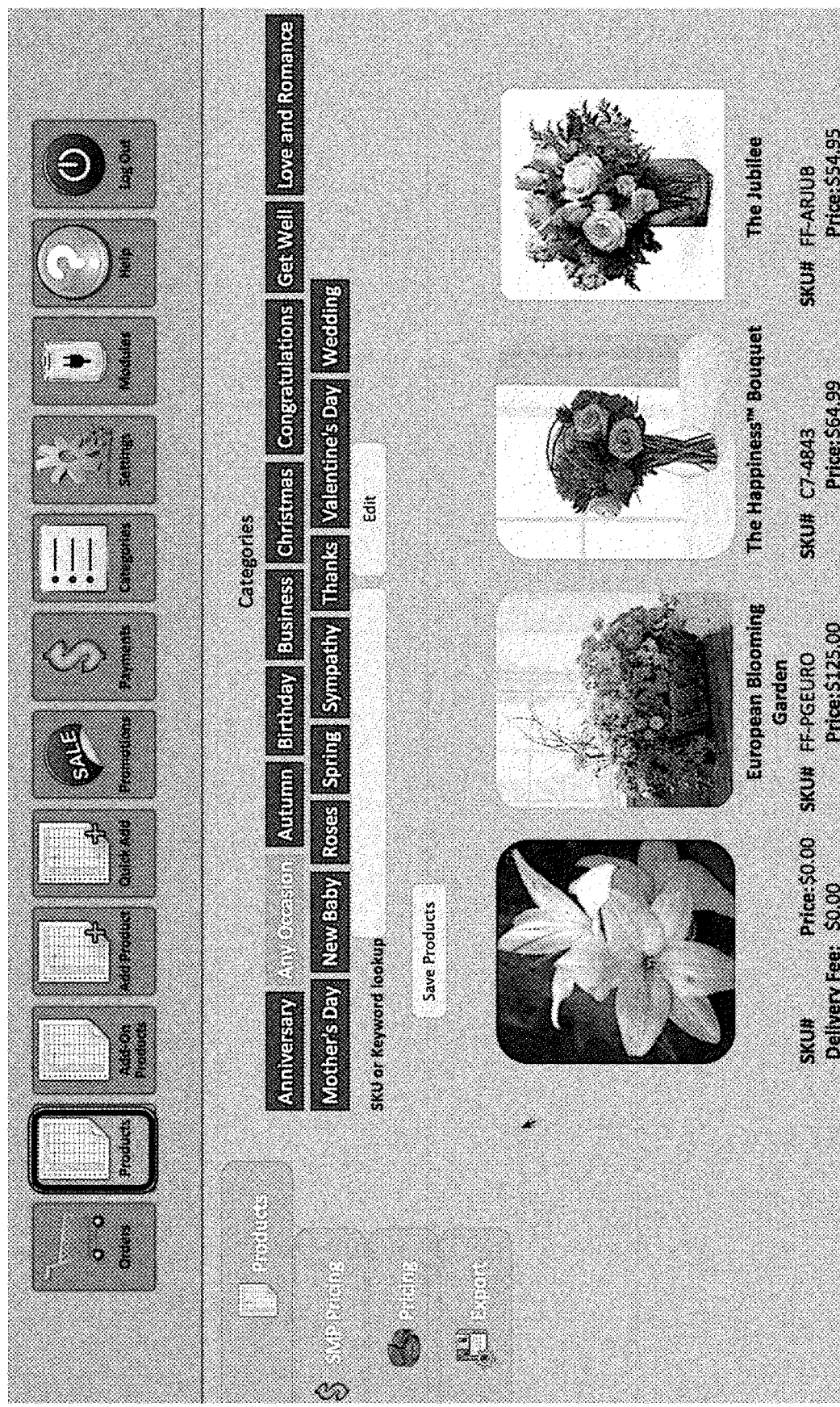
FIG. 36 shows the system's merchant products configuration interface.

FIG. 36 shows the merchant products configuration interface.

Figure 37:
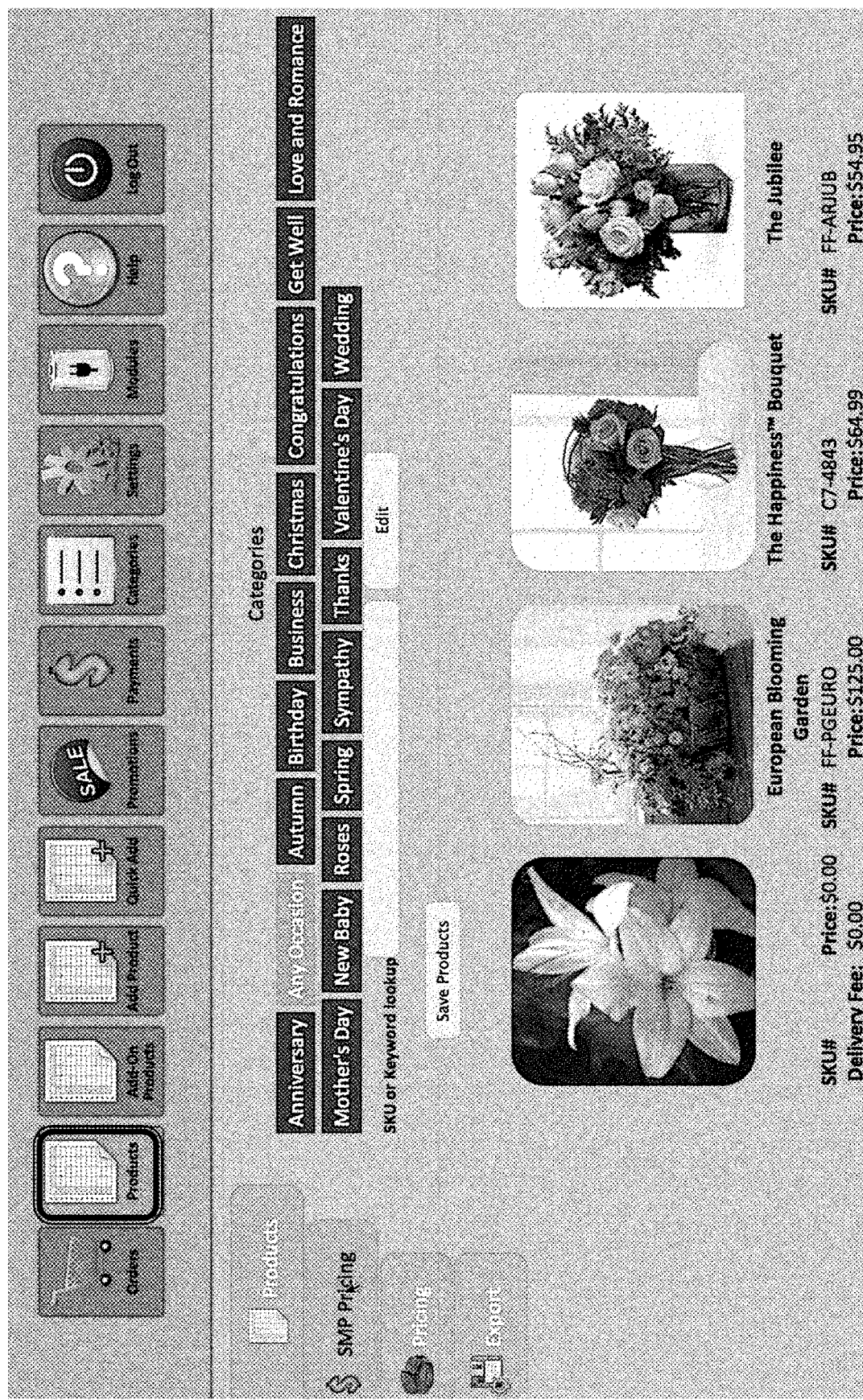
FIG. 37 shows the merchant adjusting the SMP (sell my products price) pricing for their various network sales of floral arrangements.

FIG. 37 shows the merchant adjusting the SMP (sell my products price) pricing for their various floral arrangements.

Figure 38:
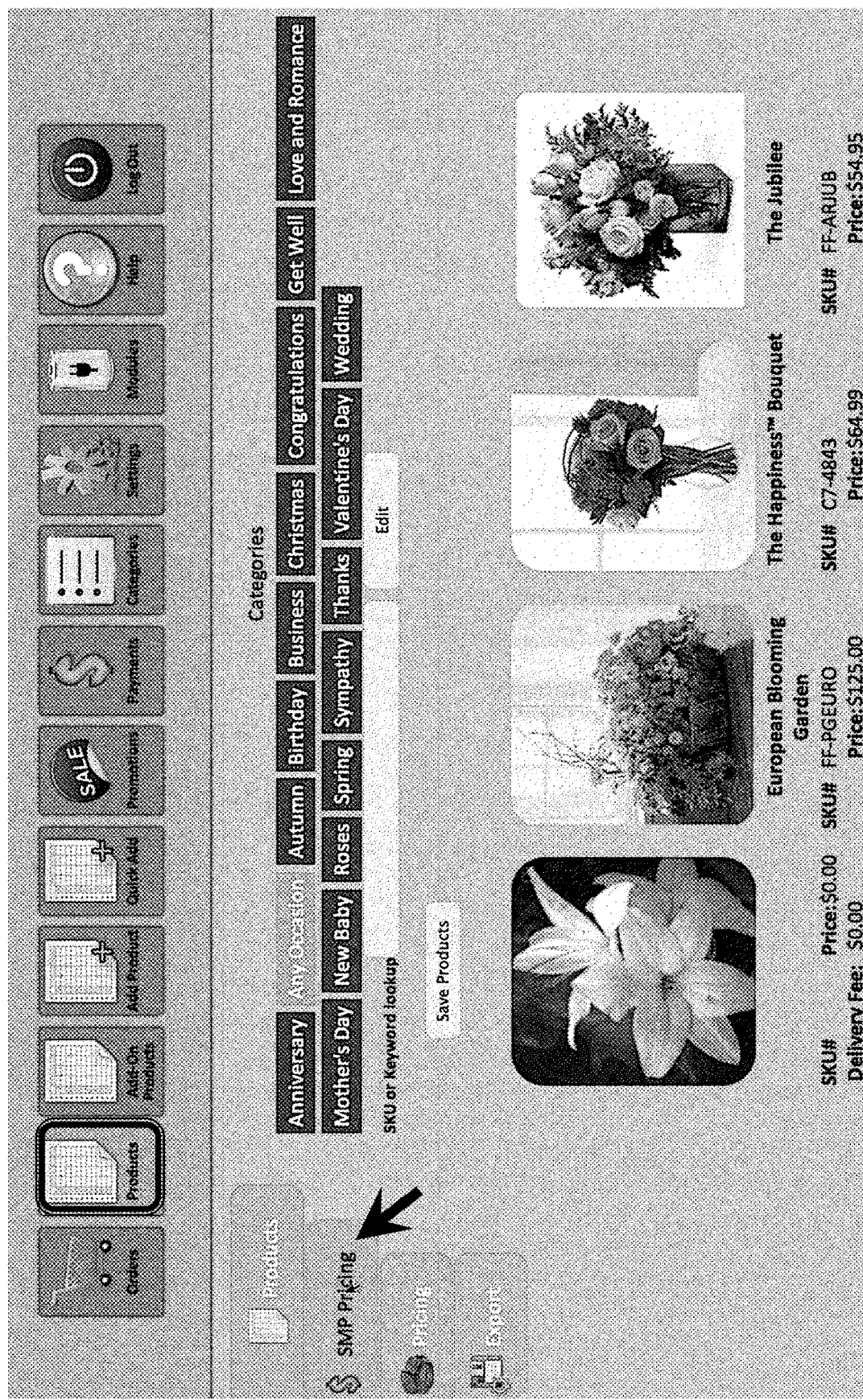
FIG. 38 shows the merchant further adjusting the SMP (sell my products price) pricing for their various network sales of floral arrangements.

FIG. 38 shows the merchant further adjusting the SMP (sell my products price) pricing for their various floral arrangements.

Figure 39:
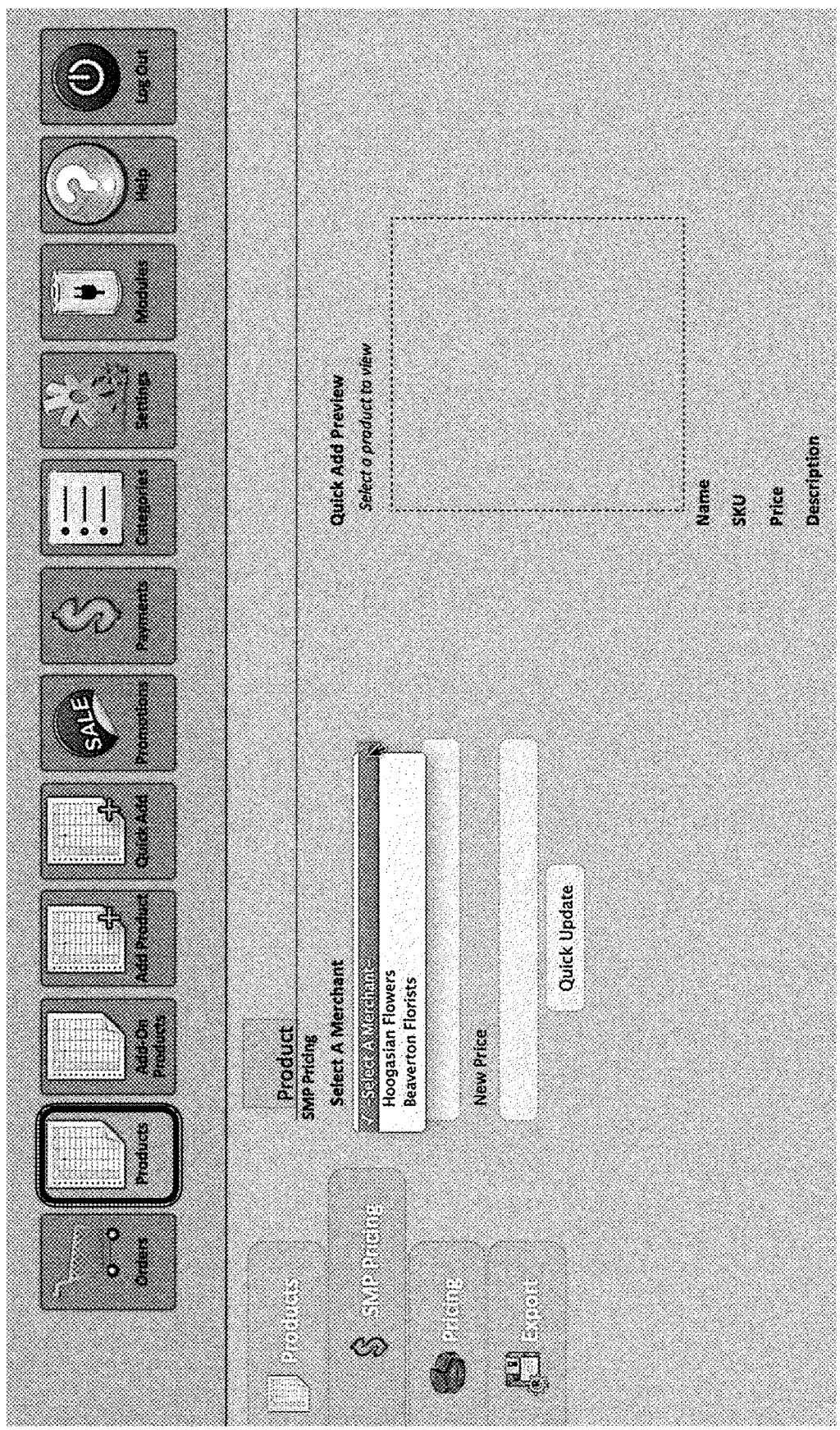
FIG. 39 shows the initiating merchant updating the system to show a floral arrangement that is provided by a partner network receiving merchant, along with pricing information.

FIG. 39 shows the initiating merchant updating the system to show a floral arrangement that is provided by a partner receiving merchant, along with pricing information.

Figure 40:
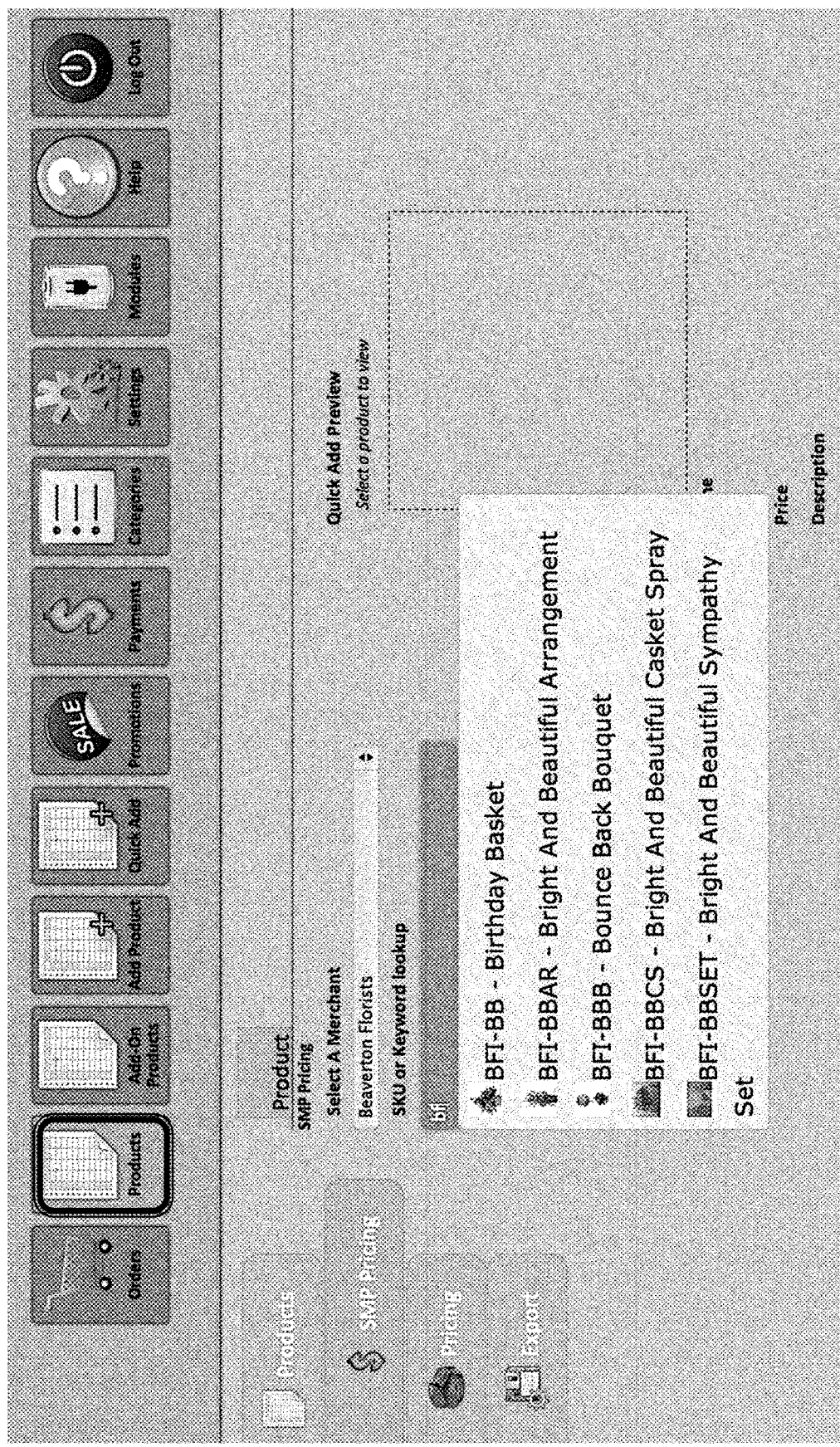
FIG. 40 shows the merchant updating more information about the product, here entering in a brief description from a drop-down menu.

FIG. 40 shows the merchant updating more information about the product, here entering in a brief description from a drop down menu.

Figure 41:
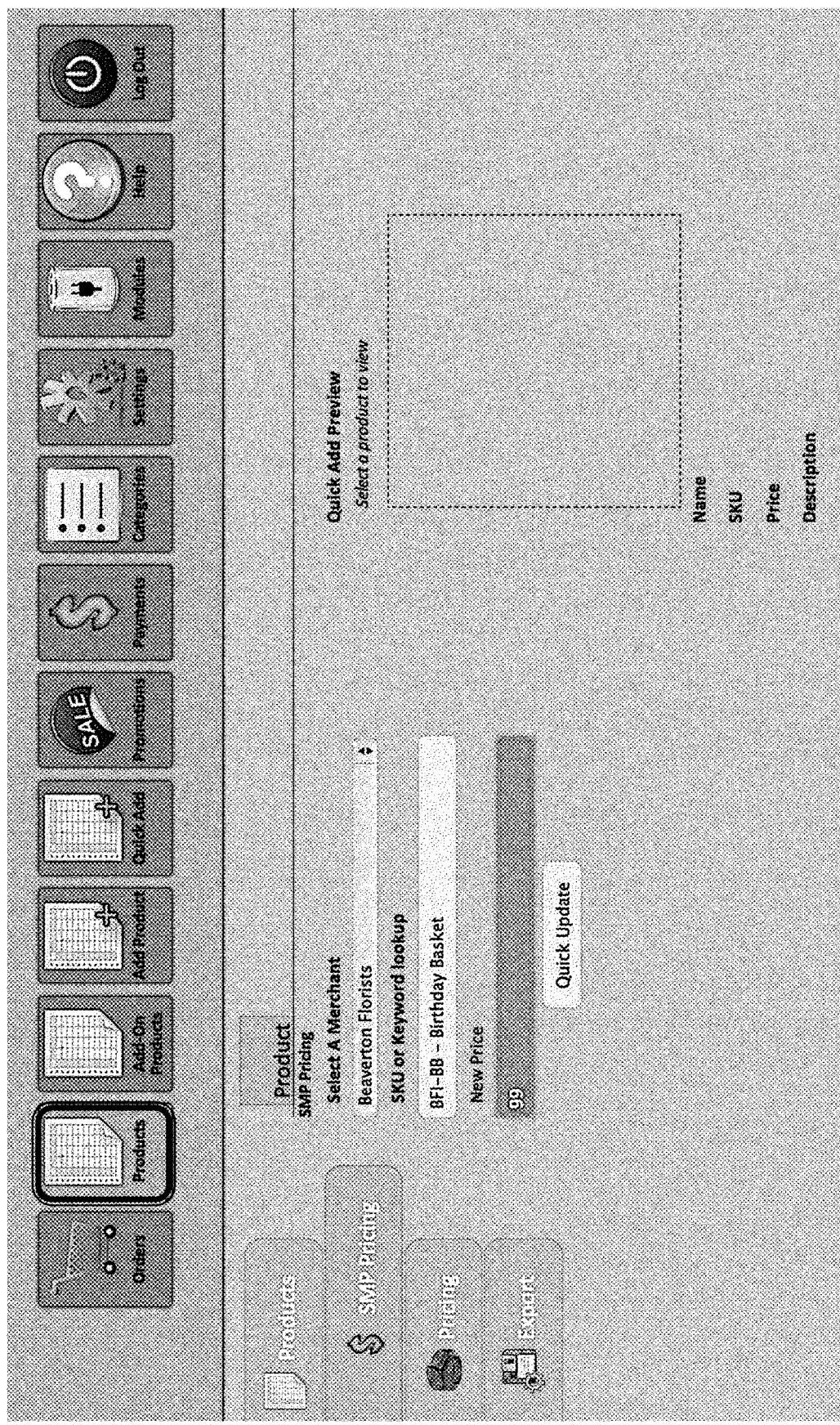
FIG. 41 shows the merchant now updating the price for the new product.

FIG. 41 shows the merchant now updating the price for the new product.

Figure 42:
FIG. 42 shows how the merchant may additionally cooperate with other local merchants and artisans to cross promote their products. Thus a buyer browsing a florist's site might also see advertisements from a local bakery for a cake, and decide to also send a gift chocolate cake to the recipient along with the flowers.

In addition to allowing groups of like but geographically distant merchants form networks, the system also allows different but complementary and geographically close merchants to form useful e-commerce networks as well. A good example is shown in FIG. 42, which shows a merchant website showing cross-promotions from other local but complementary merchants. In FIG. 42 example, the merchant, who is a florist, is showing complementary services from local ribbons, balloons stuffed bear, and bakery merchants. None of these other local merchants compete with the florist, but all sell mutually complementary products which are often sold together. The invention allows such related merchants to also form useful networks as well.

FIG. 42 shows how the merchant may additionally work with other local merchants and artisans to cross promote their products. Thus a buyer browsing a florist's site might also see advertisements from a local bakery for a cake, and decide to also send a gift chocolate cake to the recipient along with the flowers.

In some embodiments, entire networks of such artisans can use the inventions to form their own associations and market through a virtual merchant. Here the virtual merchant can be, for example, an art or wine festival that has registered on the invention's website as a merchant. This can allow, for example, for aggregations of local artists (e.g. painters and sculptors and the like to group together, with local merchants as desired, and easily promote ongoing virtual "art fairs" and the like.

No purchaser effort promotional code system: The invention is further based on the insight that prior art mechanisms of providing promotional codes for purchases are too cumbersome. According to prior art, if a company such as Intel received a group promotional code for a discount off of purchases, the employees of the company would have to obtain the promotional code and enter it in to receive discounts. However, according to the invention's improved methods, the invention's e-commerce web server can optionally link promotions with the URL or email address from which the product purchase had originated. The system can then use the product purchase URL or email address to automatically assign promotional discounts, thus reducing purchaser effort. These promotional discounts may either be discounts on product price, discounts on shipping costs, or both. These promotional discounts may also be limited by various constraints, such expiring after a preset number of products, and the like.

Figure 43:
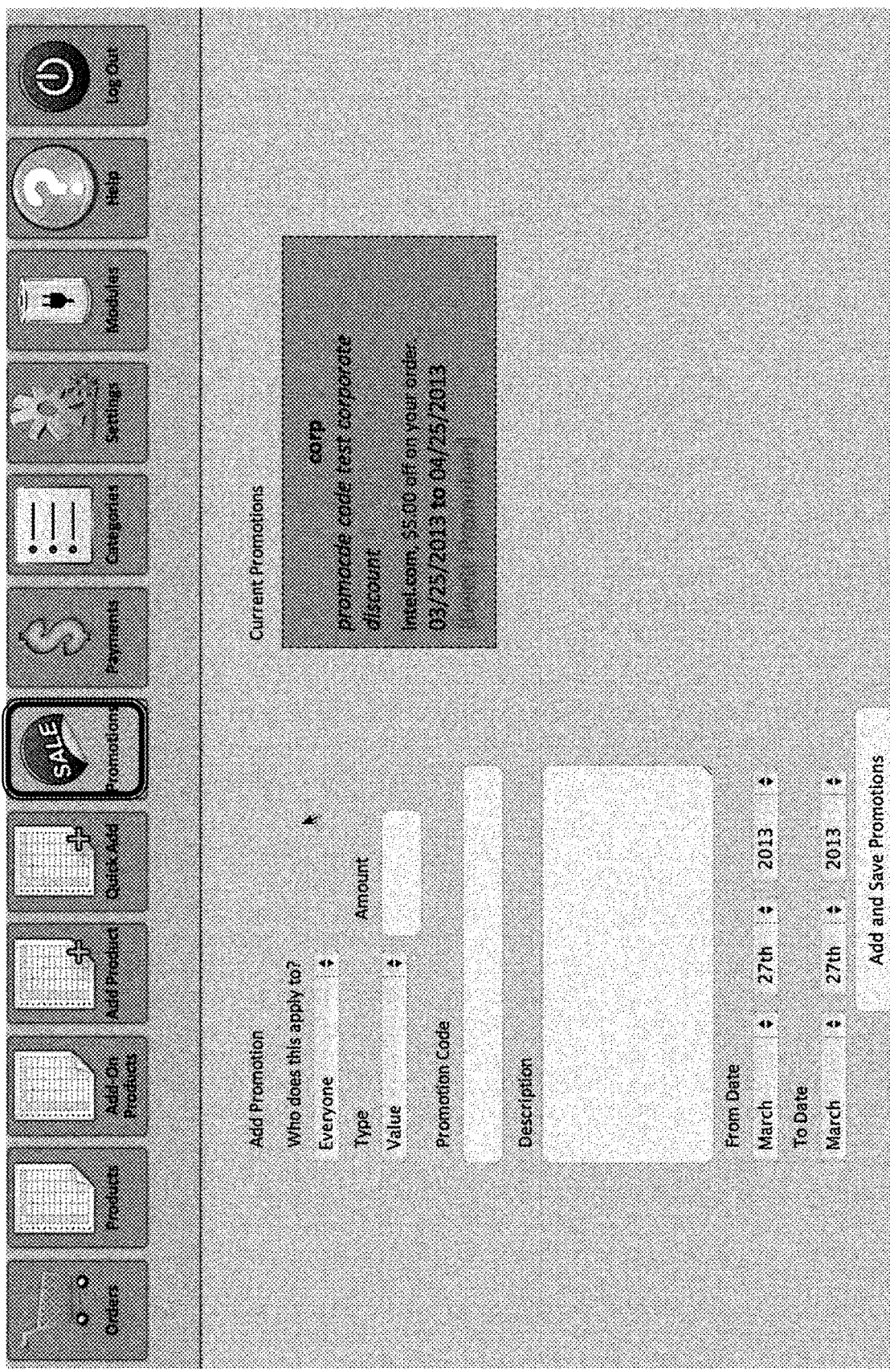
FIG. 43 shows the system's promotions interface in more detail. Here there is one promotion presently running, and the merchant is in the process of adding another promotion.

FIG. 43 shows the system's promotion interface in more detail. Here there is one promotion presently running, and the merchant is in the process of adding another promotion.

Figure 44:
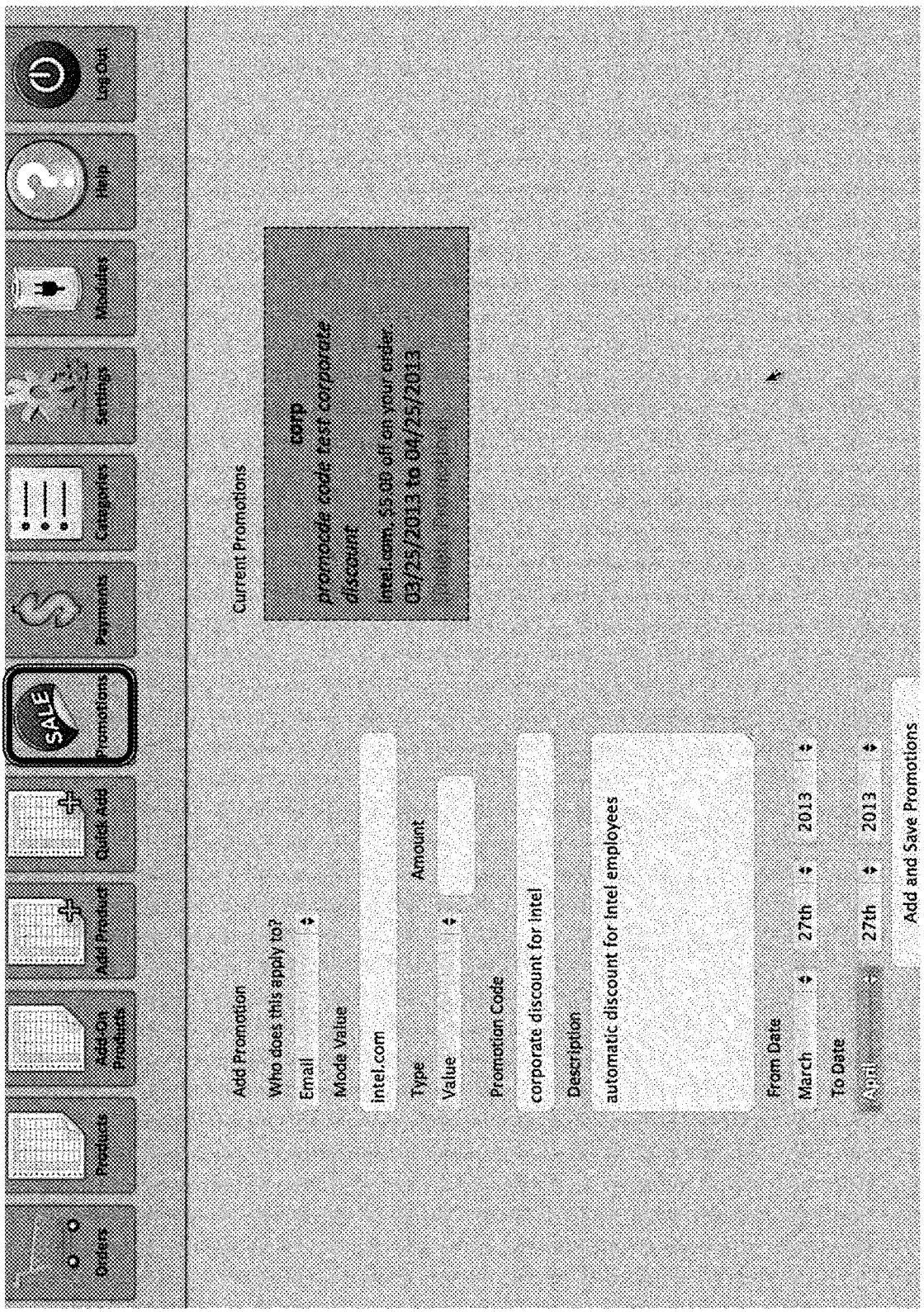
FIG. 44 shows the merchant adding additional information about the next promotion to the system's promotion interface. Here Intel is being given a corporation discount.

FIG. 44 shows the merchant adding additional information about the next promotion to the system's promotion interface.

Figure 45:
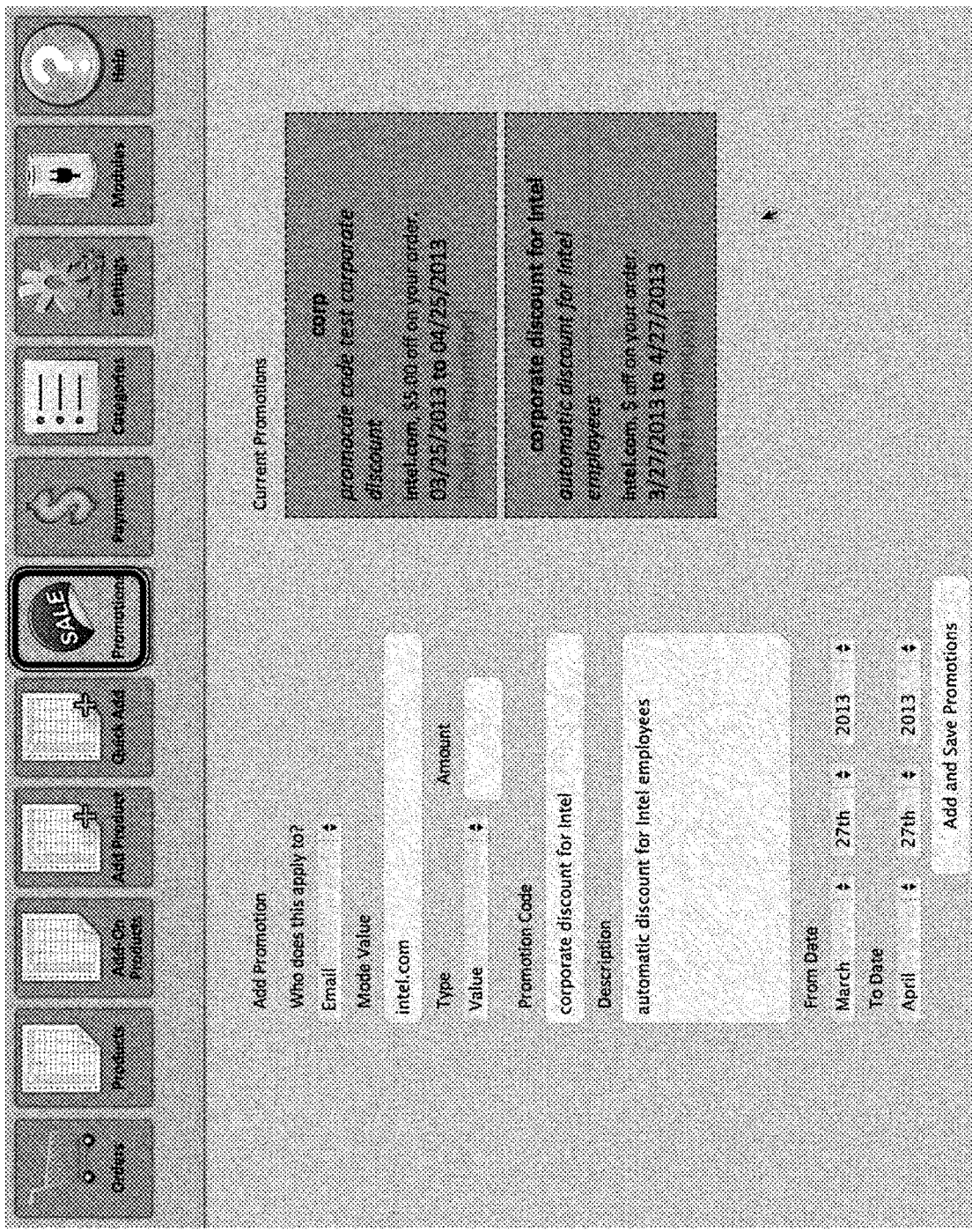
FIG. 45 shows that the merchant has now added another promotion to the interface. Here the promotion is for the company Intel, and the system automatically gives the promotion to all employees who access the system from the Intel domain, or provide an Intel.com email address.

FIG. 45 shows that the merchant has now added another promotion to the interface. Here the promotion is for the company Intel, and the system automatically gives the promotion to all employees who access the system from the Intel domain, or provide an intel.com email address.

Recipient delivery and gift customization: The invention is also based, in part, on the insight that although many such local merchant e-commerce based purchases will be for gifts for others, often such gifts need not be surprise gifts. When such gifts are not surprise gifts, it can often be further desirable to give the gift recipient at least some advance notice of the gift, as well as at least some ability to modify the time that the gift arrives, and even potentially modify the nature of the gift. Thus, for example, a recipient of flowers may be able to redirect the time or day of arrival to a more appropriate time or day of arrival, thus ensuring that the flowers arrive when the recipient is not on vacation. Alternatively, a recipient of a gift for a first flavor or type of cake might modify the cake to a more preferred type or flavor. In another embodiment, the invention also provides for such an ability to notify the recipient electronically, and to allow at least partial modification of the gift by, for example, going to the local merchant's website and selecting various alternative delivery or gift type options.

Easy customer gift card customization: As previously discussed, the invention is further based on the insight that at least with regards to gifts; often the gift recipient values the thought (i.e. affection, good intentions) behind the gift as much or more than the gift itself. However present industry practice of only providing standardized gift card designs somewhat defeats this purpose. The invention further provides an easy to use user interface that allows the purchaser of the gift to custom design the art behind the gift cards delivered with the gifts, thus further providing evidence of the purchasers thought behind the gift to the recipient, and further enhancing the mutual satisfaction of both the gift giver and recipient. See FIG. 46 for further discussion.

The merchant can additionally upsell this function for an extra fee (i.e. $5.00), and make more money this way as well. This adds value.

Additional Discussion and Features

As previously discussed, in some embodiments, the invention allows the customer to specify if the gift for the recipient is to be a surprise gift or not. In the case where the gift is not a surprise gift, the system allows the recipient to modify the gift or delivery schedule. Here the system can send the recipient gets an email link notifying the recipient of the gift, and allowing the recipient to modify the delivery arrangement (within the price range), and delivery date.

In other embodiments, the system can also enable multiple customers to pool their funds and enable group purchases. Here, the system allows an initiating customer to specify the initial order, and also invite other participants to contribute as well. As more contribute, the size or cost of the gift can increase—for example, a more elaborate floral arrangement can be automatically ordered and scaled according to the total amount of contributions.

In another embodiment of the invention, various smartphone or tablet apps, which can be fully customized to integrate the previously discussed "Sell My Product" (SMP) functionality has also been developed. The flow and functionality of such smartphone apps are essentially identical to the previously discussed web applications above.

Sequencing and ordering of categories of products for display on the web and smartphone apps: The order in which various products are displayed in the web browser implemented version or smartphone implemented version of the invention can be done by various systems and methods. In one preferred method, this sequencing can be done by implementing visual drag and drop functionality. Alternatively, the sequencing may be done by other methods such as inputting numeric sequence numbers, alphabetically, by price, by category, and the like.

In some embodiments of the system, the following features may be implemented, such as:

The e-commerce platform may be a cloud-based platform with associated mobile Apps. Important features can include 1) a cloud-based website and product detail/image storage system with universal mobile device integration; 2) a photograbber that auto-loads images with associated information to your website and mobile app anywhere, anytime; 3) an order transmission module that allows member merchants to sell another merchant's products at that merchant's prices and delivery fees; 4) a greeting cards module customizable with consumer's image, message, signature, etc.; 5) an automated funds transfer module for credit card payments and commission settlement; 6) an administrative panel accessible anywhere, anytime, using any web-connected device;

The system can additionally provide other features and functions including a cloud-hosted system with intrinsic security, PCI credit card compliance, and redundant data storage; and an ability to capture and upload new images or use existing images with the options for sharing with other members.

In some embodiments, the entire platform may be based on a core central database that drives all channels of commerce. The invention can include various main modules such as:

1. Network Module—Merchants who populate the central database with products. This can include an administration panel that merchants can use to manage the look and feel of web sites. Alternatively or additionally, the administration panel and various mobile Apps can manage all aspects of product placement and pricing.

2. The system can also include WebService REST API with location-based technology. This type of API is used by websites, mobile Apps and Point of Sale software systems. This can be optionally used in conjunction with merchant oriented mobiles apps such as an image upload/product upload app that will be discussed shortly, and Point of Sale apps for the merchant's in-store use, the system can also make use of other consumer-facing mobile apps such as gift apps. Data obtained with this location-based API can also be very useful to store, along with product purchase data, for subsequent various sales tracking and market research activities.

The system can also include other modules such as a Sell My Products module, Custom Greeting Cards module, Order transfer module and the like.

As previously discussed, an additional feature of the invention is its Merchant Network. Additionally, in some embodiments, merchants may register for accounts at an administration site. The administration site may provide a control panel or dashboard that allows complete configuration and management of the website and smartphone Apps.

In general, as previously discussed, the system's administration panel can be used to manage the merchant's products, promotion, and coupons. Any changes or edits made at the panel will be reflected on the website. For example, the merchant can also add/remove products, and rename categories for special seasonal events. The merchant can thus manage many aspects of the business from setting delivery zones to managing same day delivery.

As previously discussed, the system settings function to allow the merchant to upload the merchant's logo, set delivery zones, prices and payment information. Other functions include setting the merchant's Point of Sale (POS) software options. Merchant orders can be delivered by email/fax or directly to a POS partner. The merchant can also select various preferred merchant partners to facilitate affiliate sales through the system's "Sell My Products" module and also transfer orders received to other merchants who are members/registered on the network Other functions include options to setup merchant delivery coverage areas, zip codes, geographic regions and the like. The system allows merchants to manage web site banners, promo codes, delivery schedules, and pricing. Many of these settings and configurations can be further based on the merchant's business calendar and schedule.

Additionally, as previously discussed, the system allows the merchant to set up a network of preferred partner merchants. Once these are set up, the merchant and system may then transfer orders automatically using the system's "Sell My Products" module. The system also allows all orders received through multiple channels to be tracked, including order's received using the system's Smart Phone App and the Web (site) App.

As previously discussed, the invention further allows the merchant to review products, make edits as needed at any time and the changes will be reflected on all channels. The system also allows the merchant to export the merchant's product database and set dynamic pricing based on a calendar schedule.

In some embodiments, additional functions may further include an ability to sell Add-on Products, as well as to view, and make changes to various add-on/accessory products. Additionally, additional functions such as Quick Add, which allows the merchant to search and add products to other product categories, as well as to convert products from other member merchants to use on the merchant's own website/app. Other functions may include:

Add Product: Add a new product, set prices, upgrade options and upload a product image. Filter products for the mobile apps.

Sale/promotions: Create multiple promo codes. Automatic discounts/promo codes tied to a company's domain name Categories: View and rename categories based on a calendar schedule. Categories can be turned off based on a schedule.

In some embodiments, the invention may further make use of location-based technology. This can take into account the buyer's location, the recipient's location and the merchant's location, and factor these into account in computing delivery charges. This data can also be stored, along with the product sales data, for subsequent sales tracking and market research purposes.

In one embodiment of such location-based technology, a buyer may access the website using a web browser. The system may use the buyer's IP address to compute a corresponding geographical address, (Geographical IP, GeoIP). This can then be translated to latitude & longitude coordinates and mapped to a zip code and street address. Once the street address is known, the software can determine all merchants within a given mile radius, thus allowing the buyer to select a merchant of interest. Alternatively, a buyer may access an app using a smartphone. In this case, with permission, the system can use the smartphone's GPS coordinates to determine the buyer's location:

Web Service API—In some embodiments, the system may use a comprehensive set of web service calls to support its various location-based commerce schemes. These can also be used to communicate order information with payment gateways and point of sale software systems.

As previously discussed, in some embodiments of the "Sell My Products" functionality—the seller may not have its own website. Instead, any merchant or service provider can upload their products or services for sale by other member merchant. The system allows the merchant to upload these products or services; set pricing and set other items such as preferred commission splits.

This module may also be used to build a primary merchant's local marketplace where local merchants can be aggregated. Examples can include, flowers, cakes, party supplies, etc.

Custom Gift Cards—As previously discussed, in some embodiments, buyers can access a library of images or upload personal images and doodle directly on the image to create a custom gift card. The gift card can be printed in the recipient's location by the delivering merchant (which may be a remote merchant) prior to delivery of the product.

FIG. 46 shows more details of this custom gift card process. Here a database, such as the centralized database (106), can contain data for various gift card template images, graphic images, and text fonts. Indeed, to minimize royalties as well as to encourage merchant artistic expression, the system may also provide an interface, such as a web browser based administrator webpage, to allow the merchant or other administrator to upload additional gift card template images or graphic images as well. The e-commerce customer may also upload images.

In some embodiments, the gift card interface will appear only after the e-commerce customer has made a product selection, but before the final purchase is done (see FIG. 2C-272). If the customer elects the gift card option (which will often cost extra), the system outputs a gift card generation interface to the e-commerce computerized device (often to a web browser) (274).

Returning to FIG. 46, the gift card generation interface appearing on the e-commerce customer's computerized device is shown as (108*a*). As can be seen, this gift card generation interface is configured to allow the customer to select various gift card template images or graphic images, enter text to be rendered using various text fonts, as well as sketch drawings or handwriting on the card using a mouse touch-sensitive interface, or the like. The output from this creation process can be an electronic gift card file which can be transmitted back to either server (102-M1*a*) and/or centralized server (100). Thus once the customer purchases the product, this electronic gift card file can be transmitted to a printer (134) associated with the product's shipping location (here this is Merchant 2's printer). This printer (134) can then print out the actual hard copy gift card (136). The system can also instruct Merchant 2, for example, to then bundle this card (136) with the product (130*b*) and deliver both to the recipient (132*b*) at the same time and location. Thus, for example, the recipient can get a nice bouquet of flowers with an attached customized greeting card. Unlike the flowers which will quickly fade, the card can last forever, and will be more highly valued because it is customized.

Although various types of software may be used to create the customized greeting card, as previously discussed, in some embodiments the systems and methods of commonly owned U.S. patent application Ser. No. 13/441,781, the entire contents of which are incorporated herein by reference, may be used.

In this embodiment, gift card generation interface can be configured to load previously stored gift card template images on a remote server (e.g. 100, 102-M1a) thus creating an image layer, and to then transmit an HTML copy of this image layer to the customer's web browser or app. There they can view this image layer, and use their web browser or app to both annotate the images, as well as transmit an HTML copy of these annotations to the remote server.

The remote server can then use these annotations to create at least one annotation layer, and combining this with the image layer, create an annotated gift card document image. This annotated gift card document image can then be transmitted back to the customer, where they can accept (or modify) this annotated gift card document image. Once accepted, this image can then be transmitted to the printer (134) in the form of an electronic gift card file.

Alternatively, in some embodiments, either instead of or in addition to printing out a physical hard copy of the gift card (136), the system can also send an electronic version of the gift card to the recipient (132b) or other individuals, for example in the form of email.

Order transfer module—Merchants can view orders received and selective transfer them by email, fax or electronically to another merchant globally as long as the other merchant are a member. The transfer protocol can also support a time-based threshold to facilitate acceptance or rejection.

Cloning automatically customized websites, and search engine optimization

In the modern world, where customers do large amounts searching for products using search engines such as Google, Bing, and the like, local merchants often find themselves in an intense, if hidden, value for online presence and good search engine ranking. To facilitate this, merchants often acquire multiple website domains (e.g. flowerstuff.com, flowerstuff.net, flowerstuff.org, myflowerstuff.com, localflowerstuff.com, etc.), and then have these domains forwarded to the merchant's main e-commerce website. Search engines, however, are aware of this trick and are designed to ignore such domain forwarding.

Figure 47:
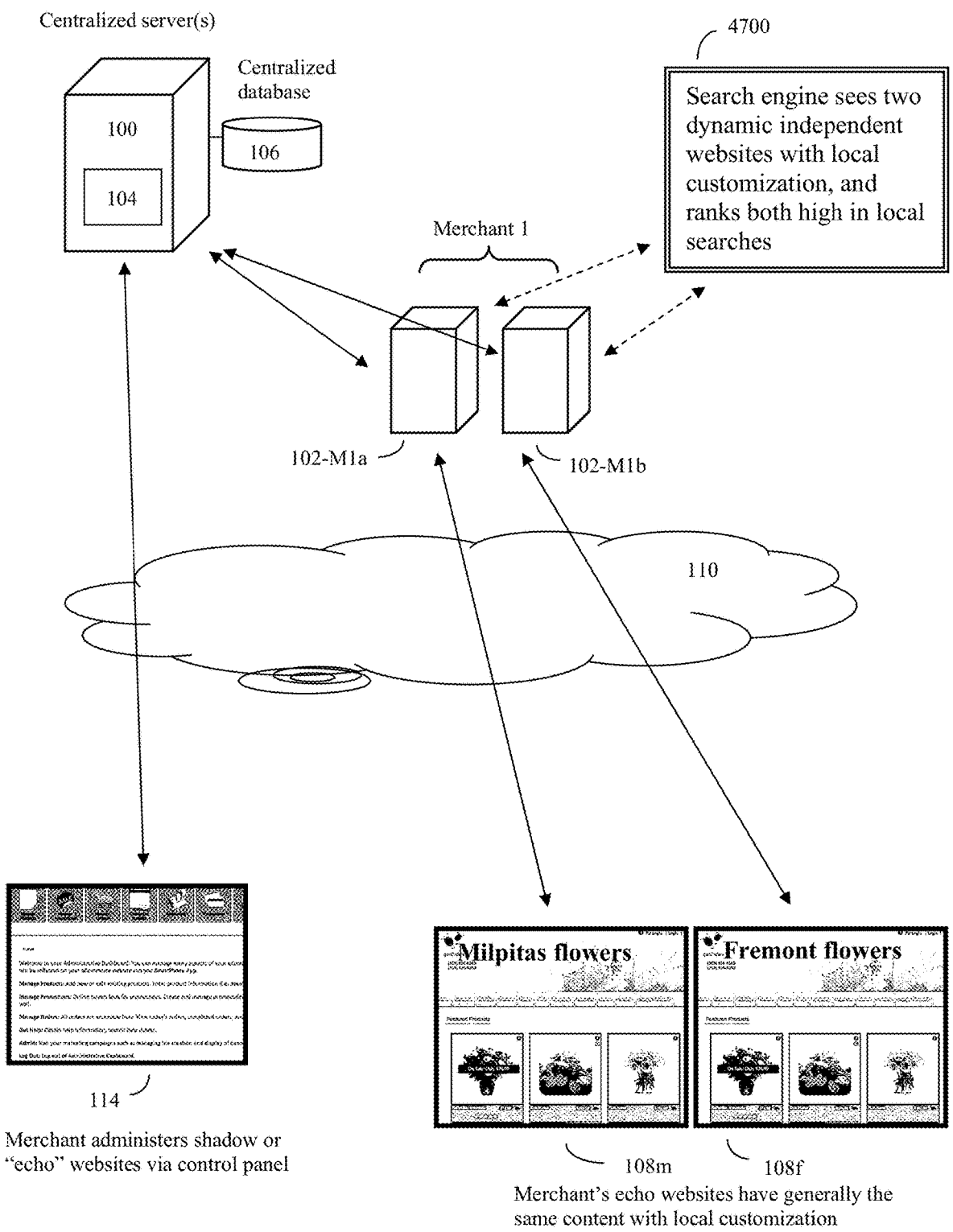
FIG. 47 shows an example of how the system can clone multiple related e-commerce websites, each automatically customized for a particular target audience. This feature helps drive sales to various specialized groups, and also is useful for search engine optimization purposes.

In some embodiments of the invention, the system may also be designed to accommodate a plurality of commonly controlled (e.g. all owned by the same merchant, websites such as FIG. 1 websites/servers (102-M1a and 102-M1b). These "different" (but commonly controlled) e-commerce websites will generally have a plurality of commonly controlled URL, but generally at least some of these commonly controlled websites will be focused serving on different geographical regions or other different types of local groups. For example, Merchant M1 may focus website (102-M1a) on serving a first town, and website 102-M1b on serving a neighboring town only a few miles away (also within his geographic service area). An example of this embodiment is shown in more detail in FIG. 47.

In this embodiment, the centralized database (106) can also store geographic region or other type customized data for at least some of these websites (e.g. commonly controlled e-commerce websites focused on different geographic regions). The geographic region customized data can be as simple data with location-specific names and graphics (e.g. "Milpitas Flowers", "Fremont Flowers"). The system may also be configured so that this geographic region (or other type) customized data may be further managed from a web browser based administrator webpage, often the same administrator web page used to administer other system functions (114).

Thus, instead of just producing one website composed of various dynamic sections, the system may be configured to produce multiple websites (e.g. 102-M1a, 102-M1b) composed of the same various dynamic sections as before, but then additionally customized by the geographic region (or other type) customized data. Thus an e-commerce customer (108m) from the California city of Milpitas might contact website (102-M1a) (say Milpitasflowers.com) and, due to the geographic region customization data, receive a Milpitas customized website. By contrast, an e-commerce customer (108f) from the nearby city of Fremont might contact website (102-M1b) and, again due to the geographic region customization data, receive a Fremont customized website. However, both websites would be controlled by the same merchant, and be served by the same merchant (M1). After the initial geographic customization was done, this would require almost no effort on the merchant's part replicate one dynamic website (with automated customization) to become multiple websites.

However the search engines (470), instead of seeing a redirected website, will in this example see two independent dynamic but region customized websites, and thus tend to rank both websites higher in the search engine results. This search engine optimization process may be further facilitated by exposing at least some of this geographic region (or other type) customized data to the search engines using schemas recognized by the search engines. Useful search engine schemas may include microdata tags, first introduced in HTML5. These may follow schema.org formats or other formats as desired.

Note again that the geographic automatic localization is intended to be a specific example, and is not otherwise intended to be limiting. Websites could just as easily be customized to appeal to young or old customers left handed or right handed customers, customers who belong to various special interest groups, and the like. Any automatic customization scheme is contemplated.

Posting to Social Networks

In some embodiments, the system may also be configured to allow a merchant to automatically post updates (such as the introduction of new products) to various online social networks such as Facebook, Twitter, Pinterest, and the like. In this embodiment, often the centralized database (106) will store links to various social networks of interest, as well as the merchant's login information to the various social networks of interest.

In this embodiment, depending on system settings, when the merchant uploads a change to the merchant's product data, either the centralized server (100) or individual merchant e-commerce servers (e.g. 102-M1a) can automatically transmit information pertaining to these product changes to the various selected social network websites. Additionally, these postings can also be calendar/schedule driven so that the merchant can plan and schedule a variety of different postings ahead of time.

As previously discussed, these same concepts may be used to allow an e-commerce customer to also automatically post updates showing purchases or items of interest to the e-commerce customer's social networks.

Backend Systems, Methods, and Software

In addition to the inventions systems, methods, and software described above, in some embodiments, the invention may further comprise additional systems, methods, and software oriented towards product production and distribution.

Product Production

Figure 48:
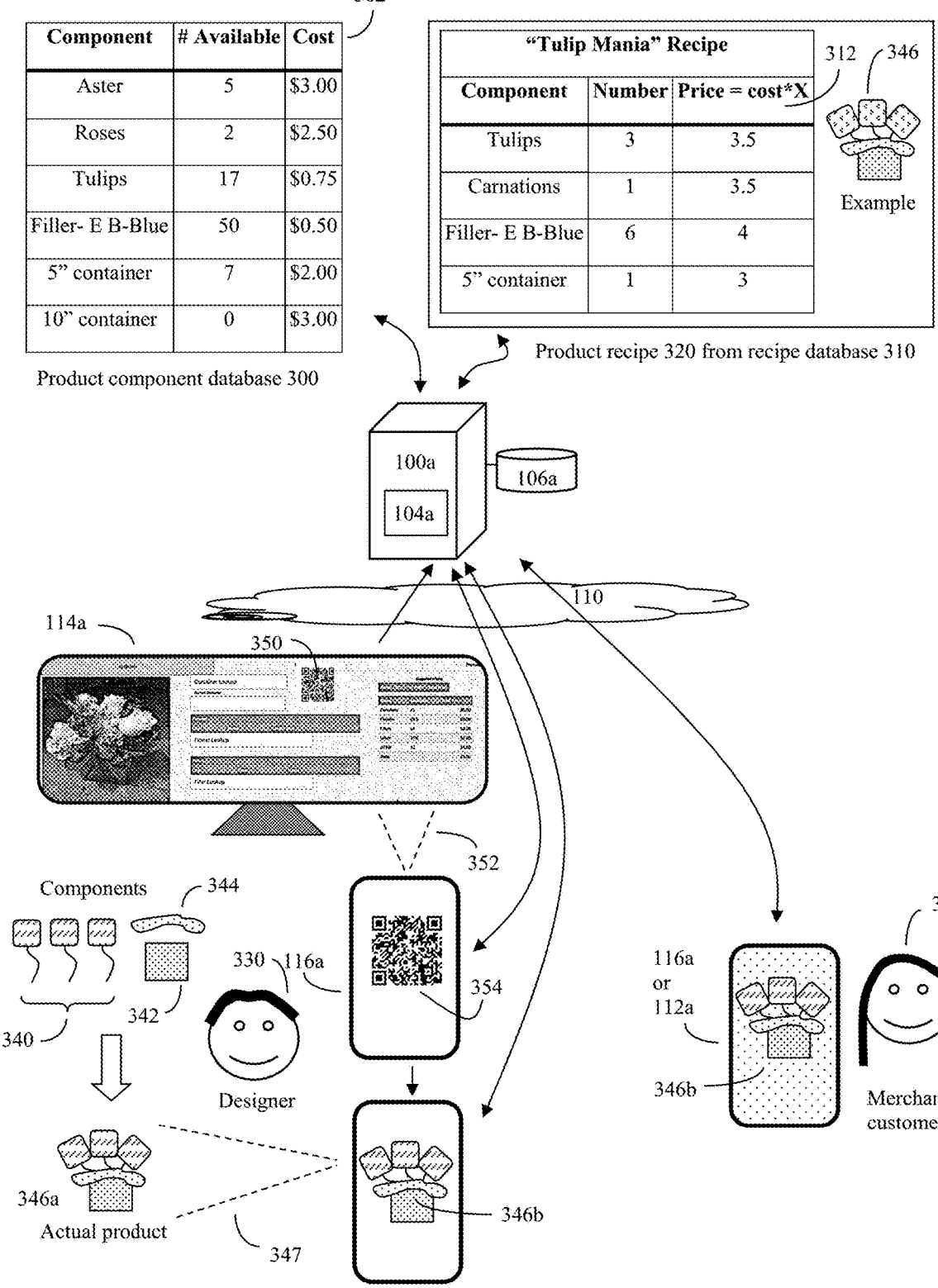
FIG. 48 shows an overview of the product production backend software.

FIG. 48 shows an overview of one embodiment of the invention's product production backend system. In some embodiments, this system can be implemented by product production backend software (104a, FIG. 49). This can be implemented in various ways, such as in the form of a software module that interfaces with the previously discussed automated website creation software (104). In some embodiments, the product production backend software can run on the same servers (100a) and database (106a) used to implement the other previously discussed aspects of the system.

Figure 49:
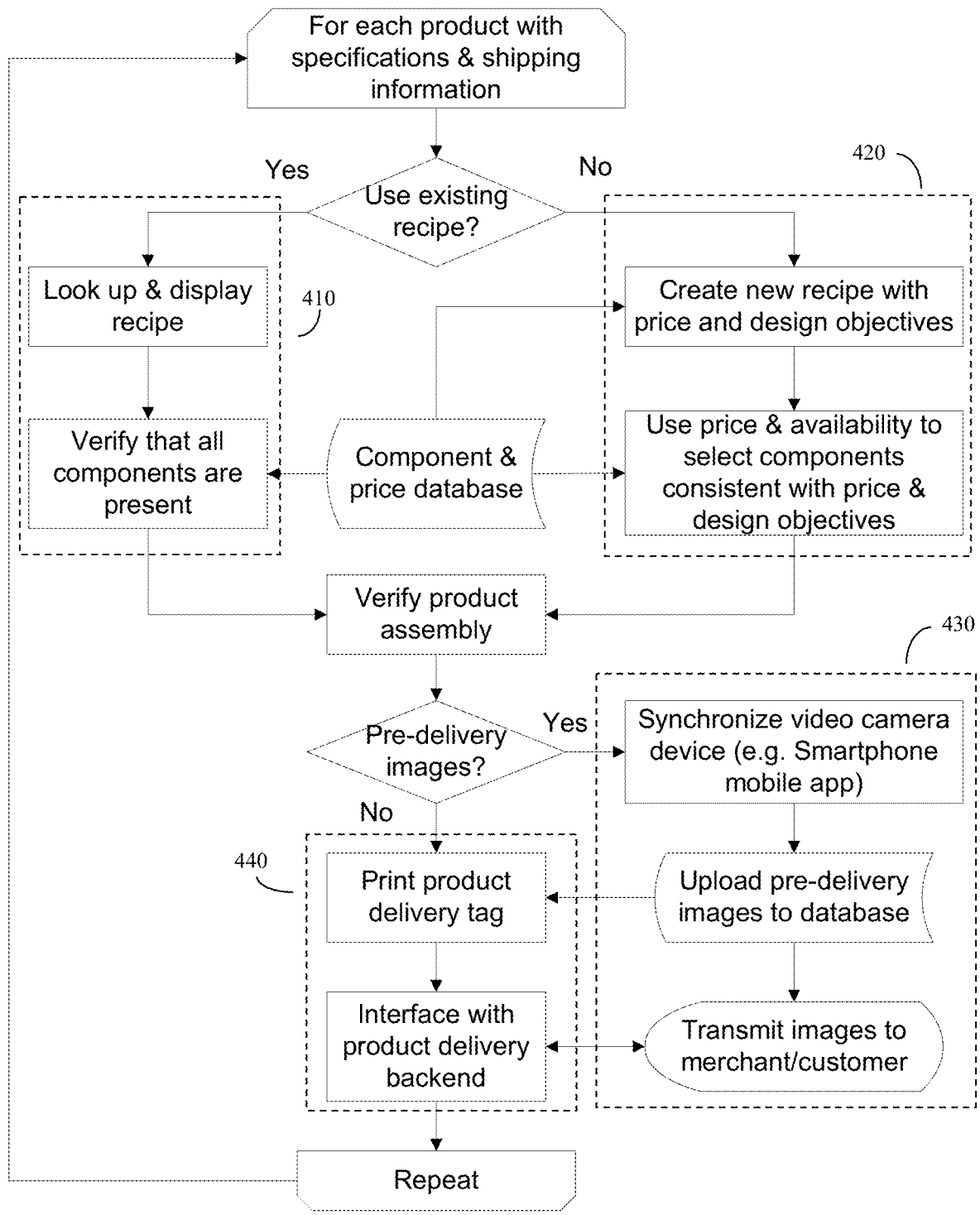
FIG. 49 shows a flowchart showing an embodiment of the product production backend software.

FIG. 49 shows a flowchart showing an embodiment of the product production software (104a) that can be used in the product production backend system. This can be helpful in better understanding some of the various steps that are also shown in FIG. 48 as well.

In alternative embodiments, the product production backend system software can be implemented using different servers and databases. Here the product production backend system software may run more independently, but will nonetheless be configured to exchange data (e.g. products available for sale, customer information, delivery addresses and times) with the previously discussed system software (104), usually over a computer network (110). Although the invention is thus agnostic as which specific servers and databases run the product production backend system software (as well as the product delivery software discussed in the next section), to avoid confusion, here we will designate the servers, memory, and databases running the product production software (104a) as server (100a and database memory 106a).

As before, the server (100a) running the product production backend server communicates with various computerized devices, often by wireless signals sent over a computer network such as the internet (110). These computerized devices are often desktop computers, laptop computers, tablet computers, and smartphones. Smartphones, such as (116a) will often be used as a specific example of these computerized devices, but this example is not intended to be limiting.

The various computerized devices can interact with the server (100a) by the use of web browsers (e.g. 114a), or by custom apps such as a product production app. If web browsers are used, assume that the server is providing appropriately configured product production web pages for the web browser. Here, if the term "app" is used, it may be assumed that the same functionality may be provided by the server providing appropriately configured web pages, which are then read on an appropriate browser.

Thus although, when smartphones or tablet computers are used, it will often be convenient to use custom apps, the use of a custom app is not required, and the same functionality may be provided by appropriate server provided web pages and corresponding smartphone or tablet web browsers. In these examples, as previously discussed, assume that the product production backend server is communicating with handheld computerized devices such as smartphones (which may be running appropriate smartphone apps) (112a, 116a) over a computer network (110) such as the internet.

Although this specific configuration is not intended to be limiting, to illustrate one embodiment of the invention, assume that the product production database (106a) comprises one portion with a product component database (300) and a different but related portion comprising a database of different product recipes (310). In the example shown in FIG. 48, a recipe for a particular "Tulip Mania" bouquet product is shown as (320).

Here typically each product (e.g. previously discussed products 130a, 130b, 202, 206, 210) and also (320a) will typically comprise at least one product component (in this example, the components can be various flowers, bouquet fillers, and containers). These components are stored in the product component database (300). According to this scheme, the "product data", can further comprise product recipes (310, 320). Here (310) would represent all a recipe database that might include all product recipes, while (320) would represent a specific product recipe. Each individual product recipe (320) will typically contain a list comprising those product components required to produce a given product, such as (320). Additional information, such as example product pictures (346), financial information, and other information may also be included in the product recipe.

Each merchant will typically have their own local inventory of product components on hand, and this inventory may differ between merchants. For example, some merchants may have a lot of tulips, but be temporarily out of roses. The merchant's inventory (either present or anticipated future inventory if desired) is thus stored in the product component database (300), along with additional financial and other information as desired.

Thus the system's product component database (300) will typically keep computer readable records of those product components that are available for a given specific merchant. (Of course in some embodiments, local merchants may also opt to exchange information with suppliers or other merchants so that the product component database could also contain information about additional supplies that could be quickly delivered to the specific merchant).

Thus, the product component database, shown in FIG. 48 (300), shows various components (e.g. various flowers, fillers, and containers) along with the number of each component that is presently available (see #Available field) to that given merchant. Other information, such the merchant's cost (e.g. a wholesale price that the merchant may have paid for any given component) can also be stored in the product component database.

In this example, assume that the merchant either also employs a separate "product designer" to assemble the various components into various bouquet products, or alternatively the merchant assumes a "product designer" role and does the assembly personally.

The systems product production backend software (104a, see FIG. 49 for a flowchart) is typically configured to use the product recipes (such as specific recipe 320 from recipe database 310) and the product component database (300) to provide information that can be used to provide a design user interface for the merchant and/or product designer. This designer user interface will typically be configured to provide various types of product assembly information (see FIGS. 50, and 51A-51B for specific examples). Since this product assembly information can be merchant-specific (i.e. use components that the merchant has on hand at a given time, or use the merchant's own custom recipes, this can often be viewed as being "merchant specific" product assembly information. Of course, merchants can also exchange recipes amongst themselves as well.

In some embodiments, the product component database (300) can further comprise product component price data (302), and product component markup data (312)

Alternatively, the product component markup data can be stored in a different portion of the database such as in the product recipe database (310). As previously discussed, although we are examining different aspects of a database, these particular examines are not intended to be limiting. Thus the product component database (300) and the product recipe database (310) can be the same database. However, it is useful and simpler to discuss the component and recipe aspects of the database separately.

In this example, the "product component markup data" is expressed in FIG. 48 (312) as a (retail price)=wholesale cost (302)*X, where "X" is the component markup value for any particular component. Here, the merchant is determining that the retail price of the final product should mark up the retail price of the tulip component to 3.5× the wholesale price to the merchant.

Thus, in some embodiments, the product production backend software (104a, FIG. 49) is configured to help the merchant maintain certain financial goals as well. In some embodiments, as is shown in FIG. 49 (410), the product production backend software may be configured to use the specific product recipe (320), the product component price data (302), and product component markup data (312) to compute product costs and product selling price. This can be done by configuring the software to add up the various components used in the recipe. Additional factors, such as labor, overhead, percent waste, and even shipping may also be computed. See FIG. 50 for one example of these features.

Figure 50:
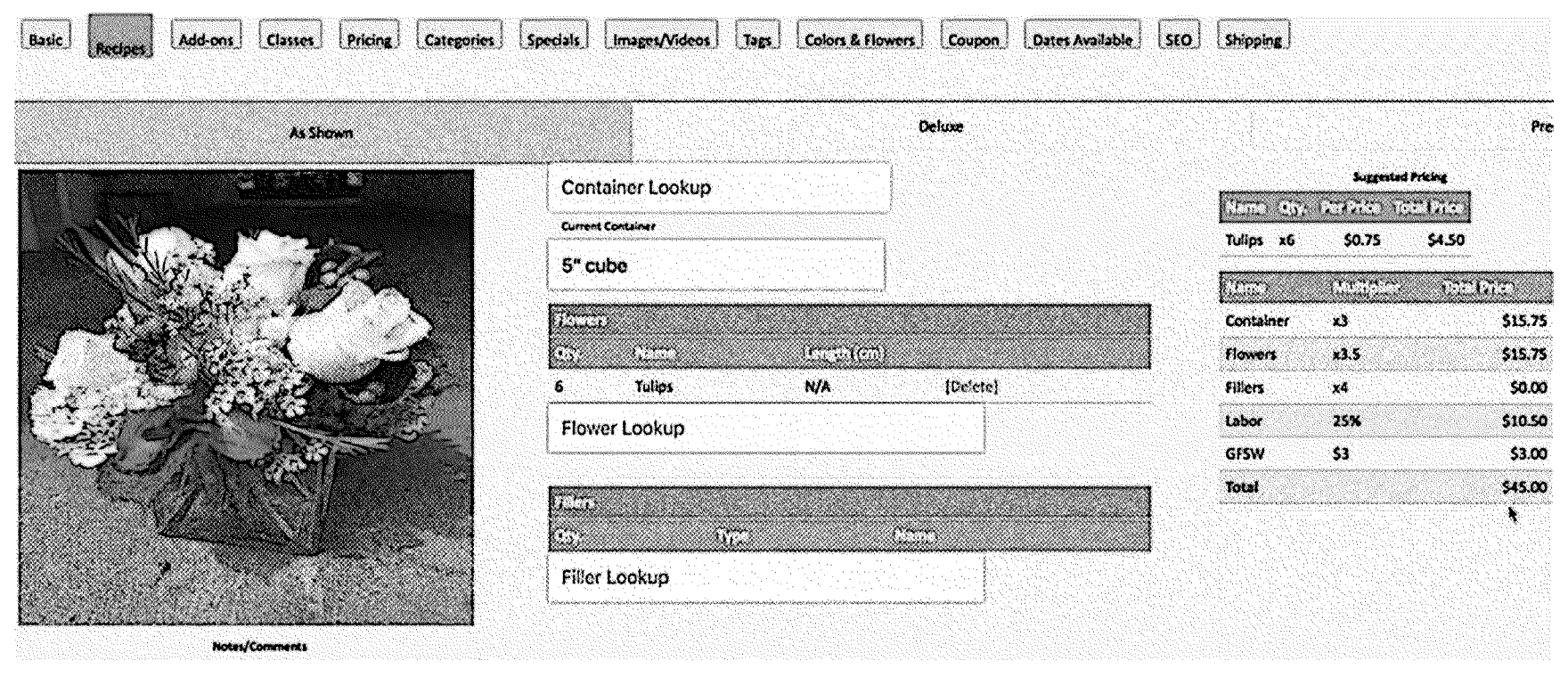

FIG. 50 shows a screenshot of product designer user interface, here shown running on a merchant web browser (114a) on a tablet computer or laptop/desktop computer. This product designer user interface is configured to provide product assembly information for producing a particular flower arrangement. Here the merchant or designer (330) may be creating a new flower arrangement product recipe. The corresponding software that implements this "create a new recipe" functionality is shown in the software flow chart in FIG. 49 (420). The merchant has already uploaded an example photograph 346, and is now setting up the recipe by selecting among various containers (340), flowers (342), and fillers (344) for this particular product (346a).

When the merchant or designer wishes to produce this particular product, the prefilled recipe (320) can be retrieved from the recipe database (310) and used as product assembly instructions. The software that implements this functionality is shown in FIG. 49 (410).

In either case, the product production backend software can be configured to use the product component price data (FIG. 48, 302) and the product component markup data FIG. 48, 312), to compute the (wholesale) product costs and the (retail) product selling price for a new product recipe. Examples of this later type of functionality are also shown in FIGS. 51A and 51B.

Occasionally, customers simply want to purchase a flower arrangement (product) that meets a particular retail product price objective, for example, say a $60 price objective. That is, a customer may simply specify, "$60 worth of flowers".

Figures 51A, 51B:
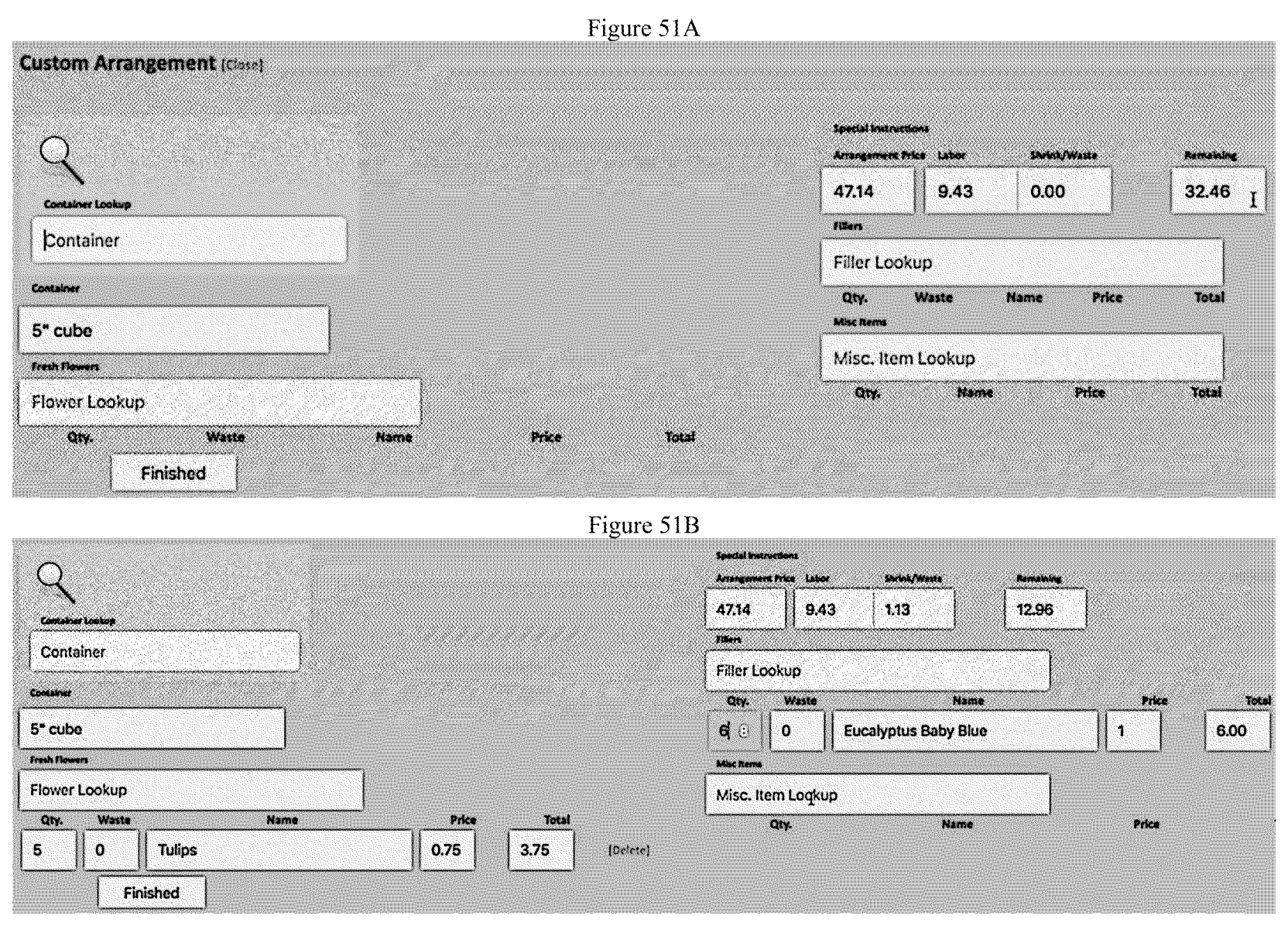

FIG. 51A shows an alternative product designer user interface that can either be used to create new recipes or produce one-time customized recipes designed to meet a customer retail price objective.

For these situations, the system can help the merchant work with stock on hand to produce a product that meets a particular retail price objective. As the designer user makes custom design choices (e.g. choice of container, choice of flower, choice of filler plants), the system can draw upon the product component database (300) showing the components in inventory, with their corresponding merchant prices (cost) and markups (factor by which the cost is multiplied to compute a retail price). This enables both the system and the designer user to keep track of how the various design choices impact the ultimate retail cost to the customer. In FIG. 51A, no components have been fully selected yet, but the designer user is considering using a 5" cube container for the product.

FIG. 51B shows a later stage in the custom design process previously shown in FIG. 51A. Here the designer user has now selected the 5" cube container and has also selected a flower type and quantity (5 tulips). The designer user is now considering how much and what type of filler should be selected in order to meet the overall retail price objectives. The system is keeping track of this and is also letting the designer user know how much price margin is remaining.

Thus, to summarize, the product production backend software (104a, FIG. 49) can also provide cost and markup information to allow the merchant/designer to better compute product costs and product selling prices. The completed product recipe can optionally also be stored as a routine product, which can also be automatically displayed on the merchant's website as a standard product item, sometimes in a dynamic manner, as previously discussed. When this product is ordered, the system can then retrieve this particular recipe and the merchant can then use this particular recipe (320) to produce additional copies (346a) of this particular "Tulip Mania" product (346).

In some embodiments, the product production backend software can also be configured to perform various product quality verification operations as well. For example, when the product is a floral arrangement, the visual appearance of this arrangement both immediately after initial production (discussed below), and also after delivery (discussed shortly), is often of great importance to both the customer and the merchant. Here pre-delivery images or video of the product (see FIG. 48, 346a) after assembly can be very useful.

Such images or video can be entered by into the server (100a) and database (106a) by various methods. Today's smartphones (e.g. Apple iOS, Android OS, etc.) are typically equipped with excellent cameras and are now carried routinely by almost everyone. Thus in some embodiments, the product production backend software (104a, FIG. 49, 430) can be configured to receive pre-delivery product data from a smartphone or network connected tablet computer (116a). Here this can be done by using an optional product design mobile app or simply by using the smartphone's built-in web browser software or other built-in camera management software.

In the example shown in FIG. 48, the smartphone or networked connected tablet computer (116a) is equipped with a processor, user interface and at least one video camera, and this smartphone can also be configured to run a product design mobile app. This product design mobile app can be configured to use this at least one video camera to obtain (FIG. 48, 347) pre-delivery images and/or video of the product (FIG. 48, 346b), and upload these pre-delivery images or video of the product to a database (106a), such as the centralized database (106). These images or video can then be sent to the merchant or e-commerce customer (332) device (116a, 112a) as desired. The section of the product backend software behind this method is also shown in the software flowchart (see FIG. 49 section 430).

Various methods can be used to ensure that the proper uploaded images (346b) are associated with the correct product (346a). For example, in some embodiments, the product backend software can be configured to generate a QR code (see FIG. 48 350) or other visual code identifying the product on a display screen of a computerized device (114a) controlled by (e.g. receiving data from) the backend software 104a). Here, for example, a mobile app or web browser running on a computerized device, such as a smartphone (116a) can be used. This mobile app or web browser can be configured to direct the user of the computerized device (e.g. the operator of the device) to use the device's at least one video camera to receive (photograph 352) this QR code or other visual code from the display screen (on 114a), and to use this QR code (or other visual code) to identify at least one of either images or video of an object (here the product 346a) as being at least one of either pre-delivery images or video (346b) of the product (346a).

FIG. 48 shows an image of the QR code (350) photographed (352) by a designer (330) smartphone (116a), and appearing on the smartphone screen as (354). This information is then transmitted to the server (100a). This process is shown in more detail in FIGS. 52A to 52D. See also some of the underlying software functionality in the software flowchart in FIG. 49 (430).

Figure 52A:
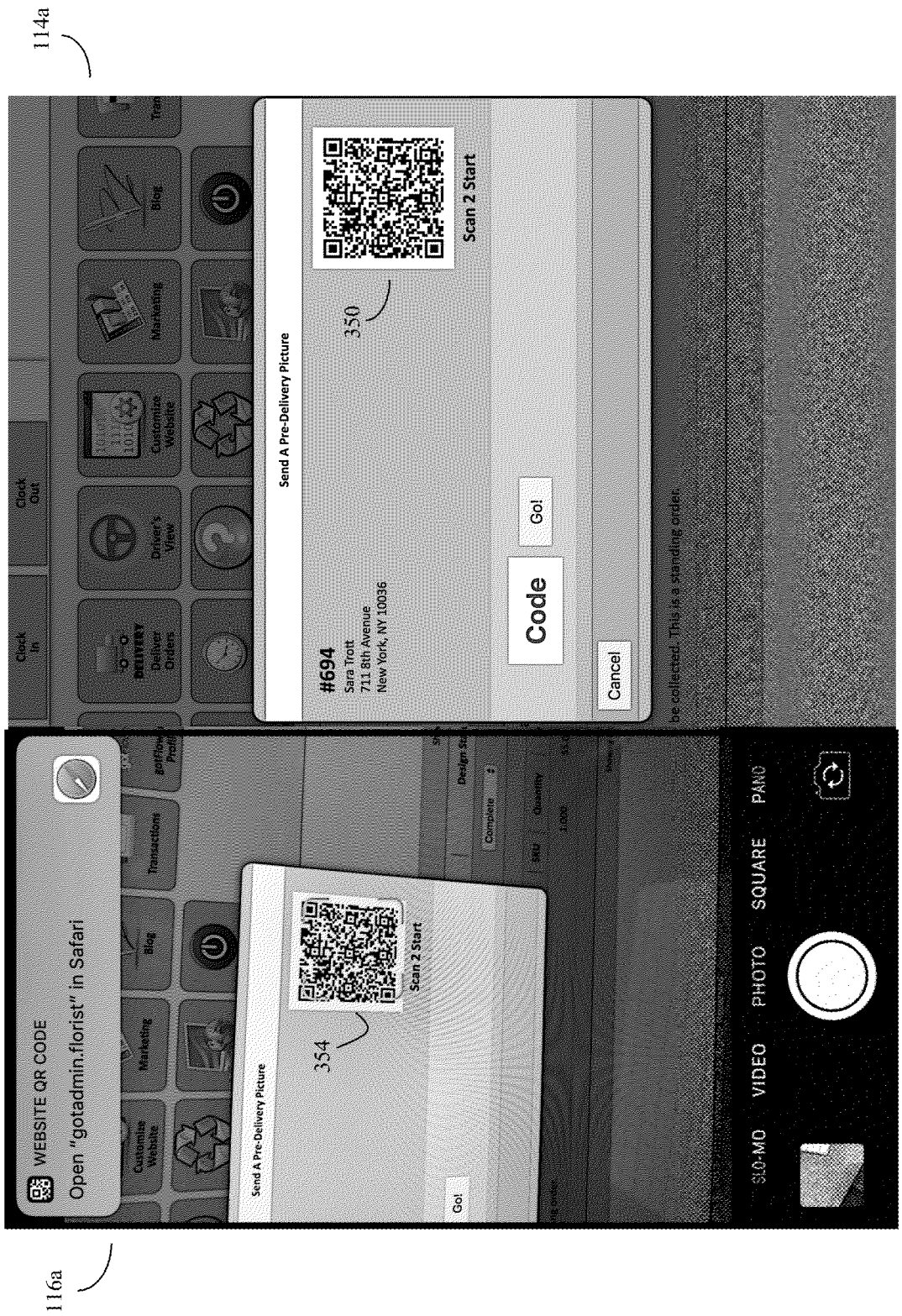
FIG. 52A shows how the system can use QR codes and an appropriately configured website (or app) to synchronize a network connected smartphone, or other computerized device, to obtain pre-delivery pictures.

FIG. 52A shows a composite image of how the system can use QR codes (350) displayed on the screen of an appropriately configured website (or app) (114a) to synchronize a network connected smartphone (116a), or other computerized device, to obtain pre-delivery pictures. Here a designer user (FIG. 48, 330) has logged into this website using a first computerized device (such as a merchant-based terminal at work 114a) and is using a smartphone (116a) to focus (FIG. 48, 352) on the QR code (350) displayed on the screen of this first computerized device (114a). This allows the designer user to synchronize his smartphone (116a) with the product assembly system. In this composite image, the designer user's smartphone screen (116a) is shown on the left, showing the QR code (354) as imaged by the smartphone. A portion of the display screen (114a) showing its QR code (350) is shown on the right. This configuration allows the designer (330) or merchant to confirm that the next pre-delivery image will be associated with product #694 being shipped to the recipient (or customer) "Sara Trott".

FIG. 52B shows that in this embodiment, the received QR code (354) has now directed the user's smartphone (116a) to the appropriate portion of the merchant's product assembly website or app. The system is now prompting the user and the smartphone to take a pre-delivery picture of the product (here a flower arrangement).

FIG. 52C shows that after the designer user (330) has taken (FIG. 48, 347) the pre-delivery picture (346b), the system can also provide an optional verification process, such as a user entered verification code (here the code is "T67G"), that the designer user can enter into the smartphone (116a). This verification code can also be uploaded to the server (100a), and used to further verify a correct match between the pre-delivery picture (346b) and the corresponding product (346a).

FIG. 52D shows that the system has now received a pre-delivery picture, and has transmitted it back to the user's smartphone for verification. The user can verify this process by entering the verification code (t67g), thus confirming that the uploaded image is associated with the correct product going to the correct customer.

Note that in some embodiments, this pre-delivery picture can be uploaded back to the server (100a) by various alternate methods as well. These alternate methods include using the smartphone (116a) or similar handheld computerized device to transmit the pre-delivery picture back to the server by email, text mail, and the like. Such alternate methods are also considered to be within the scope of the invention.

In some embodiments, the system may further incorporate backend functionality and software that is useful for more than one basic function, such as for any of front end customer facing applications, product assembly, and product distribution.

In some embodiments, the product backend software can be configured to generate a QR code or other visual code identifying the product, and then also print this QR code or other visual code onto a product delivery tag (356) that may be associated with or affixed to the assembled product (346a). The backend software for printing this tag is shown in the software flowchart in FIG. 49 as (440).

A similar type of custom printing functionality was also discussed earlier in this specification. See FIG. 46 and the previous associated discussion on printing material, such as tags, associated with specific products.

The product delivery tag can have multiple uses. It can be used to help verify that the product has been assembled properly. Additionally, as will be discussed shortly, this product delivery tag (356) can also be used by the system's product delivery backend software to help track the product during delivery.

As previously discussed (see FIG. 2C and associated discussion), typically the invention disclosed herein can be configured to obtain delivery addresses. In some embodiments, these delivery addresses can also be used to help inform the customer about various delivery options and charges, and can also be used by the system's product delivery backend software as well.

For example, as previously discussed, the system's at least one server processor (such as any of server 100, 100a, 100b) may be configured with software configured to receive delivery information from the customer. This delivery information can include information pertaining to where the product is to be delivered, and how fast the product is to be delivered. For example, some products may need to be delivered on a rush basis, such as during a specific time window during the day, while for other products, a precise delivery time during the day is not important, and thus is not specified.

Product delivery information and estimated charges: As previously discussed (see FIG. 2A and FIG. 2B), in some embodiments, the invention can be configured to, in response to receiving a product purchase request comprising a product identifier and a requested delivery location and delivery time from an e-commerce customer (this customer is usually interacting with the at least one e-commerce website with an e-commerce computerized device configured to run an e-commerce customer web browser or app), calculate delivery charges and perform other product delivery functions.

For example, the system can be configured to determine both a given product's shipping location, and also examine the product delivery time and location constraints for this shipping location. The system can be configured to use this delivery location and delivery time to automatically compute the product delivery charges and surcharges. The system can, for example, be configured to automatically add these various charges up and transmit at least the total charges (e.g. the sum of the product delivery charges or surcharges for the product). These various charges can then be displayed on the system's e-commerce website. This way the customer can see the proposed total charges, and make adjustments as needed.

In some embodiments, the system's server processor (100, 100a, 100b) and software may be configured to perform additional functions in response to information that an e-commerce customer has purchased a product using the system's e-commerce website or app. For example, the system software can be configured to direct the processor to record, in the centralized database (or other database), a sale of a given product, the product shipping location (e.g. the merchant's location where the product is located before shipment), the requested product delivery time and the requested delivery location.

The system can also be configured to transmit notification (or confirmation) of the product sale to the e-commerce customer, as well as to at least one computerized device (such as a smartphone) associated with distribution of this product from the product shipping location. This information can also be used by the invention's product delivery system, methods, and software, discussed in the next section below.

Product delivery backend system, method, and software:

In some embodiments, as discussed below, the system will further comprise product delivery backend software configured, often on a merchant-specific basis, to use the above product delivery time and location constraints, as well as various merchant specific delivery resources discussed below, to optimize product delivery for the various products.

Figure 53:
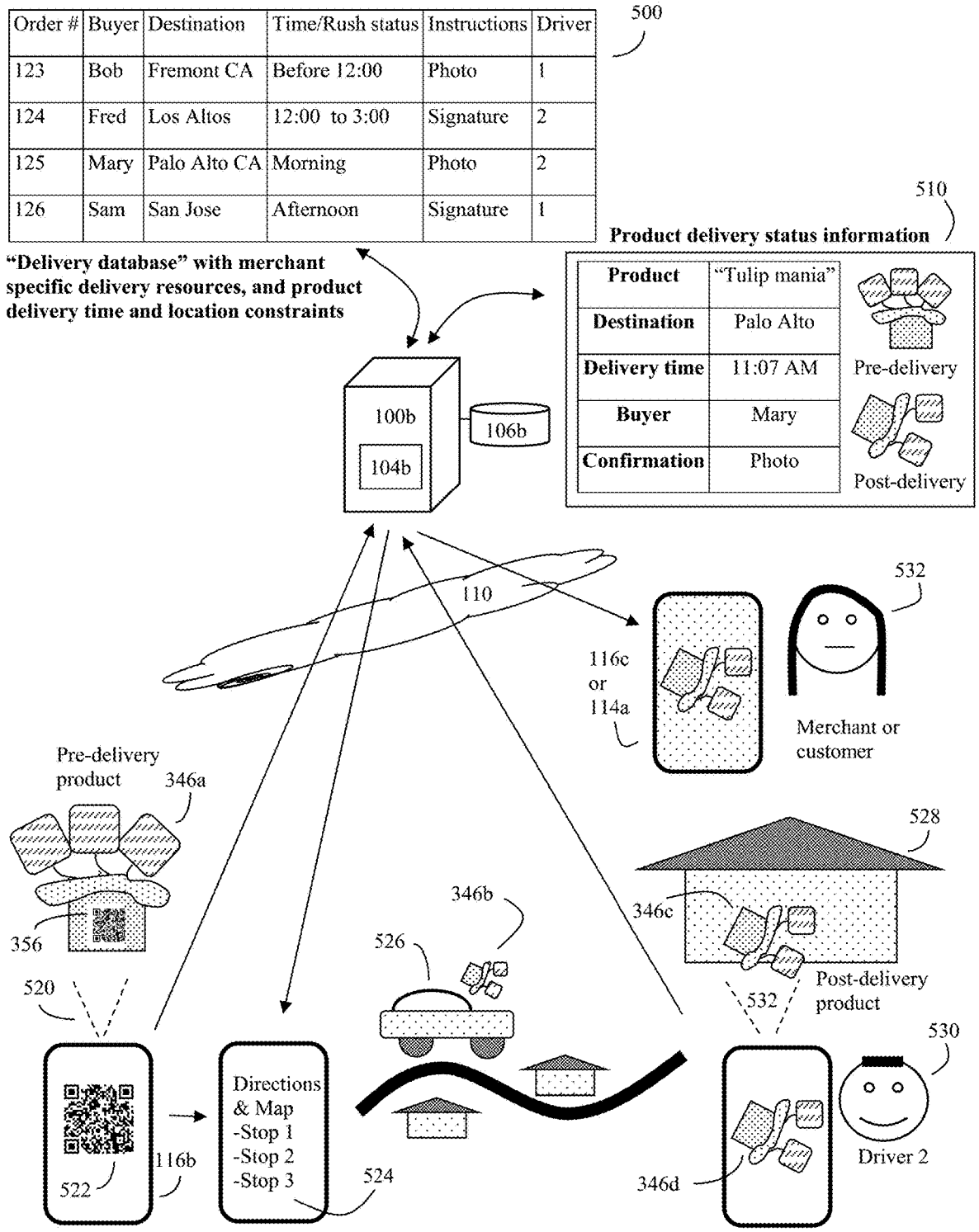
FIG. 53 shows an overview of the product delivery backend software.

FIG. 53 shows an overview of the product delivery backend system and software. This product delivery backend software (104b, see also FIG. 54A) may often be configured to run using the same servers, processors, and databases (100, 100a, 104, 104a, 106, 106a) used for other parts of the system. Alternatively, the product delivery backend system and software may be run on separate servers, processors, and databases that are configured to automatically exchange information with the other parts of the system. Here, for convenience, the server, software, and database system running the product delivery backend software are designated as (100b, 104b, and 106b), but this distinction is not intended to be limiting.

An overview of the product delivery backend software in operation is shown in FIG. 53 and FIG. 54.

In this embodiment, as per the font-end and product manufacturing aspects of the system (previously described), the product delivery backend software (104b) will typically be run on a server (100b) along with a database (106b). This database will typically comprise merchant specific delivery resources (e.g. what drivers are available to deliver products for the merchant on any given day) as well as the product delivery time and location constraints (e.g. where the products are to be delivered and at what time) for the various products. This product delivery database is shown in FIG. 53 as the "delivery database" (500).

In some embodiments, the product delivery backend software and system will work in conjunction with one or more computerized devices (often managed by the various drivers) associated with distribution of product. These computerized devices associated with the distribution of product can comprise at least one handheld computerized device (such as a smartphone 116b), which can either run an optional product delivery mobile app, or else run a web browser communicating with server (100b).

Here the product delivery backend software (104b, FIG. 54A) running on server (100b) will typically be further configured to interface with the smartphone and optional product delivery mobile app (116b) using a wireless connection (e.g. cellular, WiFi) and a computer network such as the internet (110). Alternatively, as discussed above, a smartphone web browser configured to receive web pages from the server (100b) may be used in place of this product delivery mobile app. In our examples, however, we will use a product delivery mobile app running on a smartphone, and show screenshots from this particular app.

In some embodiments, this product delivery mobile app (116b) (or web browser) may be configured to receive driver status information (e.g. which drivers are available, where they are) and delivery status information (510) from the merchant's various drivers, and then transmit this information to server (100b). For example, the system can be configured to enable the drivers to use a driver mobile app and a smartphone (116b) to transmit both the driver's own status (e.g. "driver status information", such as the driver's availability to work on any given day) as well as the product delivery status (e.g. "delivery status information" 510, such as if the product has been delivered yet) back to the product delivery backend server and software (104b). This information can then be stored in the delivery database (500) or other database as desired.

Figure 54A:
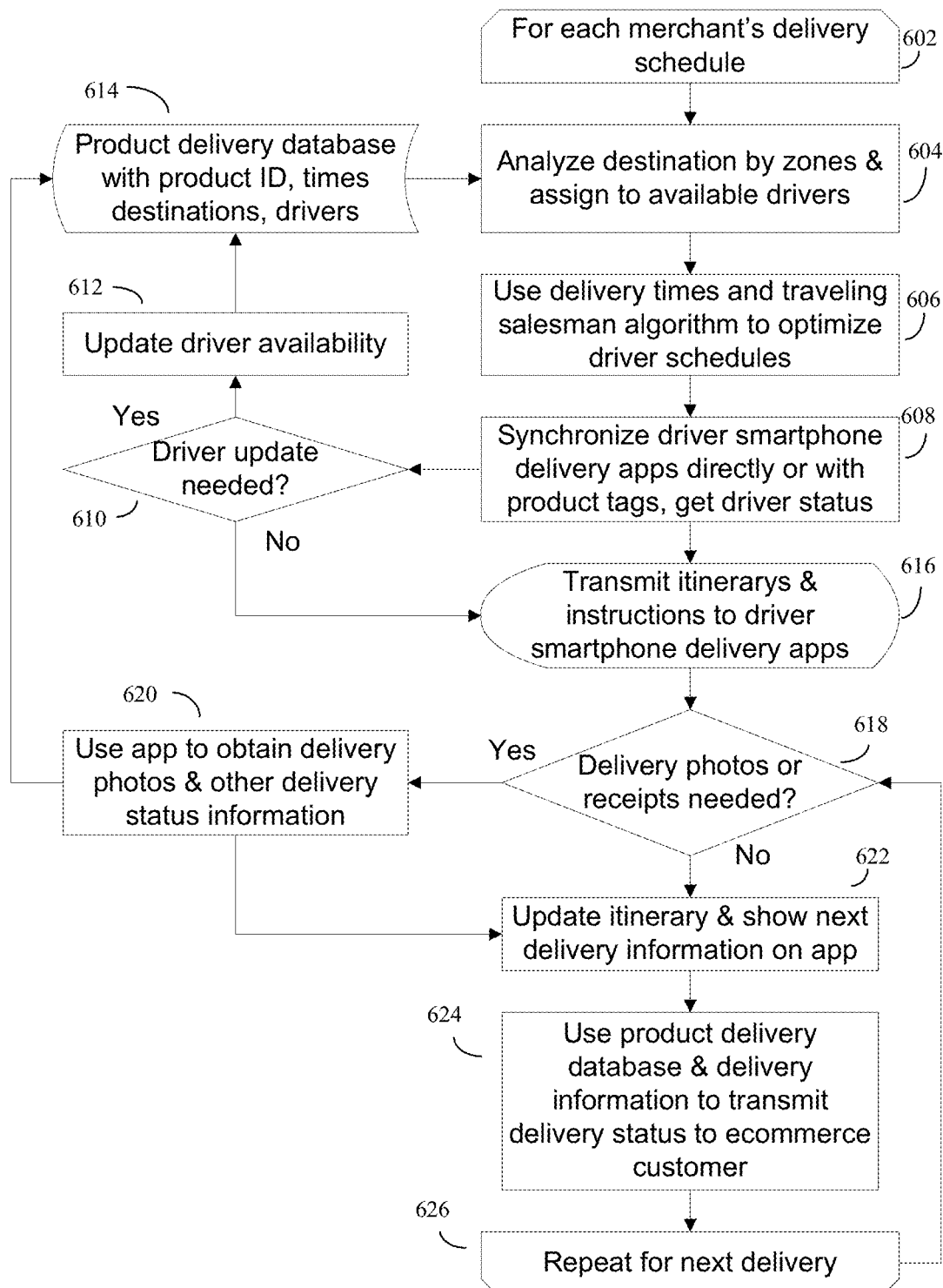
FIG. 54A shows a flowchart showing an embodiment of the product delivery backend software.

A flow chart showing one embodiment of the product delivery system software (with both server and smartphone software functionality shown) is shown in FIG. 54A. Although the product delivery system may initially assume (614) that certain "routine (e.g. previously assigned) drivers may be available for work on any given day, these assumptions may not always be correct. Thus the driver availability information will often need to be updated.

To insure accuracy, in some embodiments, the various drivers can log in (for example, in the morning) using their smartphones and the invention's delivery app (608), and transmit their updated availability to take deliveries to the product delivery backend software (104b) and database (500) on server (100b). The product delivery system can update this information (612) accordingly (610). Alternatively, the drivers may communicate their present or future availability status to the product delivery backend software by other methods (e.g. email, text message, voice, etc.).

Regardless of how the driver status information is obtained, the product delivery backend software (104b) will typically be configured to use this driver status information (608), and the delivery status information (614) (e.g. which products should be delivered where) and the various product delivery time and location constraints, to help automatically manage the delivery logistics. For example, the system can be configured to use its one or more processors to automatically compute (604), (606), (608), (616) and transmit an optimized (e.g. most efficient route subject to various constraint) product delivery schedules showing how best to use the available drivers to deliver the products, given the product delivery locations and requested times.

Figure 55:
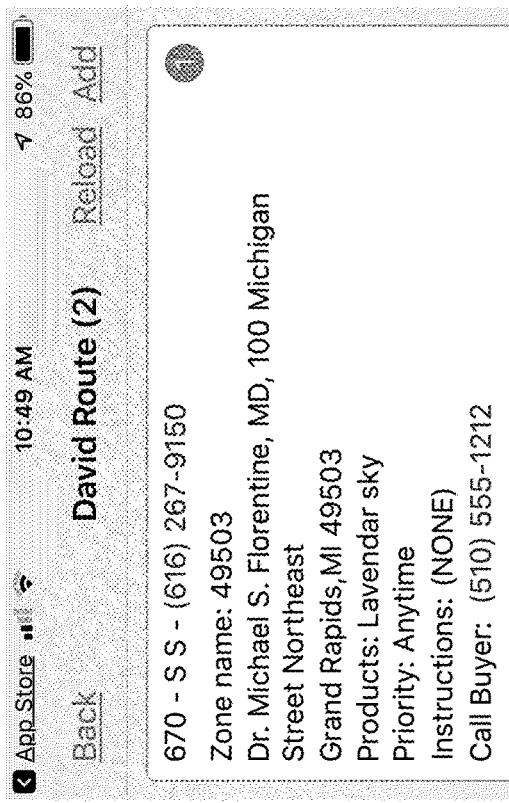
FIG. 55 shows a screenshot of the product delivery mobile app for a particular driver, here named "David Route".

Usually, the optimized product delivery schedule will comprise a driver specific list of products and delivery addresses (see FIG. 55). This list will typically comprise delivery addresses, and usually also delivery time ranges. The system's computer processors can be configured to automatically use a "traveling salesman" type algorithm (606) to determine this optimized product delivery schedule.

In some embodiments (see FIG. 53, 524, and FIG. 58), the delivery mobile app (or web browser) may be further configured to provide a user interface comprising at least various product delivery map locations. In situations where a merchant uses multiple drivers, the system software can also be configured to further analyze the various delivery addresses according to geographical delivery zones (604), and to use these geographical delivery zones to assign the various drivers to product deliveries within these various geographical delivery zones. As a zip code example, one driver may be assigned one set of zip code based geographical delivery zones, while a different driver may be assigned to a different set of zip code based geographical delivery zones. Note that these geographical delivery zones (604) are not always constant, but may themselves be automatically varied by the system according to a time-driven schedule.

In some embodiments, merchants who deliver products need the ability to disable certain delivery areas or hard to reach areas during busy holidays. To support this, the system can be configured to enable the merchant to disable delivery areas for a date range. If certain delivery areas are disabled, the buyer will be unable to place an order for delivery with the specified date range. The merchant user interface allowing the merchant to disable delivery to certain areas or zones, on a preset-schedule basis, is shown in FIG. 54B.

Figure 54B:
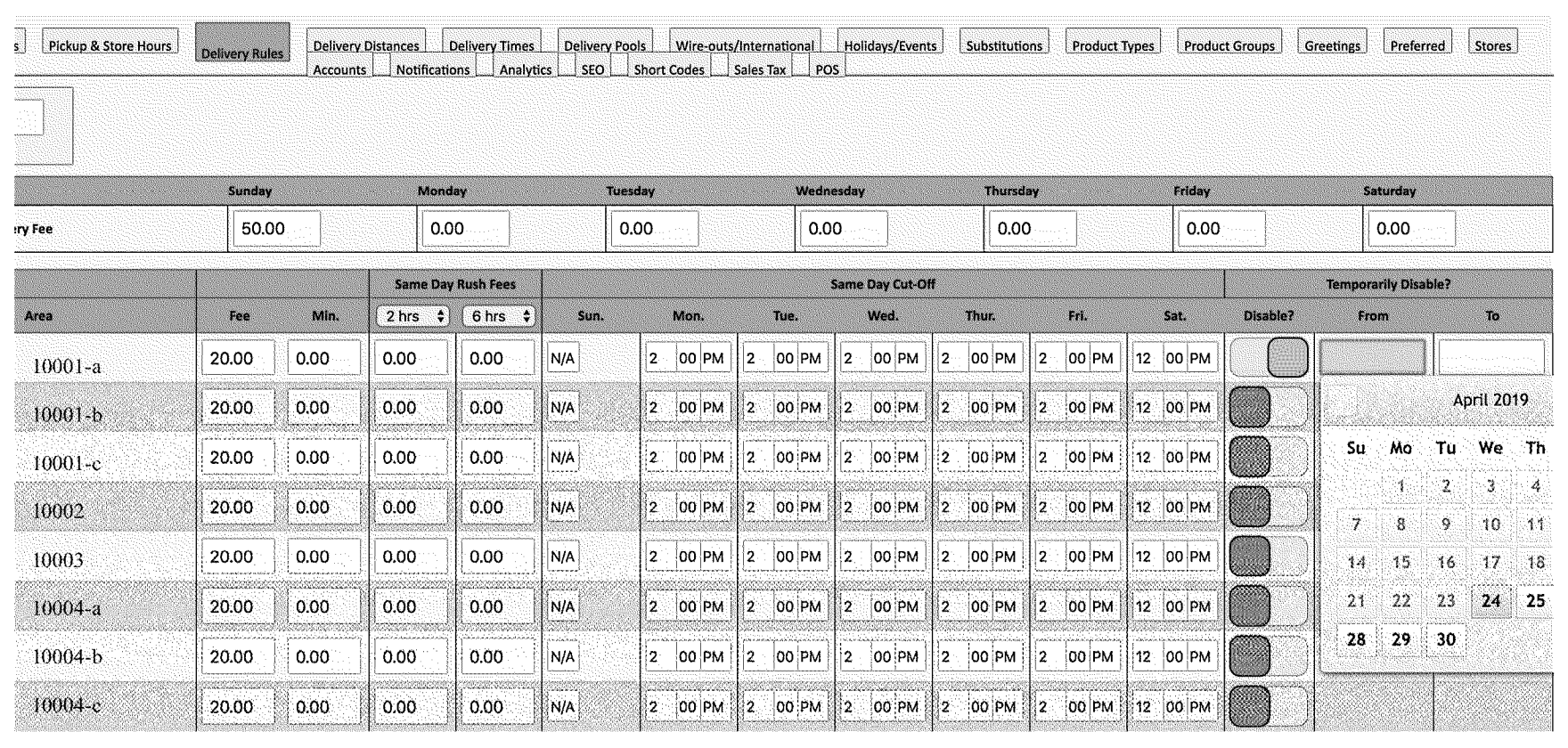

In the example shown in FIG. 54B, assume that the merchant has set up eight delivery areas (or "zones"): 10001-a, 10001-b, 10001-c, 10002, 10003, 10004-a, 10004-b, 10004-c), each usually corresponding to a different geographical region, such as a zip code or other geographical area. The system is providing a user interface enabling the merchant to set, on a specific set of dates (here April 24) what sort of delivery service will be available and during what hours and what costs. In this example, the merchant has decided to disable service to delivery zone 10001-a entirely on April 24. On this day, delivery service to the other zones is still allowed, but under certain delivery fees and hours and constraints that may be precisely established, in advance, by the merchant.

Put alternatively, as shown in FIG. 54B, in some embodiments, delivery to all of the different geographic delivery zones are not always enabled or disabled as a group. Instead, in some embodiments, the system may be configured to enable one or more of the various one geographic delivery zone configured to vary according to a calendar-driven delivery schedule. This calendar-driven delivery schedule need not be the same as the other calendar and time of day schedules, but instead may be a different calendar and time of day schedule that builds in the merchant's knowledge of merchant's particular delivery situation. For example, the merchant may realize that delivery to the business district of a city may be infeasible during certain scheduled events (e.g. parades) or during certain times of day (e.g. rush hour), and may wish to configure the system so that delivery to some zones served by the merchant is disabled, while delivery to other zones (e.g. the suburbs surrounding a city's business district) remains open. Here the system software and processor can be configured to determine, according to the delivery schedule, if a given requested delivery location and delivery time fall into a geographic delivery zone and delivery schedule time where delivery is enabled or disabled. If delivery to a certain geographic delivery zone is disabled during certain days or times (such as rush hour, holidays, and the like), then the system can be configured to transmit a notification (usually to the customer using the e-commerce website or app) that delivery to these one or more zones is not available for the product.

Returning to FIG. 54A and FIG. 53, other product delivery functions performed by the system can also include, transmitting product delivery status information to the various e-commerce customers (618), (620). This product delivery status information can comprise any of product delivery recipient identification, product delivery recipient signatures, product delivery location, and images or video of the product as delivered.

For example, FIG. 53 shows a situation where the "Tulip Mania" product (346a), previously shown being assembled in FIG. 48 is now being delivered.

Scanning product ID tags on initial pickup: In some situations, such as when various drivers arrive at a merchant distribution location to pick up their various products, occasionally driver "A" may accidentally pick up a product intended for "driver B". In some situations, such as during times of very high demand, the merchant may be somewhat overwhelmed, and the drivers may have to select "their" products themselves. Here, to help prevent mistakes, and to help the system manage the delivery process efficiently, it is often useful to configure the delivery app (or web browser) so that the drivers can use their smartphones (116b) to scan (520, 522) tags, such as QR tags (356), previously affixed to the various products such as (356).

Here, the product delivery backend software (104b) can be configured to receive any of images of product delivery tags (356) transmitted by the product delivery mobile app, or receive product identification (e.g. the bar code information) from images (522) of a product delivery tag imaged (520) and read by the product delivery mobile app (608), thus obtaining product identification. The product delivery backend software (104b) can then use this product identification to transmit an optimized product delivery schedule to the driver(s) for those products assigned to the driver(s) (616). The product delivery backend software can also be configured to use this product identification to transmit at least some delivery status information to the appropriate e-commerce customer, either after delivery (624), or upon initial pickup by the driver, or both.

Figure 58:
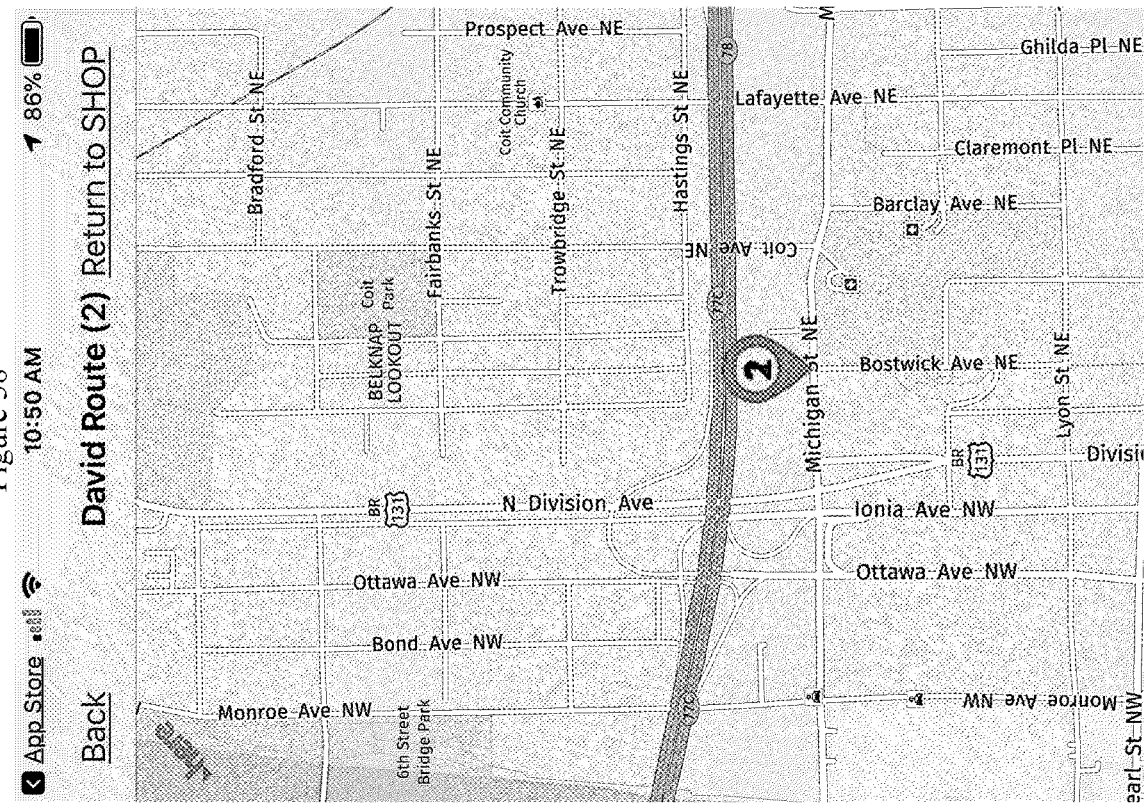
FIG. 58 shows the product delivery mobile app providing a user interface comprising the product delivery map location for one of the products that the diver is delivering.

In FIG. 53, assume that after the initial scan (520, 522) of the product (346a) tag (356) (see also FIG. 57), the product delivery backend software (104b) has transmitted an updated delivery itinerary to the driver along (524) with a "traveling salesman" optimized route with various stops, and map directions (FIG. 55, FIG. 58).

Returning to FIG. 53, the driver then travels his route (526). In this example, further assume that somewhere in transit, the product (346a) became damaged. The damaged version of this product is designated "damaged product" (346b). Assume here also that the system has been configured to require (see FIG. 54A, 618, and FIG. 60) that the driver uses a smartphone to photograph the product upon delivery (here designated as post-delivery product 346c).

In this example, at the appropriate delivery location (528), the driver (530) places the now damaged product (346b, now called post-delivery product 346c) on a location such as at a front porch of a residence (528). The driver then uses the delivery app and his smartphone (116b) to obtain (532) photos or video of the post-delivery product. This image is obtained by the smartphone (116b) as post-delivery product image (346d). The delivery app and smartphone are then configured to then upload this image to the server (100b). This can be stored in the appropriate database. The system can then be configured to transmit this delivery status information (510) (which in this example, includes both a pre-delivery image and a post-delivery image) to a computerized device operated by the merchant or customer (532). This step is shown in FIG. 54A (624).

In this example, neither the merchant nor the customer may be entirely happy with the post-delivery condition of the product! However, the advantages of this approach are that the system has created a clear record about what happened during delivery, and this information can be used for prompt corrective action, as appropriate.

FIG. 55 shows a screenshot of the product delivery mobile app for a particular driver, here named "David Route". The product delivery backend software (FIG. 53 104*b*, FIG. 54A 616) has transmitted a list of delivery addresses to this driver's mobile app (116*b*), along with information regarding if product delivery images (FIG. 53 532, 346*d*) are required. The system has also optimized this route producing an optimized product delivery schedule, in some embodiments by using a traveling salesmen algorithm (FIG. 54A, 606).

Figure 56:
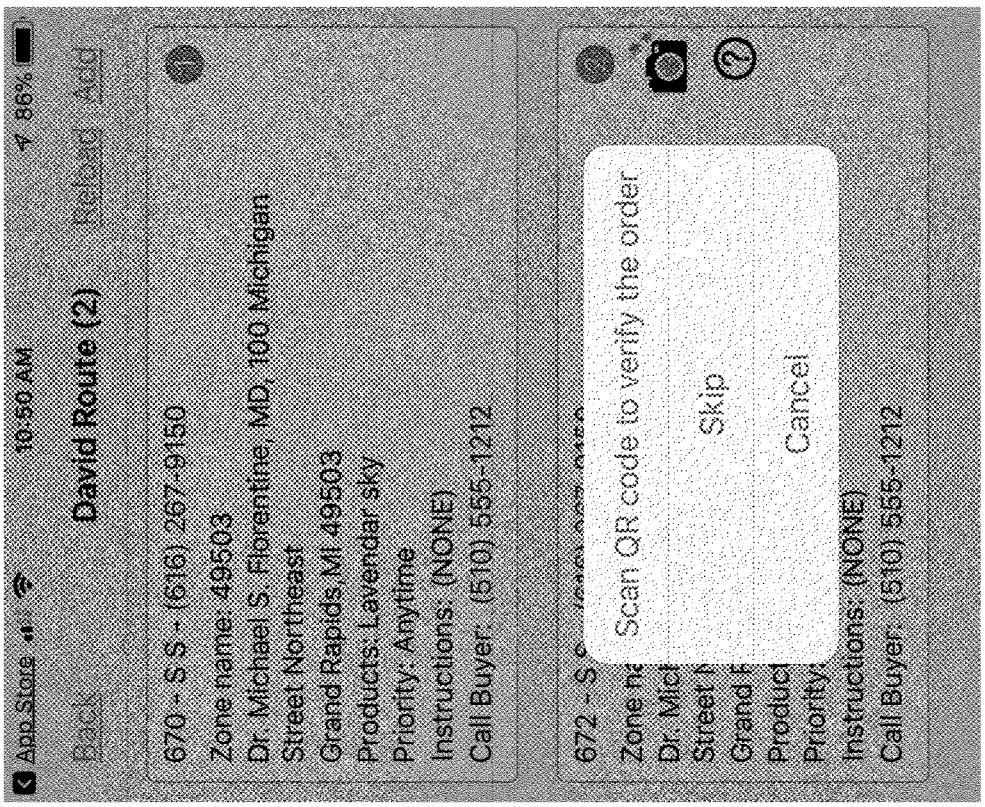
FIG. 56 shows a screenshot of the product delivery mobile app, showing that the system is also requesting that the driver use the app to additionally scan QR bar codes that are printed on tags associated with the particular product that the driver is scheduled to deliver.

FIG. 56 shows a screenshot of the product delivery mobile app (here running on smartphone 116*b*) showing that the system is also requesting that the driver use the delivery app to additionally scan (FIG. 53, 520) QR bar codes (FIG. 53, 356) that are printed on tags associated with the particular product (FIG. 53, 346*a*) that the driver is scheduled to deliver. This provides a higher level of quality control and helps ensure that the correct products are delivered to the correct addresses.

Figure 57:
FIG. 57 shows a screenshot of the driver using the product delivery mobile app to scan a QR bar code printed on a tag associated with a particular product.

FIG. 57 shows a screenshot of the driver using the product delivery mobile app, here again running on a smartphone (116*b*) to scan (FIG. 53, 520) a QR bar code printed on a tag associated with a particular product. FIG. 57 thus corresponds to FIG. 53 (522).

FIG. 58 shows the product delivery mobile app, running on a smartphone (116*b*) providing a user interface comprising the product delivery address map location for one of the products that the diver is delivering. FIG. 58 thus somewhat corresponds to FIG. 53 (524).

Figure 59:
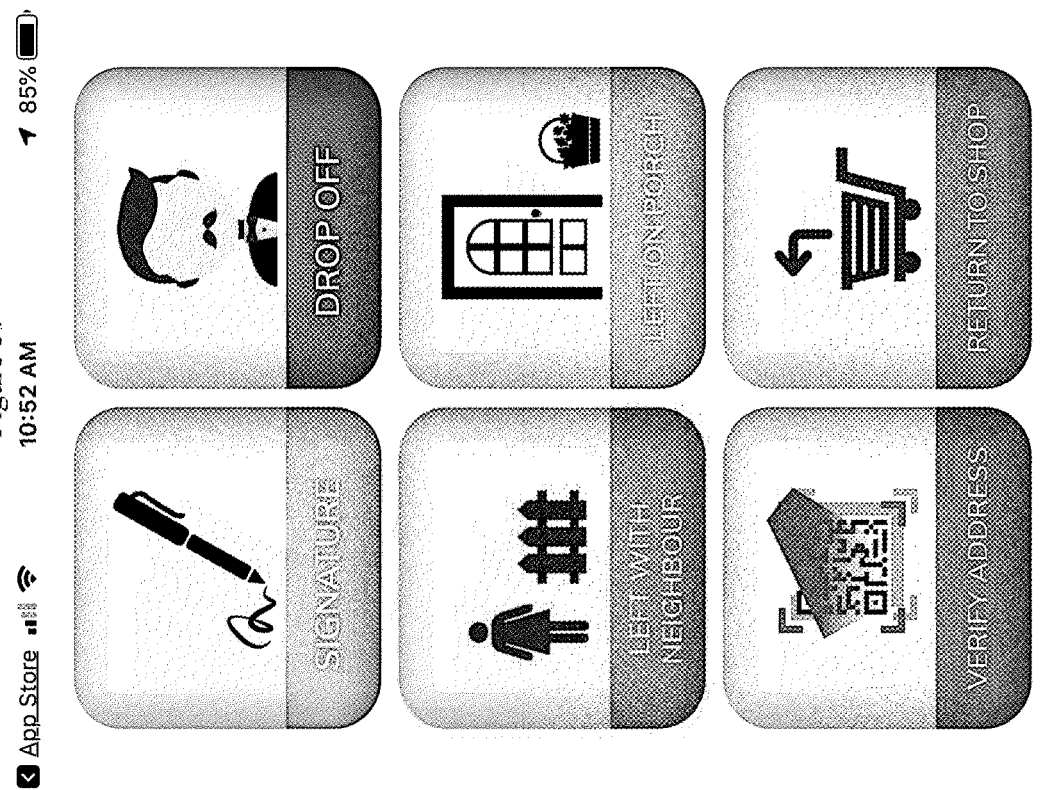
FIG. 59 shows the product delivery mobile app user interface providing various ways for the driver to input delivery status information to the system.

FIG. 59 shows the product delivery mobile app user interface, running on a smartphone (116*b*) providing various ways for the driver to input delivery status information to the system. This delivery status information can comprise product delivery recipient information, product delivery recipient signatures, product delivery location, and product delivery images or video.

Figure 60:
FIG. 60 shows the product delivery mobile app after receiving product delivery location information from the driver that the product was delivered at the recipient's porch.

FIG. 60 shows the product delivery mobile app after receiving product delivery location information from the driver that the product was delivered at the recipient's porch. Here the app is prompting the driver to also take a product delivery image (e.g. prompting to take the image shown in FIG. 53, 532) before proceeding on to the next destination. See also FIG. 54A (618, 620).

The invention claimed is:

1. A system of managing at least one schedule driven dynamic layout e-commerce website for at least one merchant, said system comprising:
at least one processor, centralized database, centralized database server, and automated website creation software configured to implement at least one schedule driven dynamic layout e-commerce website, said at least one e-commerce website comprising at least some web pages with dynamic sections, said at least one e-commerce website hosted by either said centralized database server or alternative e-commerce website servers;
wherein at least some said dynamic sections are associated with corresponding product and product data, said product data comprising product description, product price, product shipping locations, schedule times of product availability at said product shipping locations and product inventory data at said product shipping locations;
said product data additionally linked to product delivery time and location constraints relative to at least one said product shipping location;
said product delivery time and location constraints comprising product delivery charge and surcharge information for certain delivery times and locations relative to said at least one product shipping location;
said product data and product delivery time and location constraints being stored in said centralized database;
said system further configured to enable said product data and said product delivery time and location constraints to be entered or updated from a network connected computerized device running any of a web browser based administrator webpage and mobile app;
for each dynamic section associated with said corresponding product, said at least one processor further configured to examine said product data for schedule times of product availability and determine if said product is available and in inventory, and if, during said schedule times, said product is available and in inventory, then to transmit data to said at least one e-commerce website to display at least some data from said dynamic sections associated with said corresponding product on at least one web page of said at least one e-commerce website, and otherwise not display data from said dynamic sections associated with said corresponding product.

2. The system of claim 1, wherein said system is configured to vary any of said product data, and said product delivery time and location constraints according to calendar event dates comprising one time or repeating holidays and time predictable events.

3. The system of claim 1, wherein each said product comprises at least one product component;
said product data further comprises product recipes comprising those product components required to produce a given product;
said system further comprising a product component database of those product components available to each merchant;
said system further comprises product production backend software configured to use said product recipes and said product component database to provide a user interface configured to provide merchant specific product assembly information.

4. The system of claim 3, wherein said product component database further comprises product component price data, and product component markup data; and
said product production backend software is further configured to perform at least one of:
a) use said product recipe, product component price data, and product component markup data to compute product costs and product selling price; and
b) use product component price data, and product component markup data, to compute product costs and product selling price for a new product recipe.

5. The system of claim 3, wherein said product production backend software is configured to receive pre-delivery product data from any of a product production web browser based webpage and mobile app configured to run on a smartphone or network connected tablet computer equipped with a user interface and at least one video camera;
said any of a product production web browser based webpage and mobile app configured to use said at least one video camera to obtain at least one of either pre-delivery images or video of said product; and
upload at least one of either pre-delivery images or video of said product to said centralized database.

6. The system of claim 5, wherein said system is further configured to transmit said images or video of said product to any of said at least one merchant and an e-commerce customer.

7. The system of claim 5, wherein said product backend software is configured to generate a QR code or other visual code identifying said product on a display screen of a computerized device controlled by said backend software;

said any of a product production web browser based webpage and mobile app is configured to use said at least one video camera to receive said QR code or other visual code from said display screen, and to use said QR code or other visual code to identify at least one of either images or video of an object as being said at least one of either pre-delivery images or video of said product.

8. The system of claim 5, wherein said product backend software is configured to generate a QR code or other visual code identifying said product, and print said QR code or other visual code onto a product delivery tag.

9. The system of claim 1, wherein said at least one processor is further configured to, in response to receiving a product purchase request comprising a product identifier and a requested delivery location and delivery time from an e-commerce customer interacting with said at least one e-commerce website with an e-commerce computerized device configured to run an e-commerce customer web browser or app:

determine said at least one product shipping location, examine said product delivery time and location constraints relative to said at least one product shipping location, and use said requested delivery location and delivery time relative to said at least one product shipping location, to, when said delivery location and delivery time is enabled, compute product delivery charges and surcharges for said product, and transmit at least a sum of said product delivery charges or surcharges for said product for display on said at least one e-commerce website.

10. The system of claim 9, wherein said product delivery time and location constraints further comprise at least one geographic delivery zone;

said at least one geographic delivery zone configured to vary according to a calendar-driven delivery schedule;

said processor is further configured to use said calendar-driven delivery schedule to determine if said requested delivery location and delivery time fall into a geographic delivery zone and delivery schedule time where delivery is enabled or disabled; and when delivery is disabled, transmit a notification or update said at least one e-commerce website that delivery is not available to said geographic delivery zone at said delivery schedule time.

11. The system of claim 9, wherein said at least one processor is further configured to, in response to information that said e-commerce customer has purchased said product with said e-commerce website or app:

record a sale of said product, said product shipping location, requested product delivery time and requested delivery location in said centralized database; and transmit notification of said sale of said product to said e-commerce customer, as well as to at least one computerized device associated with distribution of product from said product shipping location.

12. The system of claim 11, wherein said system further comprises product delivery backend software configured, on a merchant specific basis, to use said product delivery time and location constraints, and merchant specific delivery resources, to optimize product delivery for a plurality of products.

13. The system of claim 12, wherein said at least one computerized device associated with distribution of product comprises any of a product delivery web browser based webpage and mobile app;

said product delivery backend software is further configured to interface with said any of a product delivery web browser based webpage and mobile app;

said any of a product delivery web browser based webpage and mobile app is configured to receive driver status information and delivery status from at least one driver, and to transmit said driver status information and delivery status information to said product delivery backend software;

said product delivery backend software configured to use said driver status information, said delivery status information, and said product delivery time and location constraints, to perform any of:

a) transmit an optimized product delivery schedule to said at least one driver for those products assigned to said at least one driver;

b) for any given product, transmit at least some delivery status information to at least one e-commerce customer.

14. The system of claim 13, wherein said product delivery status information comprises any of product delivery recipient identification, product delivery recipient signatures, product delivery location, and images or video of the product as delivered.

15. The system of claim 13, wherein said optimized product delivery schedule comprises a driver specific list of products to deliver, said list comprising delivery addresses, said system uses a traveling salesman algorithm to determine said optimized product delivery schedule, and wherein said any of a product delivery web browser based webpage and mobile app is further configured to provide a user interface comprising at least product delivery map locations.

16. The system of claim 15, wherein said system further analyzes said delivery addresses according to geographical delivery zones, and uses said geographical delivery zones to assign said at least one driver for product delivery within said geographical delivery zones.

17. The system of claim 13, wherein said product delivery backend software is configured to receive any of images of a product delivery tag transmitted by said any of a product delivery web browser based webpage and mobile app, or product identification from images of a product delivery tag imaged and read by said any of a product delivery web browser based webpage and mobile app, and use aid product identification to perform any of a) transmit an optimized product delivery schedule to said at least one driver for those products assigned to said at least one driver;

b) for any given product, transmit at least some delivery status information to at least one e-commerce customer.

18. The system of claim 17, wherein said product delivery tag comprises a QR code or other visual code identifying said product.

* * * * *